(12) United States Patent
Boyle et al.

(10) Patent No.: US 7,351,939 B2
(45) Date of Patent: Apr. 1, 2008

(54) TOASTER

(75) Inventors: Kenneth Boyle, Newton, IA (US);
Doug Drenten, Aiken, SC (US);
Robert Brueckner, Johnston, IA (US);
Gary Petersen, Grinnell, IA (US);
Kristi Lafrenz, Newton, IA (US); Gary
Schmitz, Newton, IA (US); Keith
Gausmann, Westerville, OH (US);
Jeffrey DeBord, Worthington, OH
(US); Michael Kopczewski, Grove
City, OH (US); Robert Hayes, Lewis
Center, OH (US); Sally Stark,
Westerville, OH (US); Paul Hsu,
Powell, OH (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 11/075,408

(22) Filed: Mar. 8, 2005

(65) Prior Publication Data
US 2005/0204927 A1 Sep. 22, 2005

Related U.S. Application Data

(60) Provisional application No. 60/554,477, filed on Mar. 19, 2004.

(51) Int. Cl.
*A47J 37/08* (2006.01)
(52) U.S. Cl. .......................... 219/521; 219/386; 99/327
(58) Field of Classification Search .................... None
See application file for complete search history.

(56) References Cited

U.S. PATENT DOCUMENTS

| 1,502,894 A | 7/1924 | Anschutz |
| 1,533,241 A | 4/1925 | Forshee |
| 1,611,769 A | 12/1926 | Mottlau |
| 1,666,398 A | 4/1928 | Pierce |
| 1,720,451 A | 7/1929 | Smith |
| 1,832,831 A | 11/1931 | Ginder |
| 1,892,117 A | 12/1932 | Perkins |
| 1,926,276 A | 9/1933 | Forbes |
| 1,979,845 A | 11/1934 | Schallis |

(Continued)

FOREIGN PATENT DOCUMENTS

DE 1 579 531 7/1968

(Continued)

OTHER PUBLICATIONS

GE Toaster Model 168958, GE Perfect Slice Ultra-Wide-Slot Toaster User Manual and Images.

(Continued)

*Primary Examiner*—J. Pelham
(74) *Attorney, Agent, or Firm*—Tara M. Hartman

(57) ABSTRACT

A toaster is provided having a base which may be interchangeable or integral with the toaster unit. The toaster also contains an angled heating chamber having manually moveable heating element assemblies, a centering carriage, and a toast lift that optimize the distance between the heating elements and the bread product. Furthermore, an angled top for viewing the bread product within the heating chamber, and including a user control interface for controlling the actions of the toaster, located on the top surface thereof are provided.

7 Claims, 35 Drawing Sheets

U.S. PATENT DOCUMENTS

| | | | |
|---|---|---|---|
| 2,061,433 A | 11/1936 | Murasco | |
| D105,354 S | 7/1937 | Bersted | |
| D105,713 S | 8/1937 | Preston | |
| D105,779 S | 8/1937 | Preston | |
| D106,182 S | 9/1937 | Chapman | |
| 2,123,067 A | 7/1938 | Stiles | |
| 2,131,278 A | 9/1938 | Gough | |
| D111,765 S | 10/1938 | Hadley | |
| D112,252 S | 11/1938 | Hadley | |
| 2,141,867 A | 12/1938 | Ireland | |
| 2,147,376 A | 2/1939 | Lucia | |
| 2,147,388 A | 2/1939 | Serota | |
| 2,182,124 A | 12/1939 | Guerra | |
| 2,285,156 A | 6/1942 | Gomersall | |
| 2,355,153 A | 8/1944 | Gomersall | |
| 2,431,195 A | 11/1947 | Olving | |
| 2,545,404 A | 3/1951 | Young | |
| 2,553,593 A * | 5/1951 | Lermont | 99/327 |
| 2,562,535 A * | 7/1951 | Hamlin | 99/328 |
| 2,567,075 A | 9/1951 | Lindberg | |
| 2,584,725 A | 2/1952 | McNairy | |
| 2,653,533 A | 9/1953 | Weeks | |
| 2,655,095 A | 10/1953 | McCullough | |
| 2,659,297 A | 11/1953 | Morphy et al. | |
| 2,779,849 A | 1/1957 | Gomersall | |
| 2,816,501 A | 12/1957 | Meyers | |
| 2,842,200 A | 7/1958 | Graham | |
| 2,847,931 A | 8/1958 | Saint | |
| 2,849,946 A * | 9/1958 | Palmer | 99/390 |
| 2,910,929 A * | 11/1959 | Sorenson | 99/390 |
| 2,913,976 A | 11/1959 | Cole | |
| 2,925,771 A | 2/1960 | Avetta | |
| 2,941,463 A | 6/1960 | Di Cuia | |
| 3,007,393 A | 11/1961 | Le Doux | |
| 3,065,688 A | 11/1962 | Lindermann | |
| 3,308,748 A | 3/1967 | Jalbert | |
| 3,392,663 A | 7/1968 | Williams | |
| 3,524,404 A | 8/1970 | Kimura | |
| 3,529,533 A | 9/1970 | De Remer | |
| 3,641,921 A * | 2/1972 | Toyooka et al. | 99/390 |
| 3,692,975 A | 9/1972 | Markus et al. | |
| 3,752,955 A | 8/1973 | Grove | |
| 3,789,749 A | 2/1974 | Paaskesen | |
| 3,880,063 A | 4/1975 | Pestka | |
| 3,956,978 A | 5/1976 | Borley | |
| 3,986,444 A | 10/1976 | Caudron | |
| 4,038,520 A | 7/1977 | Boller et al. | |
| 4,051,266 A | 9/1977 | Goltsos | |
| 4,068,569 A | 1/1978 | Munsey | |
| 4,110,600 A | 8/1978 | Spotts et al. | |
| 4,154,151 A | 5/1979 | Mochizuki | |
| 4,201,124 A | 5/1980 | Huggler | |
| 4,216,372 A | 8/1980 | Huggler | |
| 4,218,775 A | 8/1980 | Cox et al. | |
| 4,245,148 A | 1/1981 | Gisske et al. | |
| 4,290,349 A | 9/1981 | Fiorenza | |
| 4,296,312 A | 10/1981 | Salem | |
| 4,345,145 A | 8/1982 | Norwood | |
| 4,345,513 A | 8/1982 | Holt | |
| 4,345,515 A | 8/1982 | Holt | |
| 4,346,651 A | 8/1982 | Schickedanz | |
| 4,382,175 A | 5/1983 | Huggler | |
| 4,394,563 A | 7/1983 | Schnell | |
| 4,396,825 A | 8/1983 | Cox et al. | |
| 4,402,258 A | 9/1983 | Guarnerio | |
| 4,433,232 A | 2/1984 | Tachikawa et al. | |
| 4,454,803 A | 6/1984 | Wolf et al. | |
| 4,455,319 A | 6/1984 | Clark | |
| 4,487,115 A | 12/1984 | Su | |
| 4,491,066 A | 1/1985 | Juriga et al. | |
| 4,503,758 A | 3/1985 | Carville | |
| 4,510,376 A | 4/1985 | Schneider | |
| 4,518,849 A | 5/1985 | Rolland | |
| 4,577,550 A | 3/1986 | Maroti et al. | |
| 4,580,853 A | 4/1986 | Hitzeroth et al. | |
| 4,585,926 A | 4/1986 | Easthill | |
| 4,645,909 A | 2/1987 | Thoben et al. | |
| D289,249 S | 4/1987 | Jeter | |
| 4,656,927 A | 4/1987 | Mosby et al. | |
| 4,718,332 A | 1/1988 | Mothrath | |
| 4,734,562 A | 3/1988 | Amano et al. | |
| 4,735,855 A | 4/1988 | Wofford et al. | |
| 4,745,855 A | 5/1988 | Younger | |
| 4,748,308 A | 5/1988 | Drews | |
| 4,755,656 A | 7/1988 | Charlesworth et al. | |
| 4,874,929 A | 10/1989 | Houser | |
| 4,894,518 A | 1/1990 | Ishikawa et al. | |
| 4,901,631 A | 2/1990 | Russell et al. | |
| 4,906,818 A | 3/1990 | Lumpp et al. | |
| 4,913,046 A | 4/1990 | Mothrath et al. | |
| D310,004 S | 8/1990 | Storsberg | |
| 4,972,768 A | 11/1990 | Basora San Juan | |
| 4,972,797 A | 11/1990 | Russell et al. | |
| 4,976,195 A | 12/1990 | Cavazos | |
| 4,986,173 A | 1/1991 | Hahnewald et al. | |
| 5,006,690 A | 4/1991 | Cole et al. | |
| 5,018,437 A | 5/1991 | San Juan | |
| 5,044,263 A | 9/1991 | Birkert et al. | |
| 5,072,662 A | 12/1991 | Yip | |
| 5,095,814 A | 3/1992 | Ott et al. | |
| D326,028 S | 5/1992 | Balandier | |
| 5,121,678 A | 6/1992 | Del Fresno | |
| 5,126,534 A | 6/1992 | Kwong | |
| 5,128,521 A | 7/1992 | Lanno et al. | |
| 5,156,637 A | 10/1992 | Wai-Ching | |
| 5,181,455 A | 1/1993 | Masel et al. | |
| 5,193,439 A | 3/1993 | Finesman et al. | |
| 5,216,944 A | 6/1993 | Trujillo | |
| 5,235,159 A | 8/1993 | Kornrumpf et al. | |
| 5,283,421 A | 2/1994 | Richards | |
| 5,299,497 A | 4/1994 | Dias | |
| 5,304,782 A | 4/1994 | McNair et al. | |
| 5,309,826 A | 5/1994 | Ortiz | |
| D347,545 S | 6/1994 | Hoare et al. | |
| 5,317,960 A | 6/1994 | Cumfer | |
| 5,319,171 A | 6/1994 | Tazawa | |
| 5,352,867 A | 10/1994 | Shota | |
| 5,378,874 A | 1/1995 | Holling et al. | |
| 5,379,685 A | 1/1995 | Krasznai | |
| 5,385,082 A | 1/1995 | Huggler et al. | |
| 5,397,510 A | 3/1995 | Clark | |
| 5,414,243 A | 5/1995 | Snell et al. | |
| 5,423,246 A | 6/1995 | McNair et al. | |
| 5,438,914 A | 8/1995 | Hohn et al. | |
| 5,463,936 A | 11/1995 | Clark et al. | |
| 5,487,328 A * | 1/1996 | Fujii | 99/390 |
| D367,990 S | 3/1996 | Roze | |
| 5,520,095 A | 5/1996 | Huber et al. | |
| 5,555,793 A | 9/1996 | Tocchet et al. | |
| D376,509 S | 12/1996 | Stutzer | |
| 5,584,231 A | 12/1996 | DeLeon | |
| 5,590,584 A | 1/1997 | Ahn | |
| 5,615,229 A | 3/1997 | Sharma et al. | |
| D380,338 S | 7/1997 | Carbone et al. | |
| 5,642,657 A | 7/1997 | Yeung et al. | |
| 5,644,974 A | 7/1997 | Slavin | |
| 5,647,270 A | 7/1997 | Rousseau et al. | |
| 5,653,158 A | 8/1997 | Balandier et al. | |
| D383,352 S | 9/1997 | Powel | |
| 5,664,481 A | 9/1997 | Huggler | |
| 5,664,483 A | 9/1997 | Yip | |
| 5,680,810 A | 10/1997 | Sham | |
| 5,694,831 A | 12/1997 | Haroun et al. | |
| 5,705,791 A | 1/1998 | Sutton et al. | |

| | | | | | | |
|---|---|---|---|---|---|---|
| 5,735,190 | A | 4/1998 | Sham | 6,532,864 B2 | 3/2003 | Ancona et al. |
| 5,735,191 | A | 4/1998 | Russell et al. | D472,421 S | 4/2003 | To |
| 5,746,115 | A | 5/1998 | Yip | D472,760 S | 4/2003 | Grumadaite et al. |
| 5,752,759 | A | 5/1998 | Pizzo | D473,093 S | 4/2003 | To |
| 5,758,567 | A | 6/1998 | Van Der Wal et al. | D473,094 S | 4/2003 | Aeshbacher |
| 5,771,780 | A | 6/1998 | Basora et al. | 6,543,337 B1 * | 4/2003 | Brown ................... 99/327 |
| D396,165 | S | 7/1998 | Pena Angarita | D474,062 S | 5/2003 | Littmann |
| 5,802,957 | A | 9/1998 | Wanat et al. | D474,368 S | 5/2003 | Averty |
| D401,472 | S | 11/1998 | Gould | D474,640 S | 5/2003 | Holderfield et al. |
| 5,889,259 | A | 3/1999 | Krasznai et al. | 6,559,423 B2 | 5/2003 | Nguyen et al. |
| D409,438 | S | 5/1999 | Brady | D475,884 S | 6/2003 | Holderfield et al. |
| 5,924,355 | A | 7/1999 | Belknap et al. | 6,571,687 B1 | 6/2003 | Wu et al. |
| D413,040 | S | 8/1999 | Lawrence et al. | 6,581,512 B1 | 6/2003 | Mauffrey et al. |
| 5,947,006 | A | 9/1999 | Mauffrey | 6,584,889 B2 * | 7/2003 | Friel, Sr. ................... 99/327 |
| 5,948,305 | A | 9/1999 | Petrides et al. | 6,595,111 B1 | 7/2003 | Chiu et al. |
| 6,019,030 | A | 2/2000 | Kettman | 6,595,118 B1 | 7/2003 | Gould |
| D421,693 | S | 3/2000 | Carbone | 6,621,053 B1 | 9/2003 | Wensink et al. |
| 6,037,580 | A | 3/2000 | Renk | 6,630,184 B2 | 10/2003 | Chung et al. |
| D422,172 | S | 4/2000 | Hsu | 6,639,187 B2 | 10/2003 | Arel et al. |
| 6,058,829 | A | 5/2000 | Endres | 6,642,657 B2 | 11/2003 | Mako et al. |
| 6,060,698 | A | 5/2000 | Petrides et al. | D483,601 S | 12/2003 | Anglay |
| D426,106 | S | 6/2000 | Endres | D483,643 S | 12/2003 | Chien |
| 6,080,967 | A | 6/2000 | Sandor et al. | 6,655,262 B2 | 12/2003 | Arnedo et al. |
| D428,765 | S | 8/2000 | Hughes | 6,657,168 B1 | 12/2003 | Lazzer |
| 6,104,001 | A | 8/2000 | Huggler | 6,667,465 B2 | 12/2003 | Garber et al. |
| 6,105,486 | A | 8/2000 | Belknap et al. | 6,668,706 B2 | 12/2003 | Tomsich et al. |
| D430,988 | S | 9/2000 | Cruz et al. | 6,675,700 B2 | 1/2004 | Hong |
| D431,147 | S | 9/2000 | Lin | 6,686,564 B2 | 2/2004 | Zhou |
| 6,116,149 | A | 9/2000 | Benedictus et al. | 6,708,602 B2 | 3/2004 | Nguyen |
| 6,116,150 | A | 9/2000 | Greenfield, Jr. | D488,341 S | 4/2004 | Enriquez et al. |
| 6,123,012 | A | 9/2000 | Hardin et al. | 6,717,110 B2 | 4/2004 | Van der Meer et al. |
| D434,264 | S | 11/2000 | Mixides | 6,829,983 B2 | 12/2004 | Arnedo et al. |
| 6,192,789 | B1 | 2/2001 | Agcaoili et al. | 2001/0029823 A1 | 10/2001 | Ancona et al. |
| 6,192,790 | B1 | 2/2001 | Balandier | 2001/0050277 A1 | 12/2001 | Friel, Sr. |
| D438,383 | S | 3/2001 | Doat | 2002/0073851 A1 | 6/2002 | Chung et al. |
| 6,196,113 | B1 | 3/2001 | Yung | 2002/0113053 A1 | 8/2002 | Nguyen et al. |
| 6,205,910 | B1 | 3/2001 | Vaughn | 2002/0190053 A1 | 12/2002 | Garber et al. |
| 6,205,911 | B1 | 3/2001 | Ochoa | 2003/0075052 A1 | 4/2003 | Saunders et al. |
| 6,240,834 | B1 | 6/2001 | Chen et al. | 2003/0106436 A1 | 6/2003 | Ancona et al. |
| 6,244,166 | B1 | 6/2001 | Lebron | 2003/0196559 A1 | 10/2003 | Friel, Sr. |
| 6,250,212 | B1 | 6/2001 | Yeung et al. | 2004/0027248 A1 | 2/2004 | Lile |
| D444,341 | S | 7/2001 | Shine et al. | | | |
| D445,663 | S | 7/2001 | Chen | FOREIGN PATENT DOCUMENTS | | |
| 6,267,044 | B1 * | 7/2001 | Friel, Sr. ................... 99/327 | DE | 21 52 927 | 4/1973 |
| D446,417 | S | 8/2001 | Mauch | DE | 30 48 173 | 7/1982 |
| 6,272,975 | B1 | 8/2001 | Usherovich | DE | 42 43 994 | 6/1994 |
| 6,305,273 | B1 | 10/2001 | Sherman | EP | 0 115 577 | 8/1984 |
| D450,975 | S | 11/2001 | Aeschbacher | EP | 0 034 463 | 11/1984 |
| 6,311,608 | B1 | 11/2001 | Hardin et al. | EP | 0 187 492 | 7/1986 |
| 6,311,609 | B1 | 11/2001 | Dotan | EP | 0 276 089 | 7/1988 |
| D452,795 | S | 1/2002 | Johnson et al. | EP | 0 276 916 | 8/1988 |
| 6,341,554 | B2 | 1/2002 | Thiriat | EP | 0 312 640 | 4/1989 |
| D453,281 | S | 2/2002 | Plumtre et al. | EP | 0 455 477 | 11/1991 |
| 6,343,543 | B1 | 2/2002 | Belknap et al. | EP | 0 534 128 | 3/1993 |
| 6,357,343 | B1 | 3/2002 | Tomsich et al. | EP | 2 759 276 | 8/1998 |
| 6,380,520 | B1 | 4/2002 | Nguyen | EP | 0 901 767 | 3/1999 |
| 6,382,084 | B2 | 5/2002 | Chan et al. | EP | 1 055 387 | 11/2000 |
| 6,397,732 | B1 | 6/2002 | Jenkins | EP | 1 057 439 | 12/2000 |
| D460,655 | S | 7/2002 | Piret | EP | 1 323 367 | 7/2003 |
| 6,415,709 | B1 | 7/2002 | Jackson | FR | 2 035 965 | 9/1970 |
| 6,425,319 | B1 | 7/2002 | Wu | FR | 2 419 706 | 10/1979 |
| D461,088 | S | 8/2002 | Cheah et al. | GB | 1 125 184 | 8/1968 |
| D461,089 | S | 8/2002 | Cheah et al. | GB | 1285491 | 8/1972 |
| 6,427,581 | B1 | 8/2002 | Wu | GB | 1 552 878 | 9/1979 |
| 6,429,407 | B1 | 8/2002 | Garber et al. | GB | 2 133 281 | 7/1984 |
| 6,431,057 | B1 | 8/2002 | Leung et al. | GB | 2 193 086 | 2/1988 |
| 6,481,341 | B1 | 11/2002 | Choi | GB | 2 199 733 | 7/1988 |
| D469,297 | S | 1/2003 | Bouhuys et al. | GB | 2 303 054 | 2/1997 |
| 6,502,502 | B1 | 1/2003 | Sutton et al. | JP | 63-118533 | 5/1988 |
| 6,511,692 | B2 | 1/2003 | Tomsich et al. | JP | 64-52416 | 2/1989 |
| D470,355 | S | 2/2003 | Xie et al. | JP | 21-72421 | 7/1990 |
| 6,523,458 | B1 | 2/2003 | Turner | JP | 3-51017 | 3/1991 |
| 6,530,309 | B2 * | 3/2003 | Van Der Meer et al. ..... 99/331 | | | |

| | | |
|---|---|---|
| JP | 32-71630 | 12/1991 |
| JP | 4-92616 | 3/1992 |
| JP | 61-54102 | 6/1994 |
| JP | 7-204105 | 8/1995 |
| JP | 82-0700 | 8/1996 |
| JP | 9-75235 | 3/1997 |
| WO | WO 88/5279 | 7/1988 |
| WO | WO 91/00043 | 1/1991 |
| WO | WO 97/9916 | 3/1997 |
| WO | WO 88/00808 | 2/1998 |
| WO | WO 98/43520 | 10/1998 |
| WO | WO 99/3386 | 1/1999 |
| WO | WO 02/09189 | 11/2002 |

OTHER PUBLICATIONS

T-Fal Toaster Model Avante Deluxe 2 & 4 Slice Toasters User Manual and Images.

KitchenAid Model KPTT890 & KPTT780 Guide to Profession Results.

KitchenAid Pro Line Series 2 & 4 Slice Toasters.

T-Fal Avante Elite 2 Slice Toaster TF #610.

Philips Toaster HD 2528.

Cuisinart Toaster Directory.

Hongking Product Guide.

Krups 2-Slice Toaster FEM2.

Hamilton Beach 24559 4 Slice Classic Chrome.

Philips Toaster (ebay ad).

T-Fal TT8460002 Avante Elite (Amazon.com ad).

Black & Decker T4400 / DeLonghi CKT83 Hamilton Beach 24505 (Amazon.com ad).

Cuisinart Compact 4 Slice Wide Slot Toaster (ebay ad).

* cited by examiner

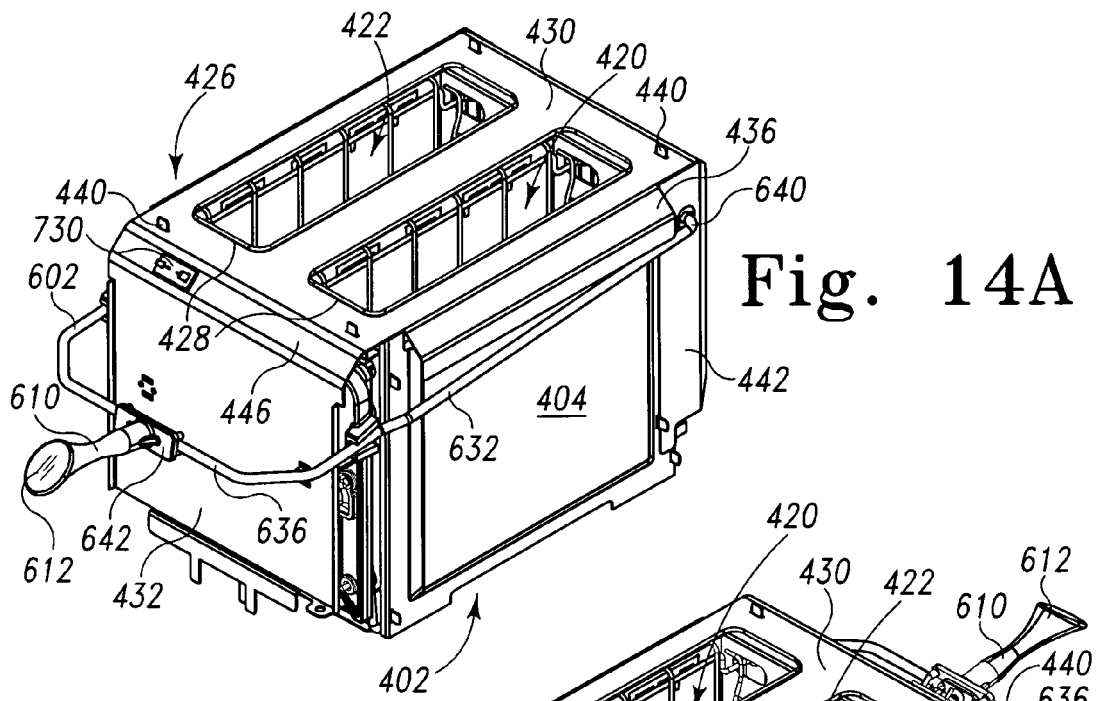
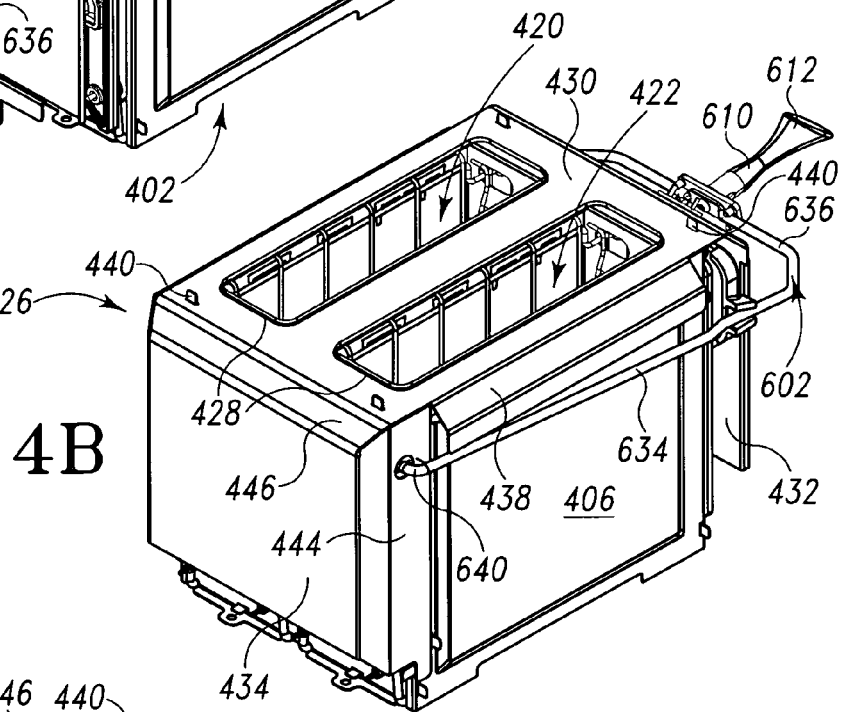

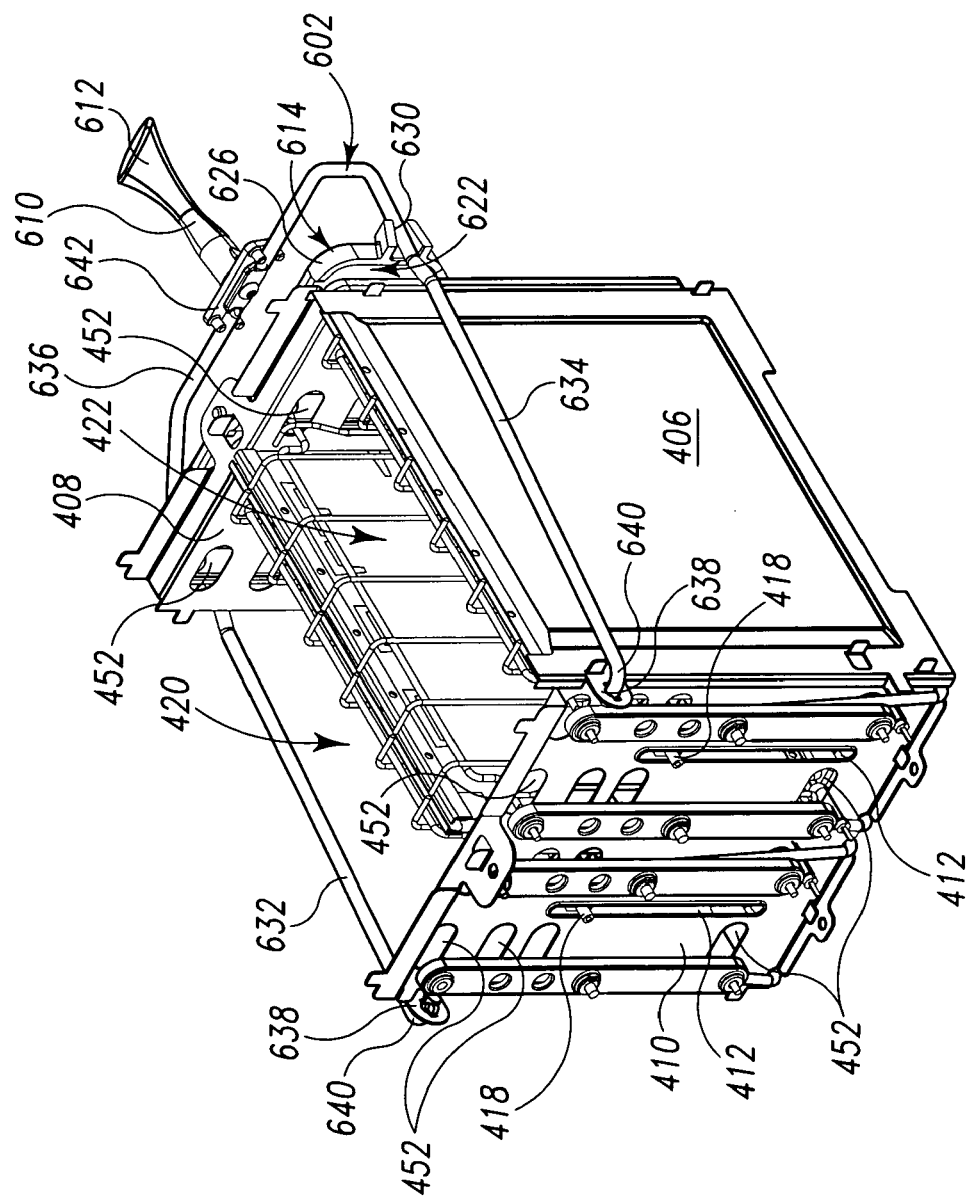

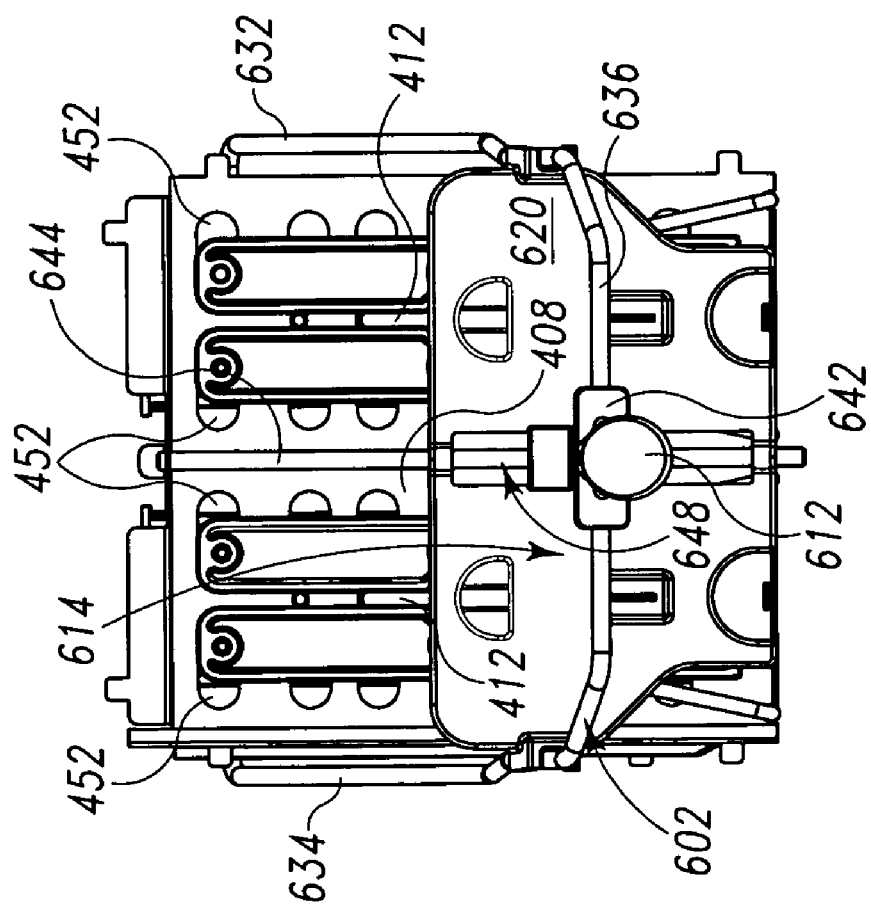

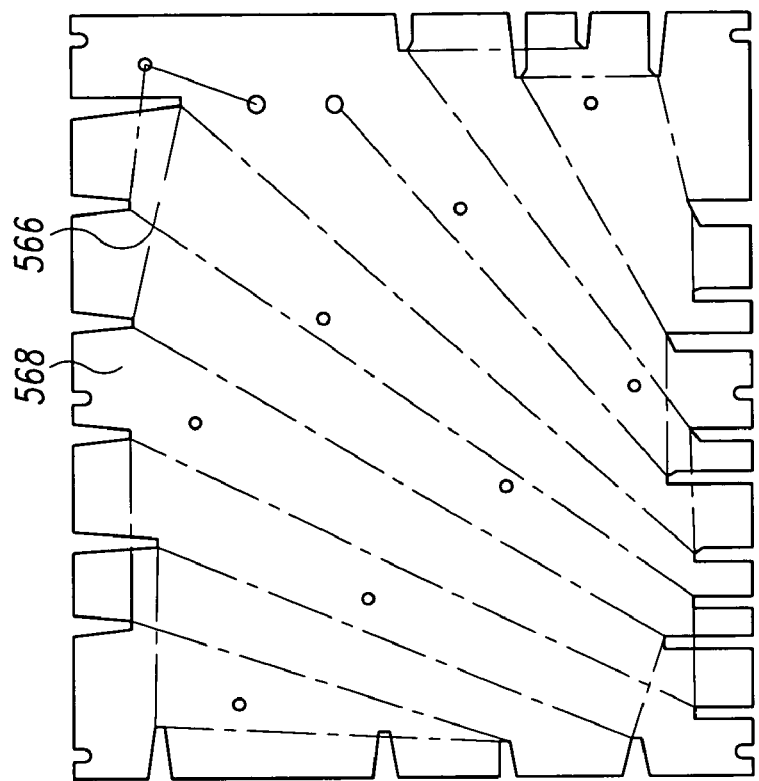
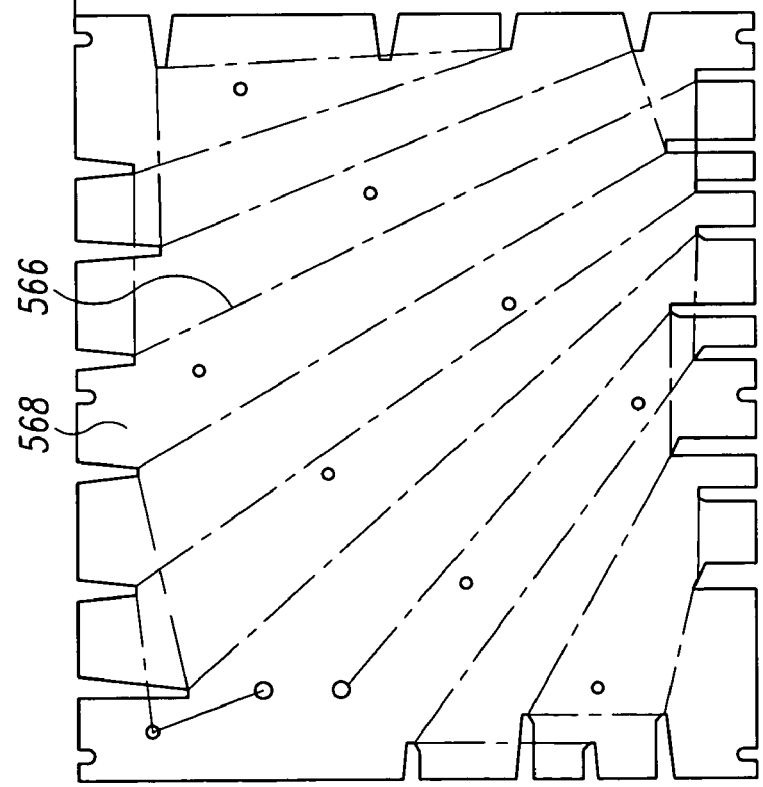

TOASTER

This application claims the benefit of related U.S. Provisional Application Ser. No. 60/554,477, filed on Mar. 19, 2004, which application is hereby incorporated by reference.

FIELD OF INVENTION

This invention relates to a toaster. More particularly, this invention relates to a toasting device providing optimum toasting capabilities for the heating of food products, and a means of permitting user design capabilities for such a device.

BACKGROUND

Apparatuses for toasting bread and the like are appliances which have long been known. The toasting of the bread product typically takes place by the application of heat to heating elements which are positioned on either side of a toasting space. Bread is typically placed in a moveable carriage and is manually lowered between the planar heating elements against the bias of a spring. A locking mechanism generally holds the carriage in this position for a preselected period of time until the bread has reached the desired degree of brownness. In many instances, the lowering of the bread product into the heating chamber activates the heating elements. A means, such as a bimetallic sensor, often serves to detect heat and activate a circuit to release the latching mechanism and permit the carriage to move to an upper non-toasting position. The user can typically control the heating cycle by use of a potentiometer toast shade control that varies the time of the toasting cycle to correspond with the degree of brownness selected. When the carriage is moved to the upper position, the heating elements are de-energized.

Some toasters have only one bread support arm on the moveable carriage while others have two or more support arms. Wire grills are often located on the side of each bread support to prevent food items being toasted from engaging the heating elements. In some devices, these wire grills may move away from the stationary heating elements to engage the food item as the food is lowered into the toasting chamber.

Conventional toasters typically employ a pair of fixed, spaced heating elements which include a resistance wire mounted on or wrapped around planar insulating sheets, or alternatively some devices use coiled resisters mounted to form a zigzag pattern. Reflectors may be mounted to direct the radiant heat toward the bread surface.

The drawback of many such toasting devices is that it has not been possible to convey optimum toasting conditions on the bread product, the result of which is typically burned, over-heated, over-dried, or undercooked bread product requiring the user to run additional toasting cycles and closely monitor same for appropriate heating. Furthermore, the heating chambers and operational components of a toaster are typically housed in a single uniform toaster housing molded in the desired shape. Generally, molded toaster housings are made of a metal or durable plastic, and are limited in color and surface appearance selection.

Accordingly, what is needed in the art is a toaster having optimum toasting capabilities that also provides the user with a means of changing the design and appearance of the device.

SUMMARY OF THE INVENTION

The invention is directed to a toaster comprising a base which may be interchangeable or integral with the toaster unit, an angled heating chamber having a manually moveable heating element, centering carriage, and toast lift that optimizes the distance between the heating elements and the bread product, an angled top for viewing the bread product within the heating chamber, and including a user control interface on the top surface of the angled top for control of the toasting cycle.

BRIEF DESCRIPTION OF THE DRAWINGS

The invention will now be described, by way of example, with reference to the attached drawings, of which:

FIGS. 14A through C are views of the heating chamber and carriage assembly of an embodiment of the present invention having a heat shield thereon.

FIG. 15B is cut-away rear perspective view of the embodiment shown in FIG. 15A.

FIG. 16A is a front elevational view of an embodiment of the heating chamber and associated assemblies of the present invention having the carriage assembly in a lowered position.

FIGS. 26A and B are views of opposing sides of the heating element card and attached resistance wire in a preferred embodiment of the present invention.

DETAILED DESCRIPTION OF PREFERRED EMBODIMENTS

Figure 1:
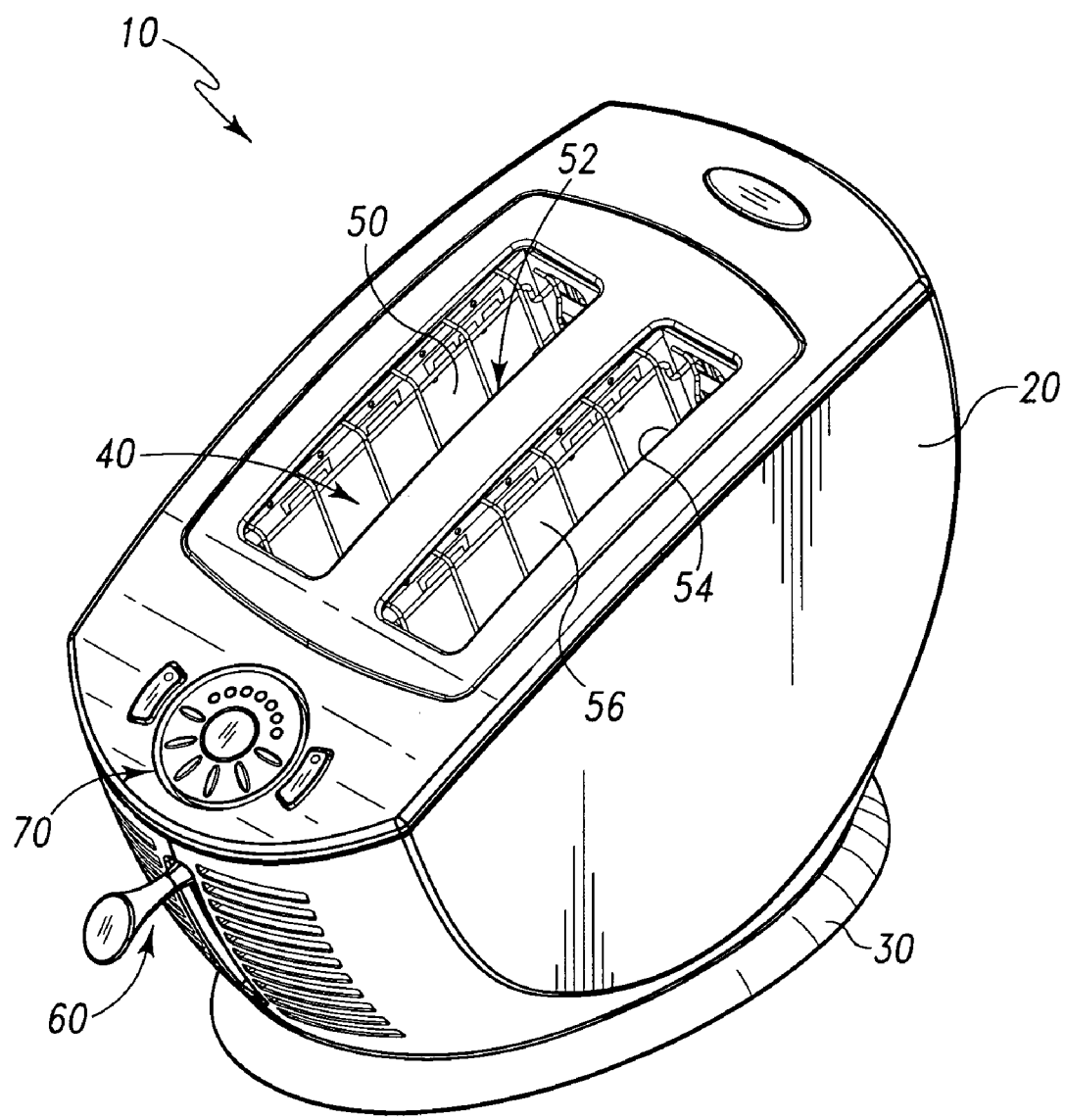
FIG. 1 is a perspective view of the toaster of the present invention.
Figure 2:
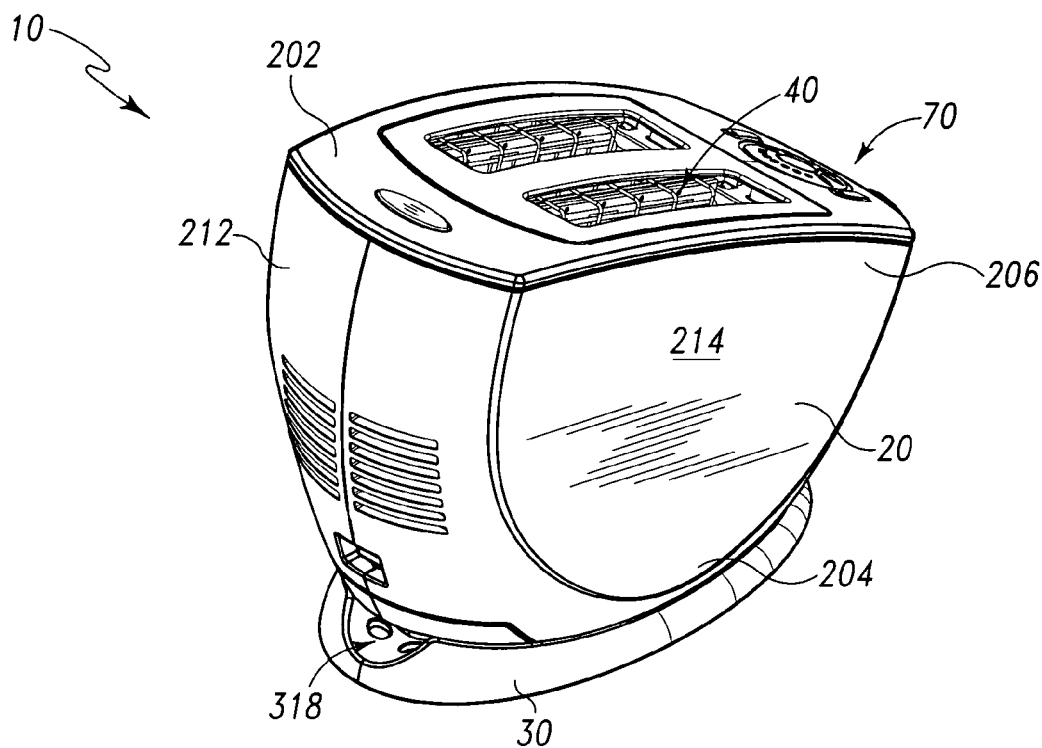
FIG. 2 is a rear perspective view of the toaster of the present invention.
Figure 3:
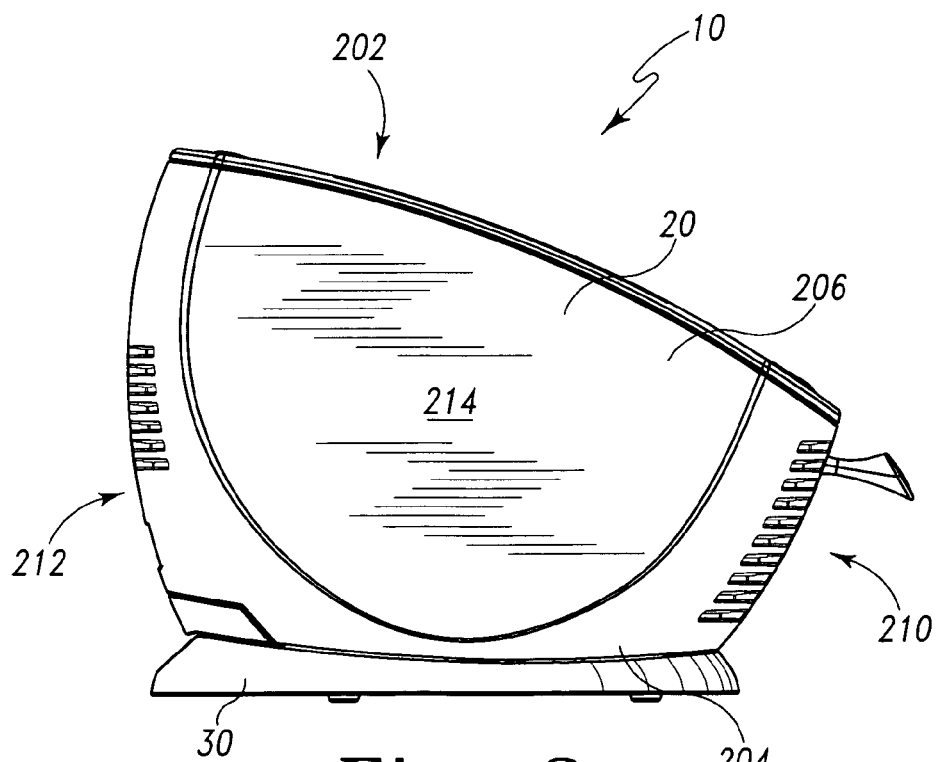
FIG. 3 is a side elevational view of the toaster of the present invention.
Figure 4:
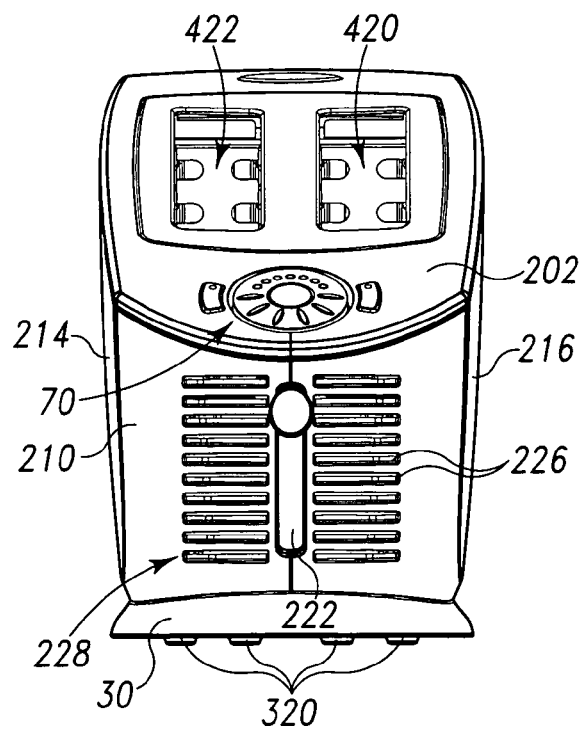
FIG. 4 is a front elevational view of the toaster of the present invention.
Figure 5:
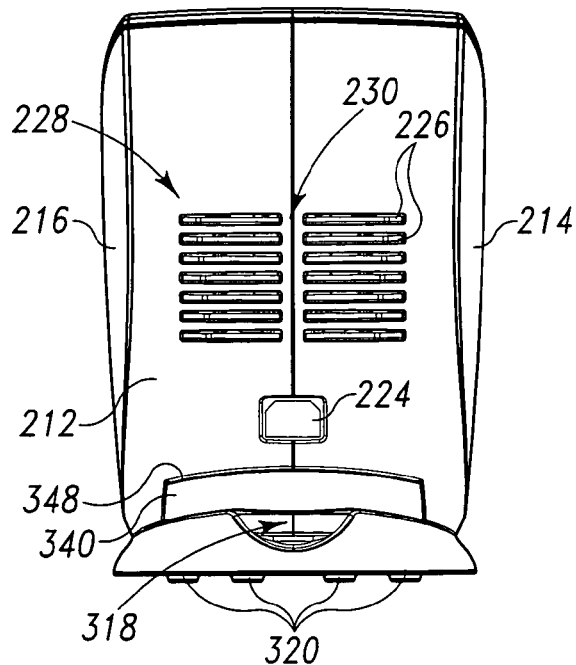
FIG. 5 is a rear elevational view of the toaster of the present invention.
Figure 6:
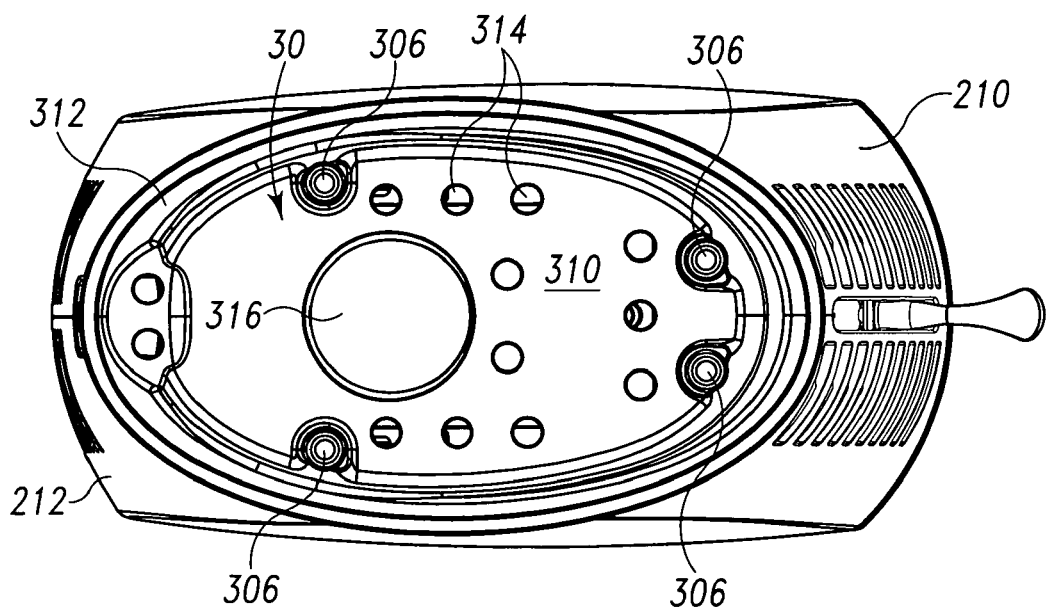
FIG. 6 is a bottom plan view of the toaster of the present invention.
Figure 7:
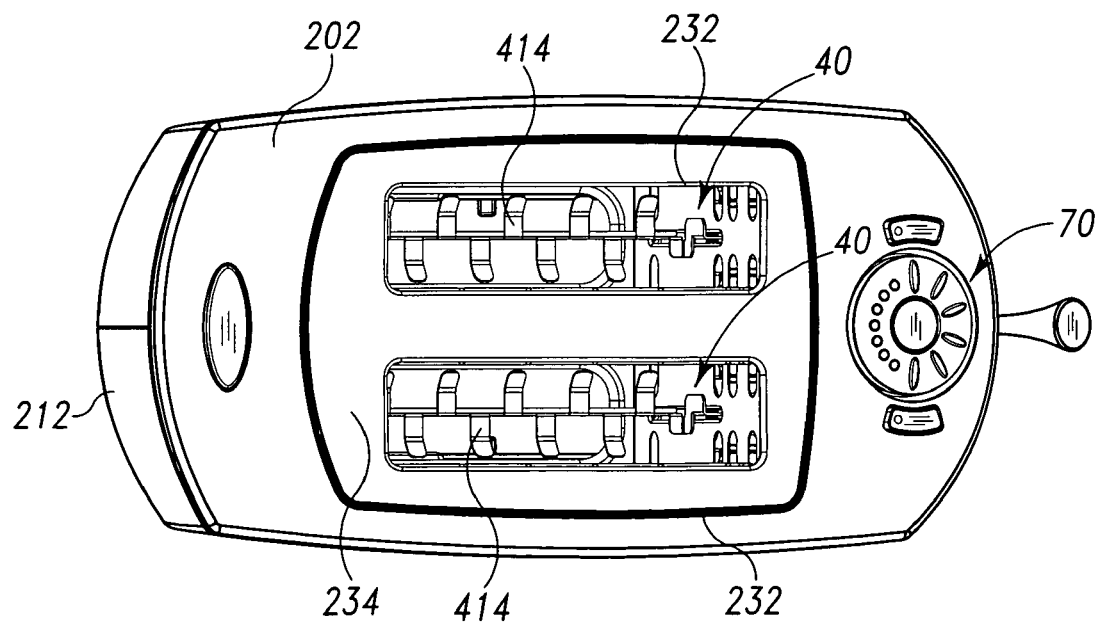
FIG. 7 is top plan view of the toaster of the present invention.
Figure 8:
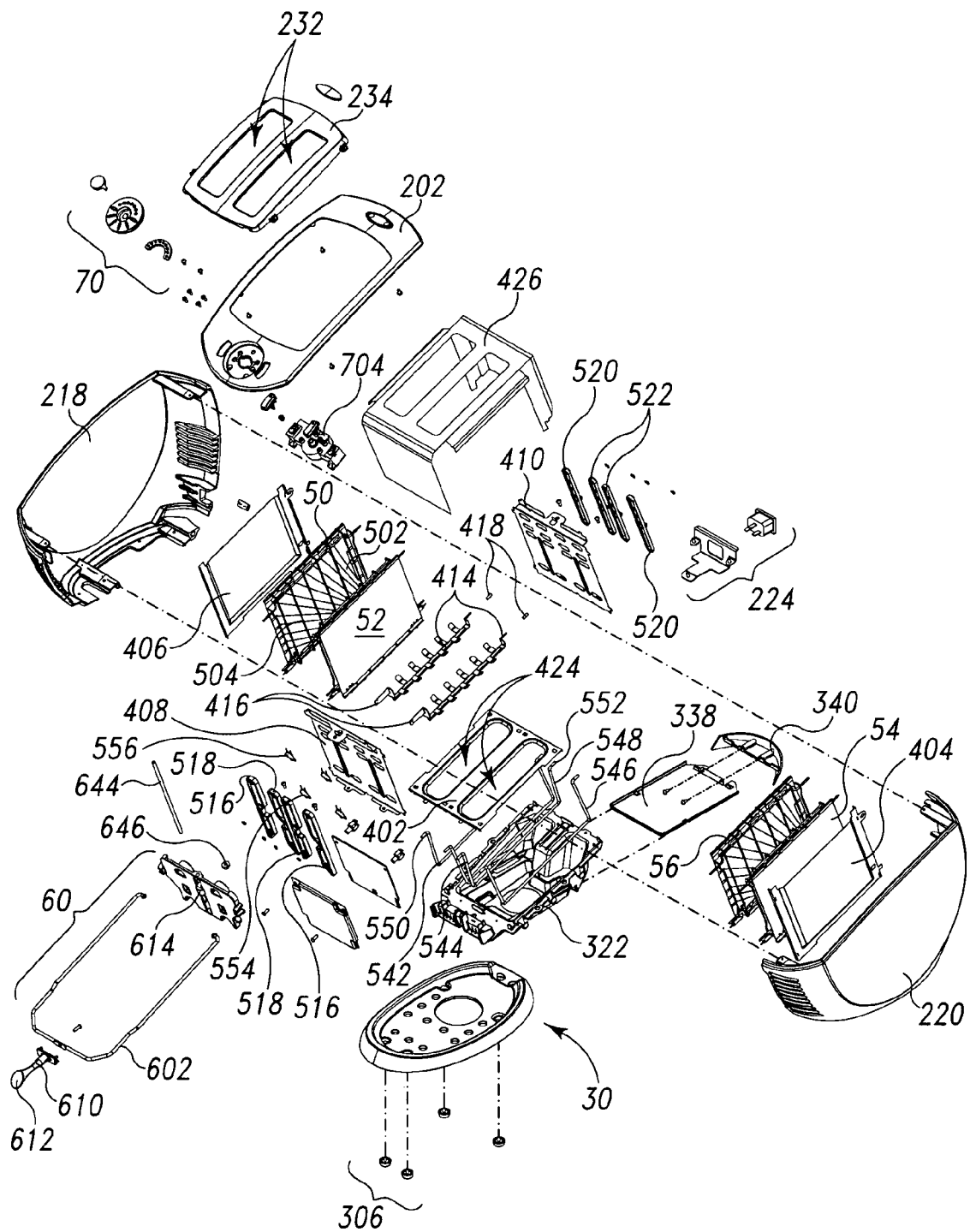
FIG. 8 is an exploded view of the toaster of the present invention.
Figure 9:
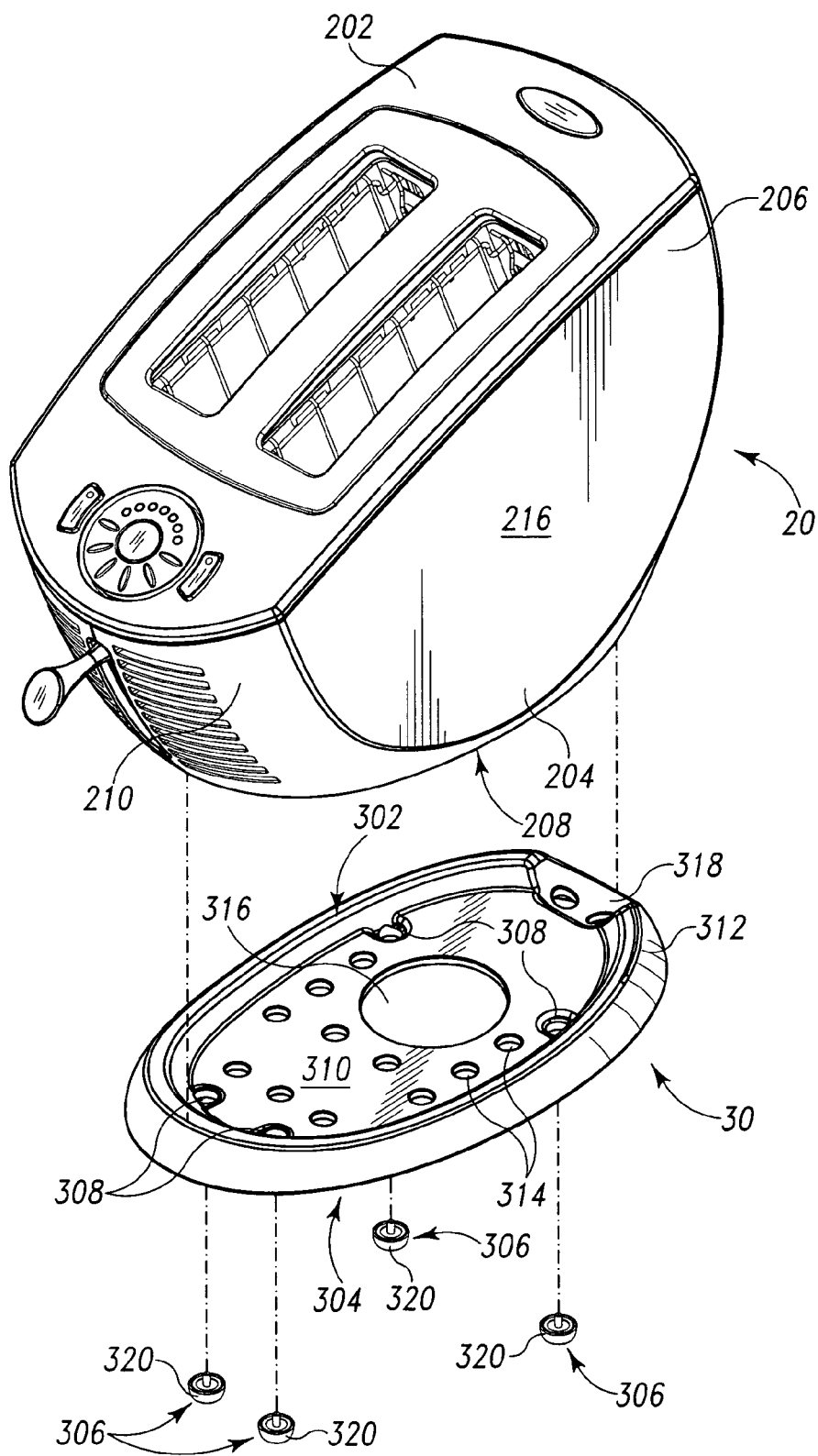
FIG. 9 is a partial exploded view of the toaster reflecting the separation of the base from the toaster housing or body in an embodiment of the present invention.
Figure 10:
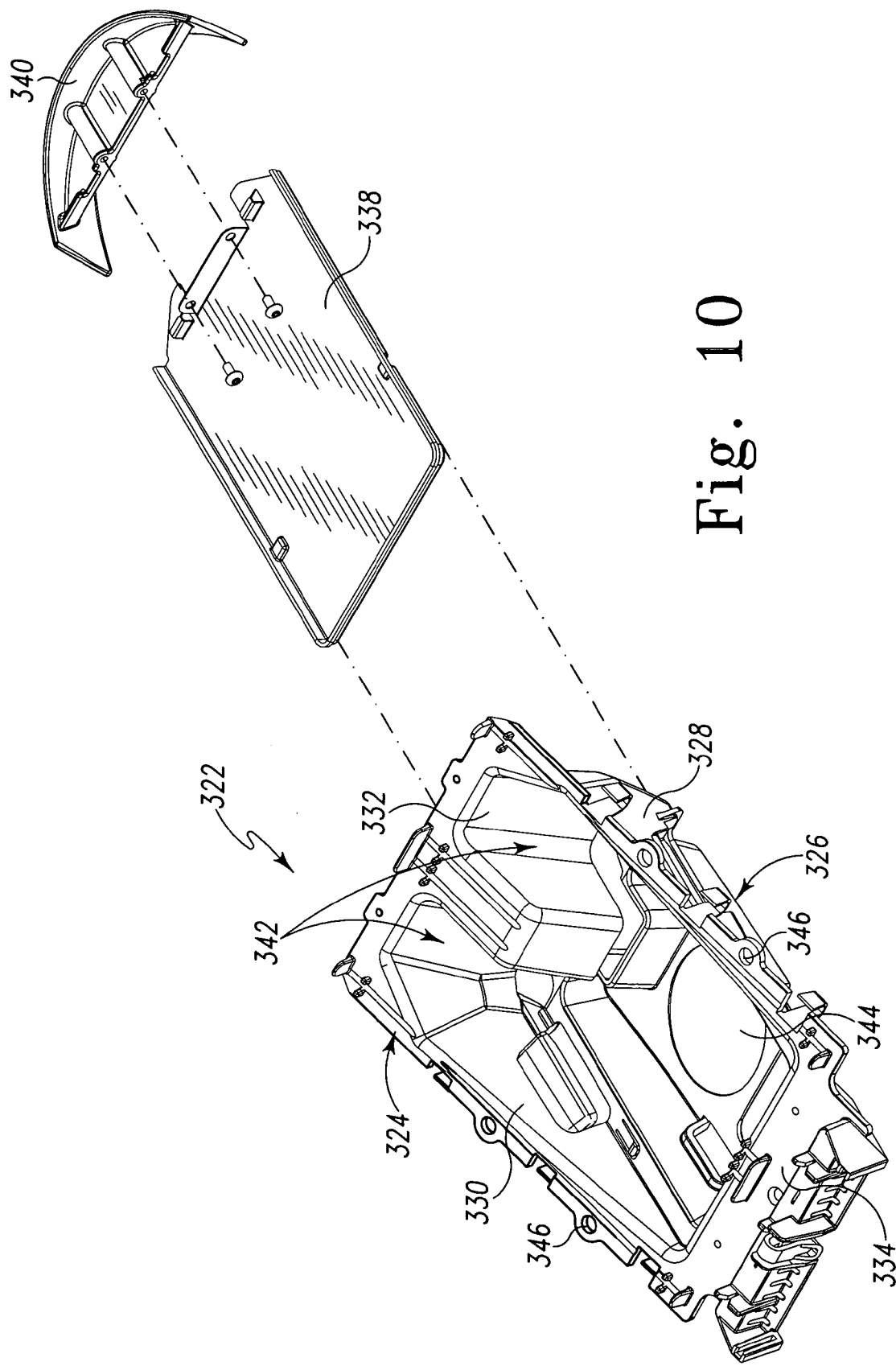
FIG. 10 is a partial exploded view of the base chamber and crumb tray of an embodiment of the toaster of the present invention.
Figure 11:
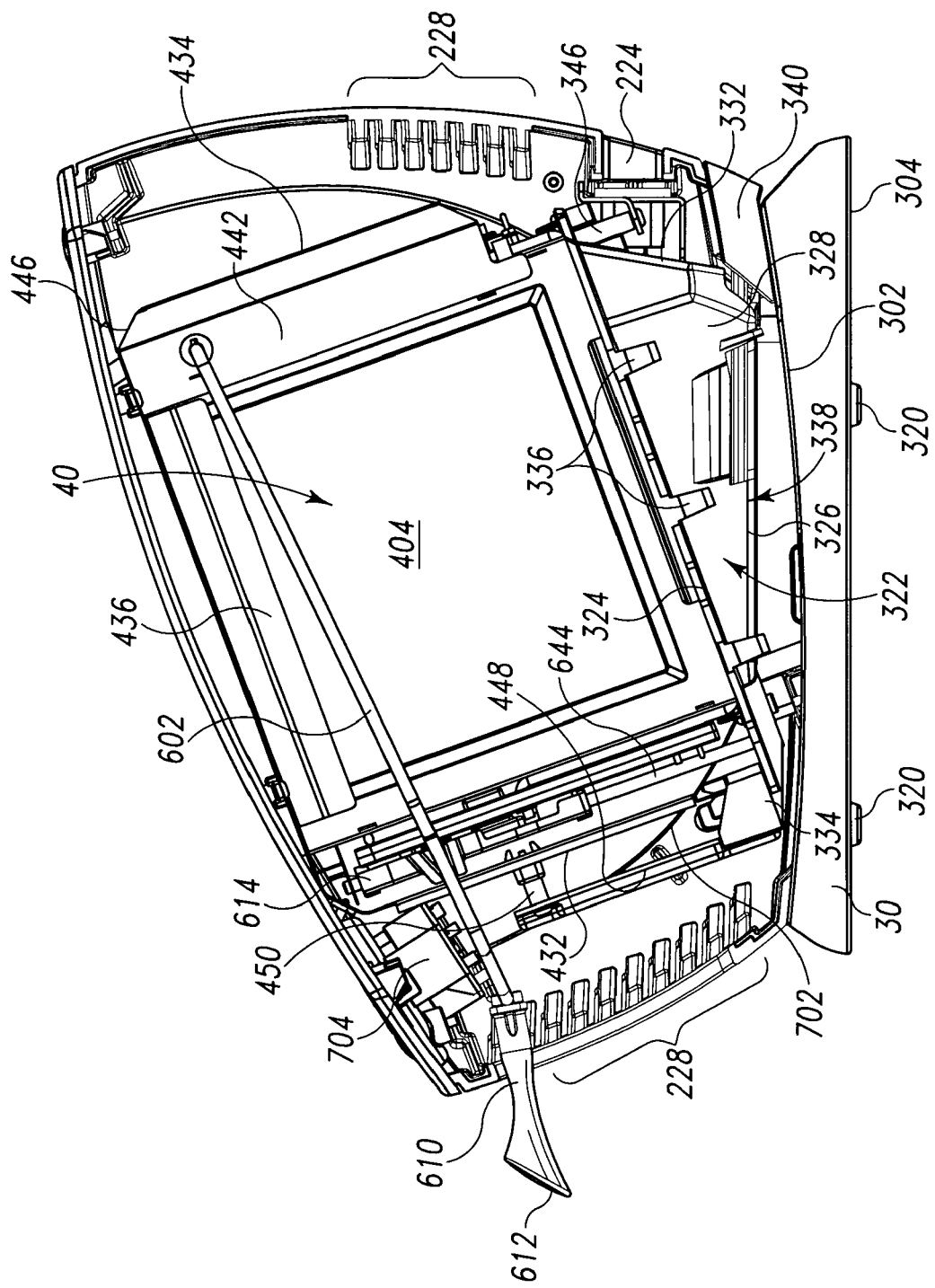
FIG. 11 is a cut-away side elevational view of an embodiment of the toaster of the present invention.
Figure 12:
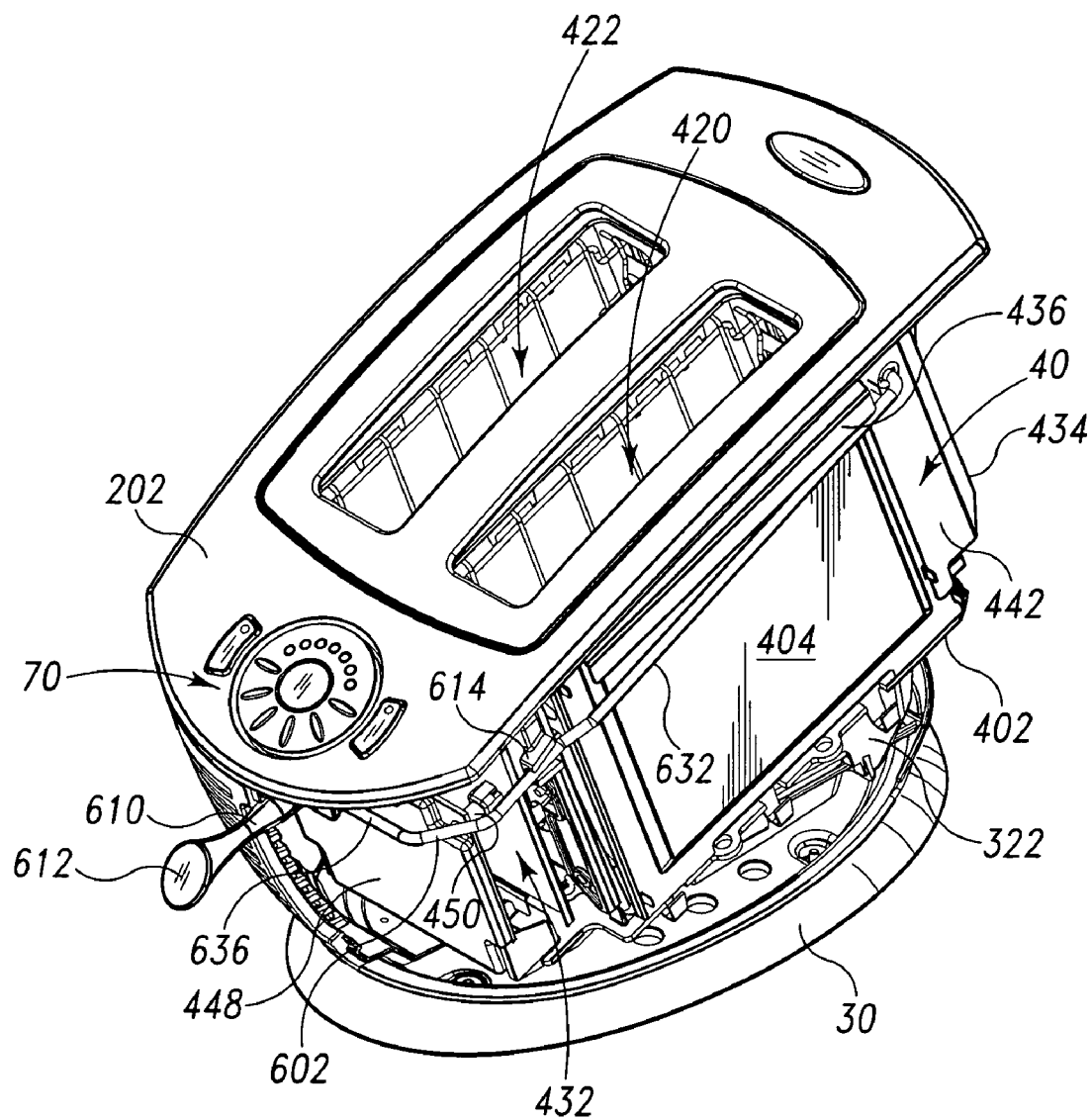
FIG. 12 is a cut-away perspective view of an embodiment of the toaster of the present invention.
Figure 13:
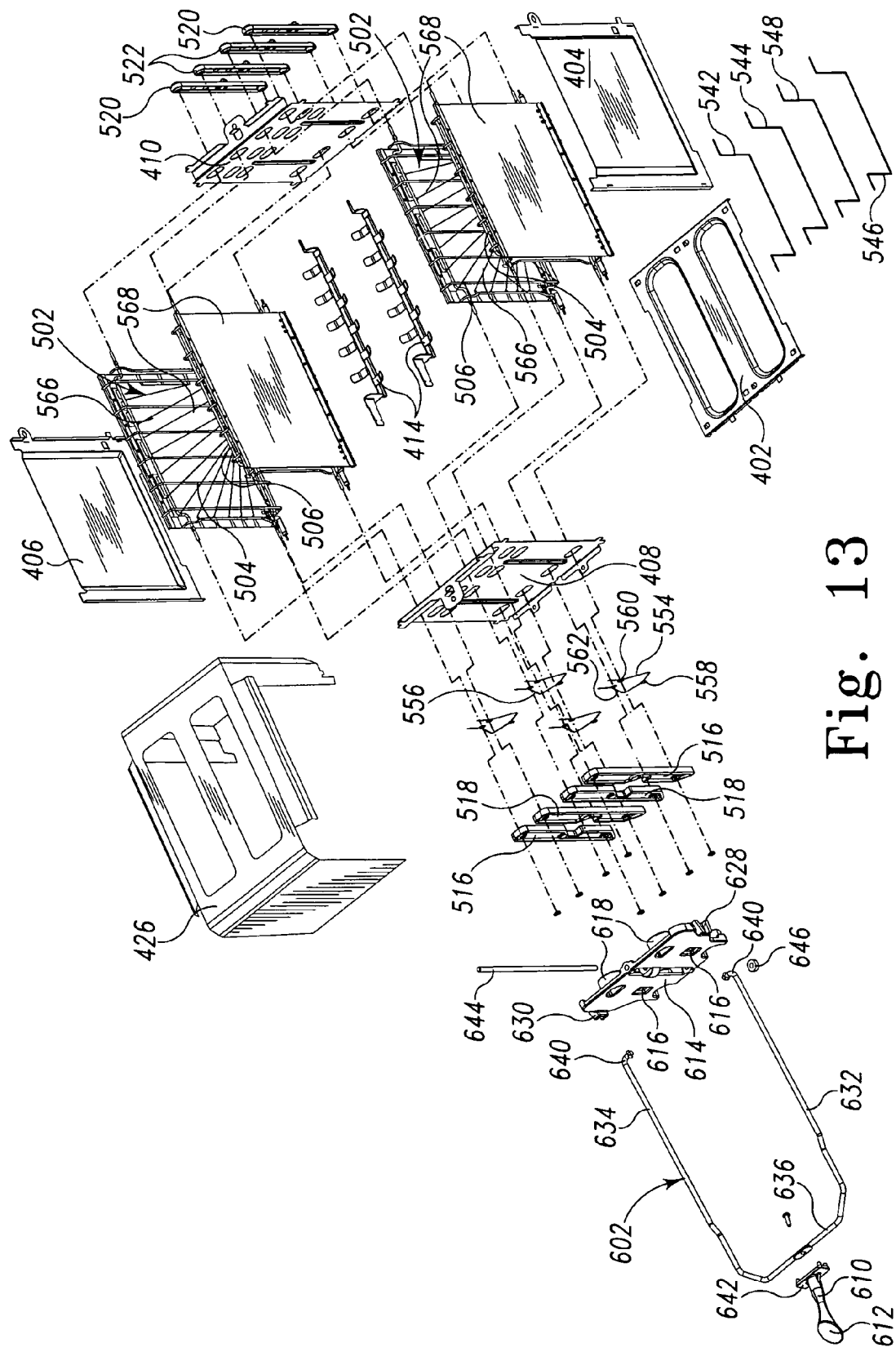
FIG. 13 is an exploded view of an embodiment of the heating chamber and associated assemblies of the present invention.
Figure 15A:
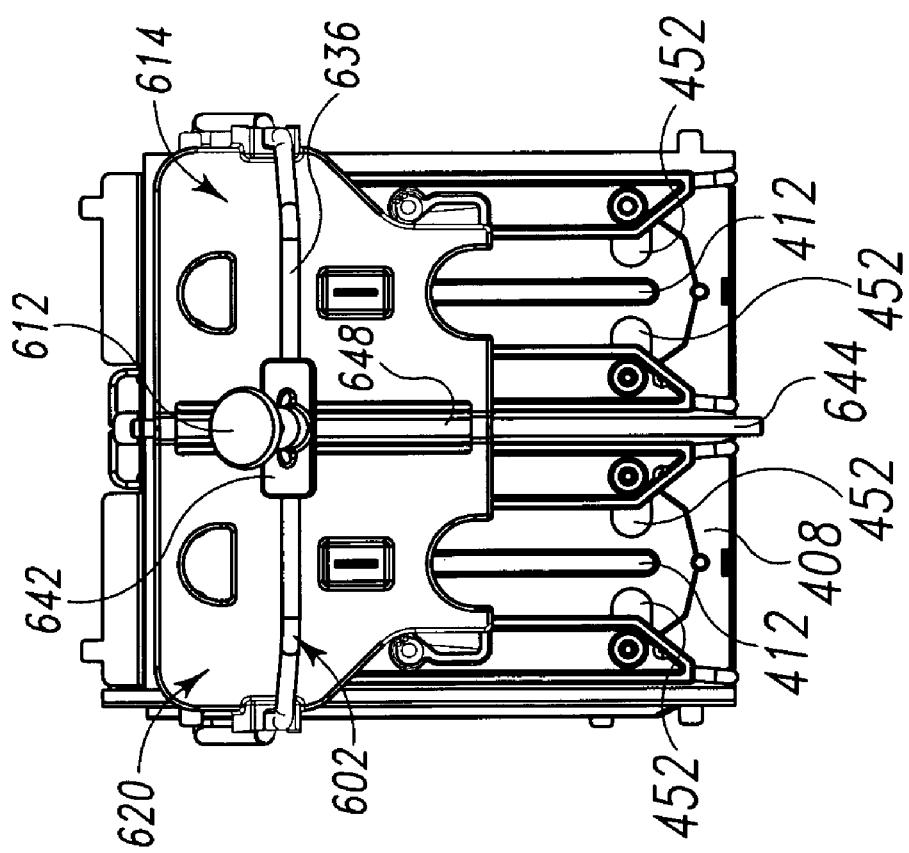
FIG. 15A is a front elevational view of an embodiment of the heating chamber and associated assemblies of the present invention having the carriage assembly in a raised position.
Figure 15C:
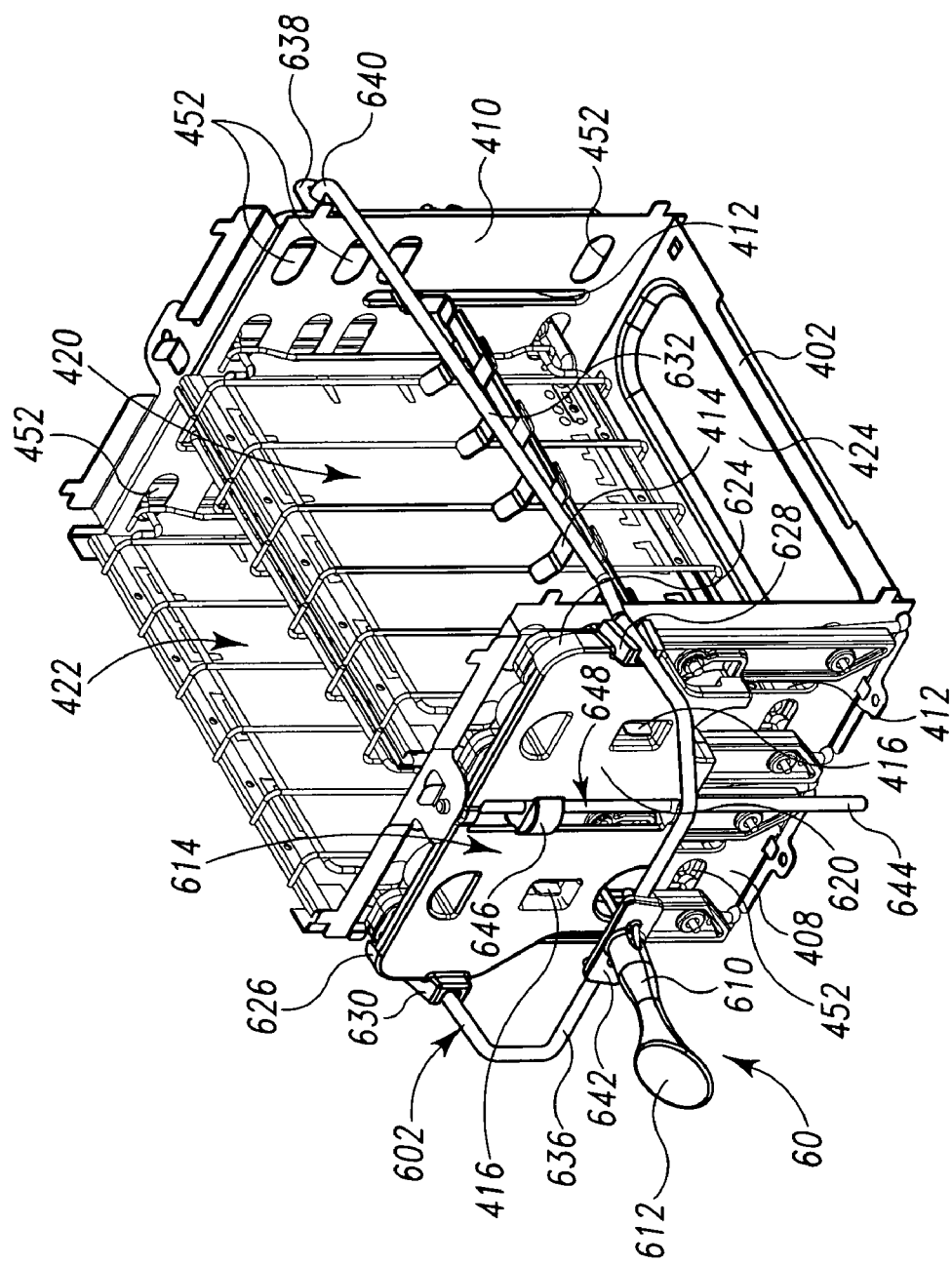
FIG. 15C is cut-away front perspective view of an alternative embodiment of the heating chamber and associated assemblies of the present invention having the carriage assembly in a raised position.
Figure 15D:
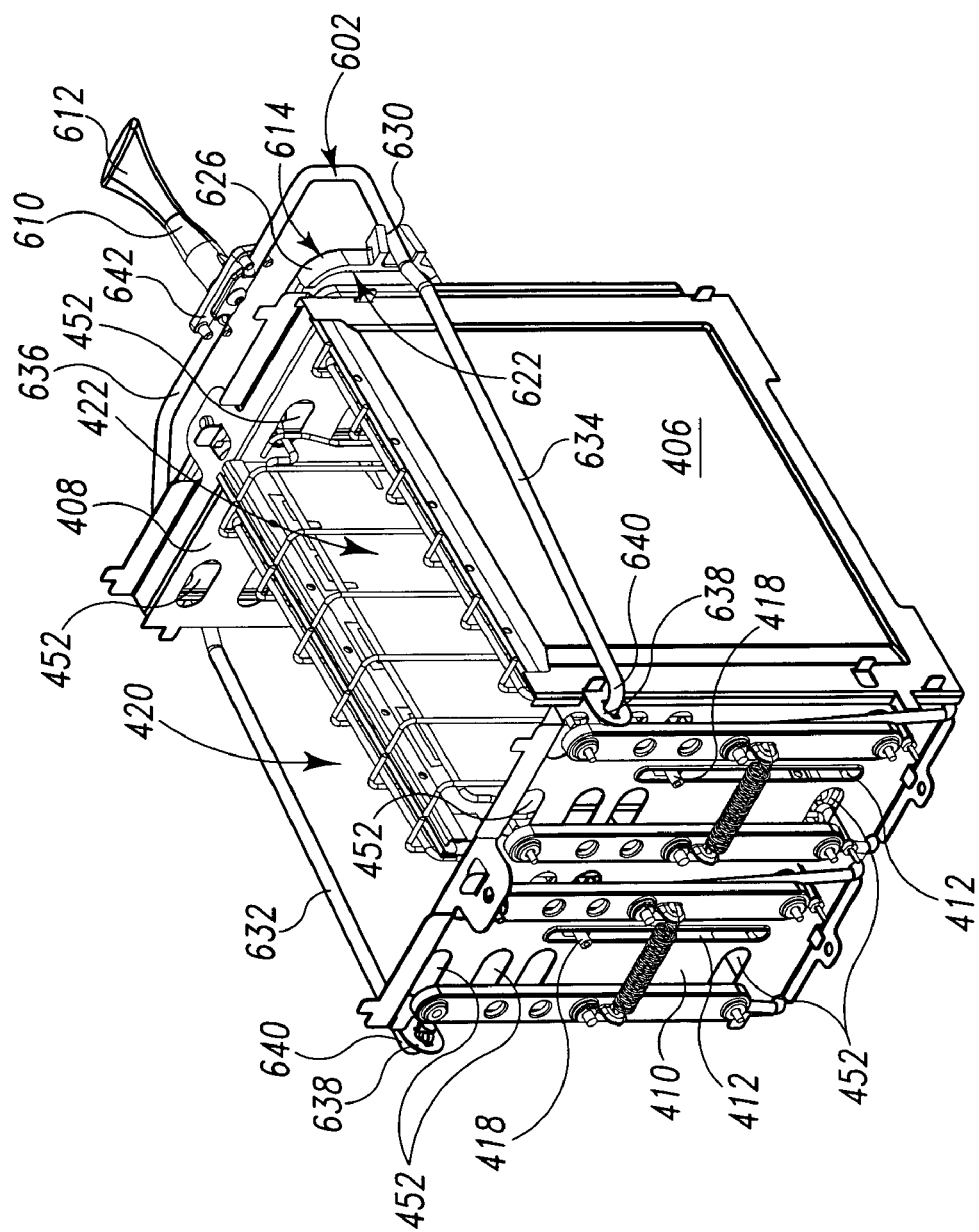
FIG. 15D is cut-away rear perspective view of the embodiment shown in FIG. 15C.
Figure 16B:
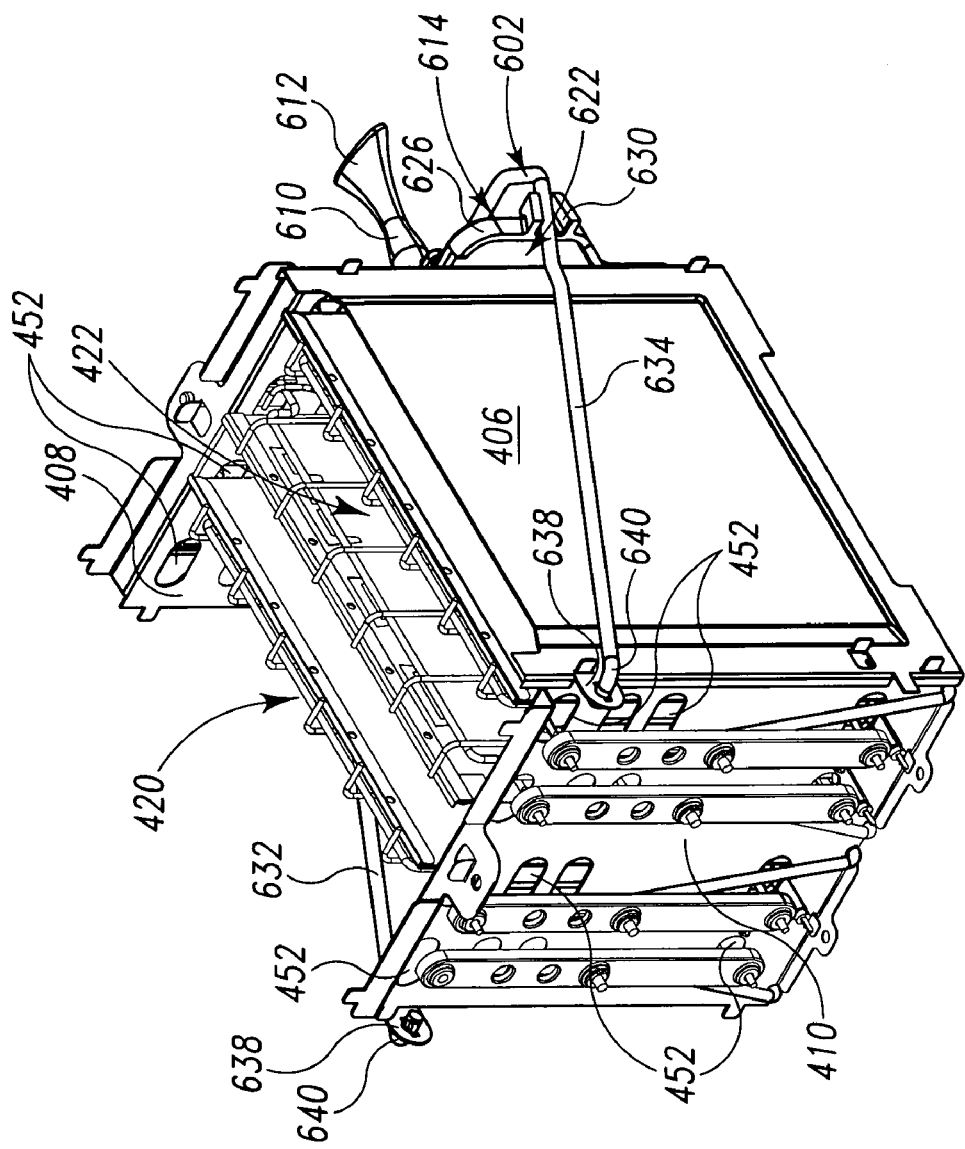
FIG. 16B is cut-away rear perspective view of the embodiment shown in FIG. 16A.
Figure 16C:
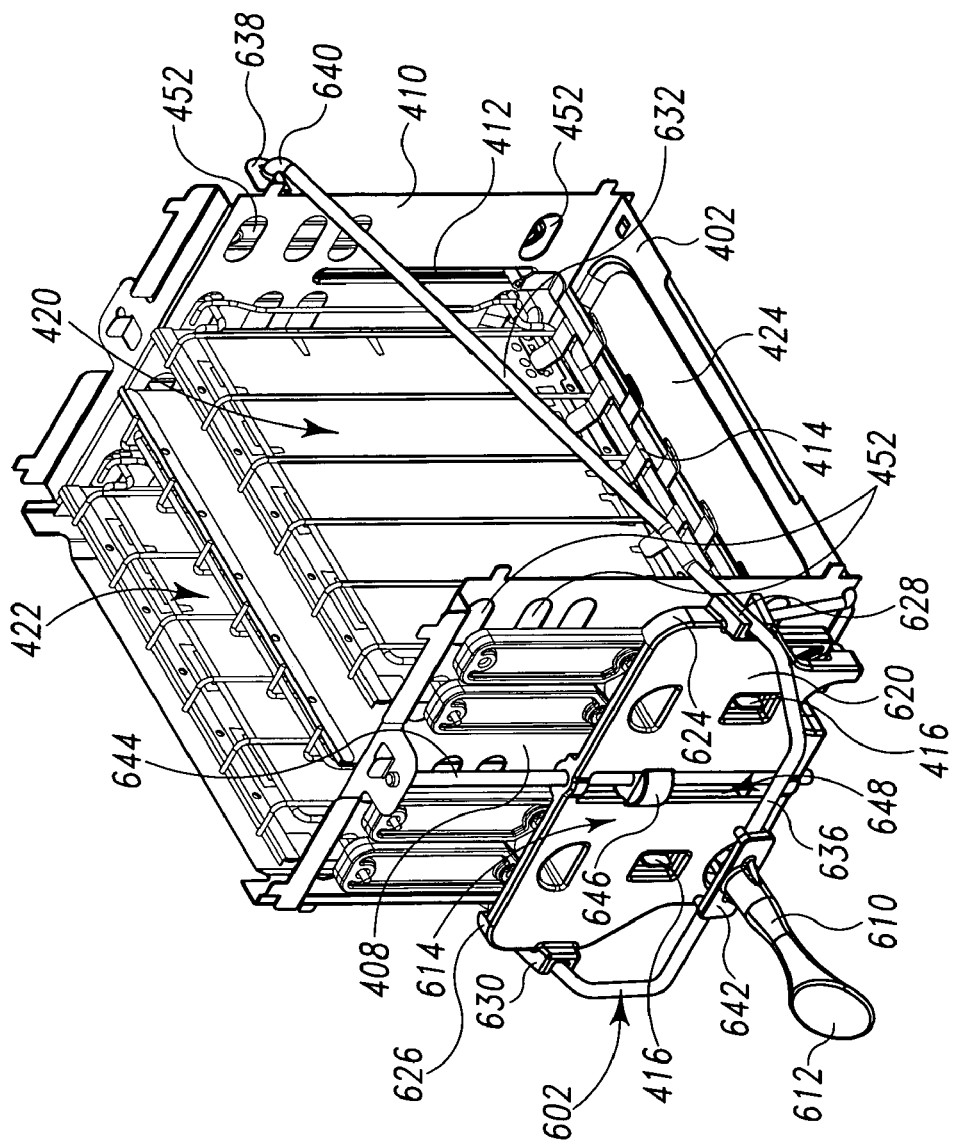
FIG. 16C is cut-away front perspective view of an alternative embodiment of the heating chamber and associated assemblies of the present invention having the carriage assembly in a lowered position.
Figure 16D:
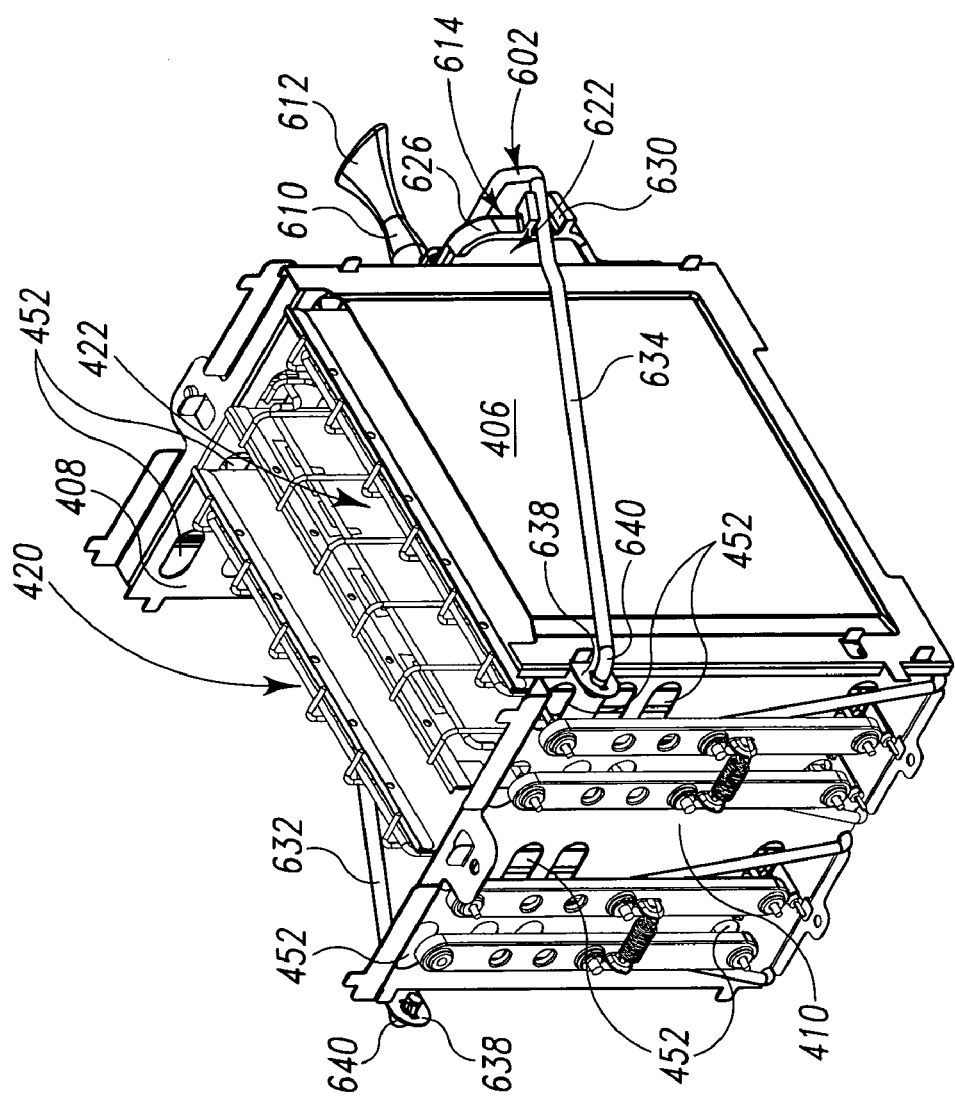
FIG. 16D is cut-away rear perspective view of the embodiment shown in FIG. 16C.

FIGS. 1 and 8 present a perspective and exploded view of a toaster 10 embodying the present invention and illustrating the principal components and sub-assemblies thereof. The toaster 10 comprises a housing 20 that rests upon a base 30 and within or upon which all other components or sub-assemblies are carried as best illustrated in FIG. 8. Namely, the toaster 10 comprises a base 30 which may be interchangeable or integral with the toaster body or housing 20. Specific details of the base 30 are further shown and illustrated in FIGS. 6 and 9-12. Supported above the base 30 within the housing 20, is an angled heating chamber 40. Specific details of the heating chamber 40 are further shown and illustrated in FIGS. 11-16D. Supported for movement within the heating chamber 40 are heating element assemblies 50, 52, 54, 56 the specific details of which are shown in FIGS. 13, 17A-20B. A carriage assembly 60 is movably attached near the heating chamber 40 which manually raises and lowers bread platforms 414 supported within the heating chamber 40 and cooperates with the heating element assemblies 50 for movement thereof. Specific details of the carriage assembly 60 are further illustrated and shown in FIGS. 13-16D and 19. On the top 202 of the toaster housing 20, a toaster control interface 70 is provided for control of functions and modes of the toaster 10. Specific details of the toaster control interface 70 are illustrated and shown in FIGS. 21-25.

Preferably, the movement of the moveable heating element assemblies within the angled heating chamber 40, which move in connection with the manual lowering and raising of the carriage assembly 60, results in centering and optimizing the distance between the heating elements 502 and the bread product, and provides a means by which the user may precisely control operation of the toaster 10 through the toaster control interface 70. Further, such features are maintained within a housing 20 and supported by an interchangeable or removable base 30. Specific details of the various features and sub-assemblies are shown in the drawings and discussed in further detail herein below.

For ease of reference, the invention disclosed is a toaster 10 configuration having two bread platforms 414 and associated slots and heating chambers, as this is typically the most common commercial configuration. However, as will become apparent, the aspects of the invention described herein may be used in other toaster configurations, including but not limited to, one, two, three, four, or more bread platforms, slots, bread product receiving sections, and/or heating chambers.

Referring now to FIGS. 1-8, the housing assembly 20, which surrounds the operational elements for conducting a toasting cycle, will be further described.

The toaster 10 of the present invention comprises an angled cross section, and therefore has a top 202 or top face which is maintained at an angle permitting easy viewing of the bread product within the heating chamber 40 contained below the top 202. In addition, as will be seen, a user control interface 70 is provided on the top surface 202 of the angled top for control of the toasting cycle(s) and the modes of the toaster, which can be easily viewed in connection with the view of the bread product enabled by the angled cross section of the toaster 10.

As will be discussed in further detail herein, at the top of the heating chamber 40 is a heat shield 426 protecting the user from any excessive heat that may be generated by the toasting of a bread product, and avoiding damage to any toaster components that may be caused by such heat. Above the heating chamber 40 and heat shield 426, a toaster top 202 may be provided which is preferably composed of the same material as the housing 20, and is flush within the housing 20, creating a uniform appearance for the device. The toaster top 202 may be fastened to the toaster housing 20 by means of speed clips, screws, friction fit, and the like. The toaster top 202 or top face may comprise a inner housing section 234 within the top housing 202, that when removed forms an opening in the top 202 that exposes the heat shield top 430 or the top of the heating chamber 40, which may have toast receiving slots 428. It is also contemplated that the toaster 10 may be operated in absence of the inner housing section 234. In this configuration, excess heat generated during the toasting or heating process may be allowed to escape from the heating chamber 40 through the opening in the top 202 caused by the removal of the inner housing section 234. In a preferred embodiment the inner housing section 234 is provided in connection with the toaster housing top 202, and comprises toast receiving slots 232. While two (2) slots 232 are specifically shown, the toaster top 202 may contain one or more bread product receiving slots 232. Likewise, the top 202 may comprise a single covering having at least one toaster receiving slot. Furthermore, in the preferred embodiment, the toaster control interface 70 is located on the top 202 of the toaster 10.

The lower portion 204 of the toaster housing 20 has a narrowed cross-section as compared to the upper portion 206 of the toaster housing 20. To add stability to the toaster 10 a base 30 which is wider than the toaster housing 20 may be provided.

The toaster housing 20 is provided above the base 30. Within the toaster housing 20 is at least one heating chamber 40, as well as many of the operable components and sub-assemblies of the present invention. Preferably, the toaster housing 20 is made of a material suitable for the variations in heat that occur during repeated toasting cycles, while also providing an aesthetically pleasing appearance. Traditionally, toasters are made of metal or durable plastic materials. In a preferred embodiment, the toaster housing 20 is composed of a zinc alloy die cast material providing a durable and aesthetically attractive appearance. For ease of assembly, a toaster housing 20 is provided with at least a first half 218 and a second half 220 which are fastened together to create a single covering for the toaster's internal components. The first half 218 of the toaster housing 20 comprises at least a sidewall 214 and a partial front 210 and rear 212 wall. Likewise, the second half 220 of the toaster housing 20 comprises at least a sidewall 216 and a partial front 210 and rear 212 wall. In a preferred embodiment, and as discussed above, the toaster housing 20 forms an angular profile as can be easily seen in FIG. 3. Namely, the rear wall 212 of the toaster 10 extends above the front wall 210 of the toaster. At the front 210 of the housing 20, or on the front wall, is provided a substantially vertical slot 222 for the outward extension of the carriage lever 610. The carriage lever 610 is fastened to the carriage assembly 60 in operable connection with sub-assemblies associated with the heating chamber 40 within the housing 20, allowing user operation of the carriage assembly 60 and sub-assemblies within the housing. At the rear 212 of the toaster housing 20 an electrical connection port 224 is provided for the use of a removable power cord (not shown). While specific materials, location of features, and housing components are provided above, alternative materials, locations, and/or forms of toaster housing are contemplated by the present invention.

The toaster housing 20 may also be provided with one or more slots, apertures or openings 226 for venting the inside of the toaster 10, and in particular the heat generated from the heating chamber 40. The toaster 10 of the present invention comprises a vent system 228 that facilitates efficient, effective cooling of the toaster, and preferably comprises a means for maintaining a cool outer surface of the housing 20 and reducing or eliminating the heat which may be incurred by the toaster control interface 70 or control system and other components which sit on the top face 202 and other surfaces of the toaster housing 20 and/or outside of the heating chamber 40. Venting in one embodiment may be provided near the front 210 and/or rear 212 of the housing 20 in a plurality of slots 226 extending across the housing 20 and separated by a central divide, such as, but not limited to, the carriage lever slot 222 or a central vertical wall thickness rib 230. However, vents 228 and/or vent apertures 226 may be located in any position on the housing 20 and in any form without departing from the overall scope of the present invention. Preferably, one or more vent apertures 226 may be provided for venting the toaster housing 20 with ambient air. A plurality, or series, of horizontal slots or apertures 226 may be provided on the front 210 and/or rear 212 of the toaster housing 20 permitting cool air to flow into the toaster 10 and/or hot air to exit. The slots 226 cover a substantial portion of the front wall 210 of the toaster housing 20 and are positioned on opposing sides of the carriage lever 610 and associated substantially vertical slot 222. The venting slots 226 at the rear of the toaster 10 are preferably positioned in a centralized location on the rear wall 212 of the device, and are divided by a central vertical wall thickness rib 230 between the horizontal slots 226. Venting is also provided within and/or by the base plate 310, which may include a number of apertures 314 for permitting the flow of air between the interior of the toaster 10 and the outer environment. At least one large aperture 316 may also be included in the base plate 310 to affix a label or for other purposes. For example, one of skill in the art would understand that the large aperture 314 could be used for permitting air flow or for access to components positioned above the base plate.

Alternatively, the vent system 228, or a portion thereof, may comprise a series of horizontal slots 226 located on the front 210 and/or rear 212 of the toaster housing 20, with a central vertical wall thickness rib 230 on an inner mating wall of at least one of the halves 218, 220 of the housing 20, completing the form of the toaster housing 20 from a side profile and assisting in the alignment of the two halves 218, 220 of the housing 20 during assembly. Alternative vent systems 228, or portions thereof, are also contemplated having slots 226 that comprise successively shorter increments as they travel up the toaster housing 20, and preferably a lower portion 204 of the device. A larger number of vent apertures 226 may likewise be provided in either the front 210 or rear 212 of the toaster 10, as well as the opposing sides of same. In addition to the above, the series of horizontal apertures 226 may be provided in successively shorter increments and/or as a fine pattern of horizontal vent openings or as, for example, a mesh screen. The plurality of vent apertures 226 may be provided as a multi-vent part insert and/or an multi-vent part having an elliptical cut or shape on the front and/or rear of the toaster housing 20. These multi-vent parts may be molded integrally with the toaster housing 20 or combined as a separate component or insert. It is also contemplated that venting may be separated from the core of the toaster 10 or be provided with access to the core elements, and/or may be performed without the addition of slots in the housing 20. Likewise, while not required, a fan may be used to assist in venting the internal chamber. Alternatively, based on the housing material used, it may not be necessary to vent the toaster at all.

Referring to FIGS. 1-6 and 8-12, the toaster base 30, which is attached below the housing 20, will now be described in further detail. In a preferred embodiment, the toaster base 30 flares out slightly from the narrower top 302 of the base 30 which is in contact with the bottom 304 of the toaster body or housing 20. The base 30 provides a lower stance for the toaster 10 and may provide a larger surface area for contact with the countertop or table top on which the toaster typically sits, preventing wobble and tipping of the toaster 10.

The base 30 of the toaster 10 of the present invention not only provides functional support for the toaster, but provides unique user or consumer design capabilities not available in current toaster systems. For example, the base 30 may be created separately from the toaster housing 20, by mold or otherwise, and attached at the lower portion 204 of the toaster unit or housing 20. The base 30 may be releasably attached to the toaster housing 20, or it may be permanently fastened. A toaster system having a removable/interchangeable base contemplates longevity for the toaster 10 of the present invention over currently available devices, as the toaster can be used as a decorative item, can be continually modified by the user or owner as that individual updates his or her own kitchen or pantry decor, contains easily replaceable parts, and can be modified or replaced without having to replace the entire device.

The base 30 can be easily and quickly removed by the user and replaced or interchanged with another device. To facilitate this easy and quick change, means of attachment 306 of the base 30 to the toaster body or housing 20 are provided. Namely, a plurality of attachment positions 308 are provided in a spaced manner surrounding the circumference of the toaster base 30, and preferably two of such attachment positions 308 are positioned near the front of the device, while two attachment positions 308 are spaced oppositely toward the rear of the device. A plurality of connection means 306, such as threaded thumb screws or the like, are matingly received in associated threaded receiving holes or attachment positions 308, and are provided to releasably fasten at least a portion of the base 30 to the toaster housing 20. The connection means 306 may be fastened to the bottom of the toaster unit or housing 20 to the base plate 310, or alternatively to the outer base rim 312. While threaded connection means are specifically described, the attachment of the base 30 to the toaster body or housing 20 may occur in a variety of ways. The base 30 may be removably or permanently attached by adhesive, welding, snap-fit, tongue and groove, set screws, and the like. The base 30 may likewise have one or more releasable attachment means 306, providing the ability to detach the base 30 from the toaster housing 20, including but not limited to, latch, thumb screw, male/female connectors, locking device, snap-fit, friction fit, screw-type groove, tongue and groove, use of a release button, and the like. It is contemplated that any means of fastening or attaching the base 30 to the toaster housing 20 may be acceptable for purposes of the present invention.

In addition to the general features of a top 302 and a bottom 304, the toaster base 30 may further comprise a base cover plate 310 at least partially surrounded by a base rim 312. More preferably, the base rim 312 surrounds the outer edge of the cover plate 310. A preferred embodiment of the base 30 of the present invention comprises a combined base plate 310 and base rim 312, which form a single component. The base rim 312 has a thickness greater then the inner base plate 310. The base plate 310 may be inset within the outer base rim 312, or alternatively, flush with or near the bottom 304 or top 302 edge of same. Alternatively, it is contemplated that the base rim 312 and base cover plate 310 may be provided and/or attached to the toaster 10 separately. Likewise, it is contemplated that the base plate 310 may be molded integrally with the toaster 10, the toaster base 30, and/or the outer rim 312, or alternatively attached as a separate component. Thus, contrary to currently available toaster, a variety of alternatives may be applied to the toaster 10 of the present invention, enabling the user to quickly and easily modify the appearance of the toaster, and/or replace components thereof.

The base 30 and/or base rim 312 comprise a curved thumb indentation 318 or slot at its rear. Specifically, a downward curve is provided at the rear of the base rim 312 to allow the user to easily access and grasp the crumb tray 338 with his or her hand. The crumb tray 338 is positioned immediately above the base 30. Therefore, the curved thumb indentation 318 enables the user to easily grasp and either remove or insert the crumb tray 338.

The base plate 310 may contain a series of apertures 314 there through, for use in venting the interior of the toaster 10, and other functions commonly known in the art. In fact, the base plate 310 portion of the toaster base 30 may contain a large aperture 316 or opening as stated previously herein.

In addition to apertures 314 and 316, attached to a portion of the base cover plate 310 are a plurality of feet 320 or protrusions for contacting the surface on which the toaster 10 is placed. Preferably, the feet 320 are at least partially rubberized to allow griping of a surface such as a countertop, and to provide some shock absorption to the toaster 10 when placed on a hard surface. The feet 320 may be combined with attachment means 306 described above to fasten both the base plate 310 and the feet 320 to the toaster 10 simultaneously.

While a base 30 that is releasable and interchangeable with the toaster housing 20 is disclosed above, the base 30 of the toaster 10 of an alternative embodiment may be integral with the toaster housing 20. For example, the base 30 may be molded integrally in a single mold with the toaster housing 20 in a molded plastic or metal toaster, or permanently fastened thereto. Alternatively, the toaster 10 and/or mold may not include a base 30. Instead, the toaster 10 may be supported by the lower portion 204 of the toaster housing 20. In this instance, it is contemplated that the toaster 10 may include a base plate 310 alone, absent the base rim 312. It is also contemplated that other systems for balancing the weight of a toasting device or like appliance may be used without departing from the scope of the present invention, including, but not limited to the addition of weight to the toaster, the addition of stabilizing feet, and the like.

The base 30 may be composed of one or more materials, including, but not limited to, plastic, glass, metal, stone, or other materials suitable for supporting the weight of the toaster 10. Similarly, base rim 312 and/or base plate 310 individually or in combination may be made of one or more of a variety of materials, as listed above. As a result, a variety of colors, patterns, designs, surface structures, and shapes are available in connection with the base 30 and therefore the toaster 10 of the present invention. For example, a user may obtain multiple toaster bases and interchange same to change the overall appearance of the toaster 10.

As one non-limiting example, a base 30 and/or a base rim 312 composed of glass, or a semi-transparent or transparent material may be used with the toaster 10 of the present invention. To date, a base, which is a structural component supporting the weight of the appliance, made of these materials has not been accomplished or available in a toasting device. Traditionally, materials, such as glass are fragile and therefore cause problems with respect to durability in appliances that are used heavily and/or on a daily basis. To the contrary, glass and/or transparent or semi-transparent materials as used in the present invention are provided in a durable manner. Moreover, glass, and other semi-transparent/transparent materials provide features that no other material used to manufacture toasters is capable of providing. Namely, glass and other transparent or semi-transparent materials permit illumination, such as by a light provided within the base, or by a light shined in proximity thereto. It is contemplated that light or illumination could be effected from within the toaster, including from a toaster component, or a separate light source may be provided. Moreover, these materials can be etched, texturized, sculpted, or patterned to provide different appearances. Likewise, glass, and other transparent/semi-transparent materials can be colored in a variety of colors, can be opaque, or can allow variable or total pass-through of light (and as a result, visibility there through). Moreover, a material, such as glass or other transparent/semi-transparent material, may be reflective and/or deflect light.

Alternatively, a base comprised of the die cast metal material of the preferred embodiment of the toaster is also contemplated for use with the present invention.

Thus, glass, transparent, semi-transparent, die cast and other conventional materials can be provided with different shapes, colors, transparencies, textures, and the like in various combinations, creating, a number of different outward appearances for the same functional component. Further, as indicated, these materials may be illuminated by direct or indirect lighting to further change the appearance of the base 30, and therefore the toaster 10. Ultimately, the user is saved significant expense, as the toaster 10 of the present invention permits the user to change the appearance of the toaster without the expense of purchasing an entirely new device. Moreover, as discussed above, a releasable and/or removable base 30 allows a user to interchange bases in the event of damage to one, as well as to provide multiple patterns and color schemes to adapt and coordinate with kitchen decor, holidays, seasons, and other decorating styles. In this manner, the user is provided the option of having a number of different bases for the toasting device which can be quickly and easily replaced or interchanged.

Referring specifically to FIGS. 8 and 10-12, above the base 30, a base chamber 322 is provided. The base chamber 322 comprises a unique geometry corresponding with the angular orientation of the heating chamber 40 and the horizontal bottom surface 204 of the toaster 10 which forms the contact with a table or countertop. The base chamber 322 may be fastened to the base 30 and/or attached to the lower portion 204 of the toaster housing 20. In addition, at the top 324 thereof, the base chamber 322 is fastened, placed in contact with, or positioned near a lower wall or base 402 of the heating chamber 40. Preferably, the base chamber 322 is provided below the heating chamber 40 to assist in the collection of and/or to direct or funnel crumbs that fall from a bread product placed in the heating chamber 40 onto a crumb tray 338 or collection means. In other words, crumbs fall from the heating chamber 40, through and/or into the base chamber 322, and are directed onto the crumb tray 338. In the preferred embodiment, tabs 336 secure the heating chamber 40 to the base chamber 322.

Thus, the base chamber 322 contacts or is positioned near the angled heating chamber 40 and includes a horizontal base or wall 326 for supporting the base chamber 322 above a contact surface. Preferably, to accommodate such features, the base chamber 322 has a rear wall 332 of a greater height than its front wall 334. Likewise, the sidewalls 328, 330 of the base chamber 322 comprise a general wedge shape profile between the front wall 334 and the rear wall 332 of the base chamber 322. The rear wall 332 of the base chamber 322 may also include a pair of cavities 342 for funneling or directing crumbs that fall into the base chamber 322. These crumbs may be further directed through an opening or aperture 344 in the bottom wall or floor 326 of the base chamber 322 onto a crumb tray 338 or other collection means. The aperture 344 in the floor of the base chamber 322 is positioned between the front wall 334 of the base chamber 322 and the rear wall 332. Connection means 346 (including, but not limited to, threaded connectors, latch, thumb screw, male/female connectors, locking device, snap-fit, friction fit, screw-type groove, tongue and groove, use of a release button, and the like) are also provided on the base chamber 322 for connecting same to the base 30 and/or the heating chamber 40.

At the bottom 326 of the base chamber 322, or immediately below same, the crumb tray 338 may be inserted for collecting crumbs that fall from the bread product placed into the heating chamber 40 above. The crumb tray 338 may be connected with or separable from its handle 340 which corresponds to the shape and appearance of the housing 20. The crumb tray 338 can be grasped at the handle 340 which is placed near the curved thumb indentation 318 in the base 30, and inserted or removed.

The crumb tray 338 is slidably inserted within the base chamber 322 or below. To facilitate same, a horizontal slot 348 may be provided in a lower portion of the rear wall 332 of the base chamber 322 and/or the rear wall 212 of the toaster housing 20 for receiving the crumb tray 338. Alternatively, the crumb tray 338 may be included below the base chamber 322, and/or above or in the base 30 itself through a slot or otherwise. Preferably, when the crumb tray 338 is fully inserted into the toaster 10, the tray 338 extends across the opening 344 provided in the base chamber 322 so as to effectively collect the crumbs that fall from the bread product above. The crumb tray 338 may then be slidably removed for emptying bread crumbs collected thereon. The crumb tray 338 or a portion thereof may be composed of material similar to the toaster housing 20, such as, but not limited to, the die cast material of the preferred embodiment or alternative materials that are capable of withstanding the heat generated by the heating chamber above. Alternatively, the crumb tray 338 could be composed at least in part of a wire mesh screen which would allow air to flow through same so as to assist in cooling the internal heating chamber 40. Additionally, it is contemplated to provide different configurations of the crumb tray 338, including, but not limited to, a generally flat crumb tray and/or a crumb tray that corresponds with the non-uniformity of crumbs falling from an angular heating chamber 40, such as a crumb tray that enables the collection of crumbs more toward the end or side of the toaster 10. As a non-limiting example of a crumb tray that enables the collection of crumbs on one end or side of the device, the crumb tray may include a larger depth in a position below the most likely surface area within which crumbs are expected to fall. Apart from and/or in addition to the unique features described herein, the crumb tray 338 used herein can comprise other features comparable to trays commercially available on the market.

Referring to FIGS. 8 and 11-16D, within the toaster housing 20 is a heating chamber 40. As discussed, the heating chamber 40 of a preferred embodiment is angled to accommodate the geometry of the toaster housing 20. As the heating chamber 40 is angled, the internal components of same may also be maintained at a similar angle. The angled heating chamber 40 provides the ability for the user to easily view the inside of the heating chamber 40 during operation or otherwise. While an angled heating chamber is specifically disclosed, the use of alternatively oriented heating chambers with the various sub-assemblies described herein is contemplated by the present invention, such as, but not limited to, a vertically or horizontally positioned heating chamber. The heating chamber 40 may be fastened to the toaster assembly by any means common in the art, and may be fastened to any portion of the toaster housing 20 and/or base 30 and/or base chamber 322 for support of same within the toaster 10.

Generally, the heating chamber 40 of the present invention comprises, and/or contains a bread lift or platform 414 for support of the bread product, and at least one, but preferably two or more heating element assemblies 50, 52, 54, 56 each of which comprise generally a heating element 502 and a cage or grill 504, 506 for retaining the bread product in an upright position (additional features of the heating element assemblies are discussed in further detail hereinbelow), which devices or sub-assemblies are operably interrelated and may be operated, in part, by a carriage assembly 60. More specifically, the heating chamber 40 contains moveable heating elements 502 attached to grills 504, 506 and a manual toast lift 414, operated, in part, in connection with a centering carriage 60.

In detail, an internal chamber is provided within the toaster housing 20 for heating or toasting a bread product. This heating chamber 40 has a front wall 408, a rear wall 410, and a pair of sidewalls 404, 406, as well as a chamber bottom or base 402 that surround the bread product receiving section 420, 422 and form one or more chambers for containing bread product and the like within the toaster. The chamber bottom 402 may include one or more slotted openings 424 permitting, at least, bread crumbs from the bread product inserted into the heating chamber 40 and/or receiving sections 420, 422 to fall through the chamber bottom 402 and into the base chamber 322 or crumb tray 338, as well as to allow cool air to flow into or warm air to escape the heating chamber 40.

At least one heat shield 426, and preferably multiple heat shields and/or a heat shield having multiple walls, are mounted within the toaster housing 20 on or near the heating chamber 40 to prevent the housing 20 from becoming overheated, resulting in damage to same or injury to the user. Preferably, a heat shield 426 is at least mounted on the top and/or sides of the chamber 40 to deter the heat that escapes or rises from the heating chamber 40. However, heat shields and/or walls having heat resistant properties may be included in any location within the heating chamber 40, adjacent the heating chamber 40, or within or on toaster housing 20 without departing from the overall scope of the present invention.

The heat shield 426 comprises a front wall 432, a rear wall 434, and a top wall 430, and can be made of any material suitable for the purposes of preventing the transmission or escape of heat or more generally, the protection of components, such as the toaster controls 70, associated components and other elements surrounding the heating chamber 40, as well as protection of the user from a heated housing 20 caused by the heat generated within the heating chamber 40. Preferably, the heat shield 426 has a top and interconnected front 432 and rear 434 walls. In addition to the heat shield 426, the heating chamber side walls 404, 406 may further be provided with heat resistant properties or comprise heat shields. Preferably, the front 432 and rear 434 wall of the heat shield 426 each cover at least a portion of the toaster linkage assemblies 508, 510 and carriage 60 components. The top wall 430 of the heat shield 426 preferably contains one or more slots 428, corresponding with the toast receiving slots 232 of the top 202 of housing 20, as well as the bread product receiving sections 420, 422 in the heating or toasting chamber 40, to allow bread product to be inserted into the heating chamber 40 through the slots 232 in the housing 20 and the slots 428 in the heat shield 426.

At the left and/or right side of the heat shield 426, a flare or flange 436, 438 extends outwardly from the top wall 430 so as to cover the upper edge or a portion of the left and/or right sidewalls 404, 406 of the heating chamber 40. In this position, the flange 436, 438 deters heat rising from the sides of the heating chamber 40. The outward extending heat deflecting flanges 436, 438 extend a short distance away from the sidewalls 404, 406 or side heat shields of the heating chamber, and may deflect heat rising from the outside edges of the heating chamber away from the top of the toaster.

The heat shield 426 may rest on top of and/or be supported by one or more of the heating chamber walls 404, 406, 408, 410, or alternatively, the heat shield 426 may be attached by means common in the art, such as tongue and groove, slot and tab, male-female connection, screw-type connection, and the like. In the preferred embodiment, the heat shield 426 is held in place by tabs 440 extending from the heating chamber 40 through slots in the heat shield 426. However, any means of connecting the heat shield 426 to the heating chamber 40 would be acceptable for purposes of the present invention.

The top 430 of the heat shield 426 extends a distance beyond the front wall 408 of the heating chamber 40, and a distance beyond the rear wall 410 of the heating chamber 40. The interconnected front wall 432 of the heat shield 426 is positioned at the forward end of the top 430, and extends downwardly from its connection with the top 430 toward a position near the base 402 of the heating chamber 40. The front wall 432 of the heat shield 426 of a preferred embodiment is a substantially solid surface with a limited number of holes or slots, if any. However, slight indentations or insets may be provided on the sides thereof to provide clearance, where necessary, for the upward and downward movement of the parallel arms of the U-shaped carriage lever rod 602 which is discussed in further detail below. Likewise, the front wall 432, in one embodiment, may contain an upwardly extending slot along a portion thereof for permitting the vertical action of a carriage lever 610 and knob 612 operably connected to and extending from the carriage assembly 60 or carriage plate 614 which is positioned below or behind the heat shield 426. As a result of the overextension of the top 430 and the interconnected front wall 432, the heat shield 426 covers the carriage plate 614, linkage assembly 508, and attached components on or adjacent the front wall 408 of the heating chamber 40.

Likewise, the rear wall 434 of the heat shield 426 is integrally attached at the rear end of the top 430 which also extends beyond the rear 410 of the heating chamber 40. The rear wall 434 of the heat shield 426 extends downwardly from its connection with the top 430 toward a position near the base 402 of the heating chamber 40. In addition to the downwardly extending rear wall 434, the rear of the heat shield 426 also has integrally connected partial sidewalls 442, 444. These sidewalls 442, 444 extend forwardly from the rear wall 434 of the heat shield 426 toward the sidewalls 404, 406 or heat shields of the heating chamber 40, and may overlap same. The partial sidewalls 442, 444 may also be connected to the top 430 of the heat shield 426. As a result, the combination of the partial sidewalls 442, 444 and rear wall 434 below the top 430 substantially cover and/or contain the linkage assembly 510 adjacent the rear wall 410 of the heating chamber 40.

The front and rear integrally connected walls 432, 434 of the heat shield 426 may be connected by a downwardly angled connecting portion 446 of the heat shield 426, which reduces the overall space of the heating chamber 40 and associated components by eliminating "hard" corners, and provides a surface upon which toaster elements can be positioned, such as control aspects, sensors, and/or a thermistor (see FIGS. 14A-14C).

In the configuration described, the heat shield 426, as a single device, prevents heat from escaping from the heating chamber 40 in multiple locations and provides for simple, quick assembly of the heat shield to the device.

In addition to the heat shield 426 and sidewalls 404, 406 or side heat shields discussed above, one or more protective plates 448, or heat resistant plates may be added to the front of the device within the housing 20, to limit and/or reduce the effects of heat on the housing 20 and controls 70. Namely, a protective plate 448 may be attached to a forward portion or front wall 334 of the base chamber 322. The protective plate 448 is further attached so that the front wall 432 of the heat shield 426 is between the protective plate 448 and the heating chamber 40. The protective plate 448 may be fastened by attachment means 450, including, but not limited to threaded connector, clamp, male/female connector and the like, to the heat shield 426 and/or the base chamber 322.

Accordingly, the front wall 408, rear wall 410, sidewalls 404, 406, chamber base 402, and heat shield 426 form a chamber 40 with associated bread product receiving sections 420, 422, heating elements 502, linkage assemblies 508, 510, cages or grills 504, 506, and bread platforms 414 positioned and/or retained and operated therein.

The front 408 and rear 410 walls of the heating chamber 40 each include a pair of substantially vertical slots 412 for receiving extensions 416, 418 of the bread platforms 414 to allow for the movement of the bread platforms 414 between the lower heating position and the upper loading/unloading position in the heating chamber 40. In addition to the substantially vertical slots 412, the front 408 and rear 410 walls also include a plurality of horizontal openings, slots or tracks 452 along at least a portion of the top and bottom of same. As can be seen, these horizontal openings 452 or tracks serve as clearance holes for the fingers or pins 512, 514 of the heating element cages or grills 504, 506. As will be discussed in more detail hereinbelow, each heating element cage or grill 504, 506 includes an outwardly extending finger 512, 514 that corresponds with and extends through a horizontal opening 452. Therefore, each heating element grill 504, 506 includes a top finger 512 and a bottom finger 514 toward both the front and rear of the heating chamber 40. The extension of the fingers 512, 514 through the horizontal openings 452 permits clearance for lateral movement of the heating element assemblies 50, 52 by the transversal of the outwardly extending cage fingers 512, 514 within the horizontal openings 452.

In a preferred embodiment, a plurality of horizontal openings 452 are provided on a portion of both the front wall 408 and the rear wall 410 of the heating chamber 40 in association with each bread platform 414. Preferably, for each heating element assembly 50 and/or 52 (54 and/or 56), at least two (2) slots 452 are provided to accommodate the cage or grill fingers 512, 514 extending through the top and bottom of the front wall 408. A similar configuration is also provided at the rear wall 410. As a result, at least four (4) slots or openings 452 are provided near the top and bottom of both the front 408 and rear 410 walls corresponding with each pair of heating element assemblies 50, 52, 54, 56 surrounding the bread product receiving sections 420, 422. Thus, in a "two-slot" toaster, at least eight (8) horizontal slots or openings 452 are provided on both the front 408 and rear 410 wall of the heating chamber. However, additional openings 452 may be provided in the front and rear wall 408, 410 for access to, clearance through, and/or venting of the heating chamber 40.

As can be seen, two bread platforms 414 are provided within the heating chamber 40. However, it is contemplated that any number of bread platforms may be used to accommodate the number of bread product receiving slots and/or receiving sections, such as, but not limited to, a toaster having a single slot, or a toaster having multiple bread product receiving slots, and therefore bread platforms. The bread platforms 414 are included within the bread product receiving sections 420, 422 of the heating chamber 40 between the front wall 408 and the rear wall 410. Furthermore, the bread platforms 414 may include extensions 416, 418 or carriage engagement means that extend through the substantially vertical slots 412 provided in the front 408 and rear 410 walls of the heating chamber 40. The extensions may be separate from or integral with the bread platforms. The extension 418 of the bread platforms 414 at the rear thereof may also comprise engagement pins for engaging the vertical slots 412. As a result of the extensions 416 and 418 of the bread platforms 414 that extend through the substantially vertical slots 412 in the front and rear walls 408, 410 of the heating chamber, the bread platforms 414 are retained within the heating chamber 40, lateral movement of same is restrained. The bread platforms 414 are further engaged and are considered an element of the carriage assembly 60. Preferably, the bread platforms are engaged with the carriage plate 614 at slots 616, for the manual raising and lowering of the bread platforms 414 by the user. As a result, the bread platforms 414 can move between a bread product receiving/delivery position (see, e.g., FIG. 15C) and a heating position (see, e.g., FIG. 16C), allowing the bread product to be raised and lowered within the heating chamber 40.

Referring now to FIGS. 17A-20B, the heating element assemblies 50 and 52 and the associated linkage assemblies 508 and 510 will be discussed in further detail. Supported adjacent the outer surface of both the front 408 and rear 410 walls of the heating chamber 40 are a plurality of linkage leaders 516, 518, 520, 522. In a preferred embodiment, two pairs, namely four (4) linkage leaders are provided, respectively, adjacent the front wall 408 and the back wall 410 of the heating chamber 40 to accommodate two pairs or four (4) heating element assemblies 50, 52, 54, 56. For ease of reference, the discussion herein will focus primarily on an assembly surrounding a single bread product receiving section 420 or 422, but may be applied equally to both sections 420, 422 and their respective sub-assemblies.

The linkage leader bars 516, 518 at or adjacent the front of the toaster's heating chamber 40 comprise a substantially rectangular bar having a rounded top end 524 and an angled lower end 526, and further comprise an indentation 528 in one side of the bar. Preferably, for each pair of linkage leader bars 516, 518 associated with a bread receiving section 420 or 422, the indentations 528 on the linkage leader bars face each other and are mirror images. As a result, the combined indentations 528, when placed in close proximity, correspond to the shape of the protrusion 618 on the carriage plate 614, which will be discussed in further detail hereinbelow. The linkage leader bars 520, 522 at or adjacent the rear of the toaster's heating chamber, in comparison, comprise a substantially rectangular bar having rounded top and bottom ends 530, 532.

As can be seen, the Figures show a pair of linkage leaders 516, 518 and 520, 522 used in positions located at or adjacent the front wall 408 and the back wall 410 of the heating chamber 40 for each pair of heating element assemblies 50, 52 and 54, 56. The linkage leader bars 516, 518 and 520, 522 are spaced on opposite sides of the substantially vertical slot 412 traversed by the bread platform extensions 416, 418.

The linkage leaders 516, 518, 520, 522 each comprise heating element cage or grill receiving sites 534 on both the lower 526, 532 and upper 524, 530 ends thereof for operatively engaging the ends of the heating element cage or grill fingers 512, 514 that extend through the horizontal openings 452 in the front wall 408 and rear wall 410 of the heating chamber 40. The linkage leaders 516, 518, 520, 522 secure the ends of the fingers 512, 514 in place, are acted upon by other assembly components, and link the movement of the upper 512 and lower 514 heating element cage fingers and attached components together. Through the linkage of the upper 512 and lower 514 heating element cage fingers, the upper and lower portions 538, 540 of the heating element assemblies 50, 52, 54, and 56 are also linked, providing a means for the movement of the heating element cages or grills 504, 506, and therefore the heating elements 502, in unison, or more particularly, the movement of the upper portion 538 of each respective heating element assembly 50, 52, 54, 56 in relation to the lower portion 540 of the assembly. Moreover, the lateral movement of the heating element assemblies occurs simultaneously with the lateral movement of the cage or grill fingers 512, 514 within the horizontal openings or slots 452 at the top and bottom of the front 408 and rear 410 walls of the heating chamber 40. As a result, the heating element assemblies 50, 52, 54, 56 are each operably connected to the moveable assembly of the present invention within the heating chamber 40 and are operably connected to the specific linkages positioned at the front and rear of the heating chamber 40 for combined movement.

In addition to the operable connection to the heating element assemblies described above, the linkage leaders 516, 518, 520, 522 further comprise a linkage trailer receiving slot 536 or hole between the upper and lower cage receiving sites 534. Preferably, the linkage trailer receiving slot 536 is provided in a central location between the upper and cage receiving sites 534 on each linkage leader bar to provide for central pivotal movement of the heating element assemblies 50, 52, 54, 56 that are connected thereto. The linkage trailer receiving slot 536 operably engages or receives a linkage trailer 542, 544, 546, 548. Each linkage trailer, as will be discussed in further detail below, supports and enables the interactive movement of the heating element assemblies 50, 52, 54, 56 and linkage leaders 516, 518, 520, 522 with the carriage assembly 60.

Preferably, each linkage trailer 542, 544, 546, 548 is a substantially U-shaped wire rod having first and second outputted ends 550, 552. Each outputted end 550, 552 is received within a linkage trailer receiving slot 536 on a linkage leader 516, 518, 520, 522. Thus, in a preferred embodiment having two bread product receiving sections 420, 422, four (4) linkage trailers 542, 544, 546, 548 are provided in an operable relationship with the four (4) pairs of linkage leaders 516, 518, 520, 522, namely two pairs of linkage leaders per bread product receiving section 420, 422 or bread platform 414. For each linkage assembly, a first outputted end 550 of a linkage trailer is received within a linkage trailer receiving slot 536 on a linkage leader 516, 518 located adjacent the front wall 408 of the heating chamber 40. Following a substantially U-shape form, each linkage trailer 542, 544, 546, 548 travels below the heating chamber 40 and the second outturned end 552 of the linkage trailer is received within a linkage trailer receiving slot 536 on a corresponding linkage leader 520, 522 positioned adjacent the back wall 410 of the heating chamber 40. Each linkage trailer 542, 544, 546, 548 serves as a pivot bar for the movement of its respective heating element assembly 50, 52, 54, 56. The linkage trailers 542, 544, 546, 548 may be tabbed or secured in place by any means known in the art at the bottom of the heating chamber 40, and preferably at or near the bottom plate 208 of same, the attachment of which permits the pivotal movement of each individual linkage trailer. In other words, the linkage trailers 542, 544, 546, 548 are fixed in position at the bottom wall 208 of the heating chamber 40, but rotatable within this position. In addition, in the preferred embodiment, slight recesses may be stamped into, or provided in the lower portion of the front 408 and rear 410 walls of the heating chamber 40 corresponding in size to the linkage trailer diameter for receipt of same therein. As a result, the linkage leaders 516, 518, 520, 522 are supported, and essentially, "floating" adjacent the front 408 and rear 410 walls of the heating chamber 40.

In addition to the connection of the linkage leaders 516, 518, 520, 522 to the heating element assemblies 50, 52, 54, 56 and to each other through the linkage trailers 542, 544, 546, 548, the linkage assemblies 508, 510 further comprise spring returns 554, 556 for assisting and/or facilitating the movement of the linkage assemblies 508, 510. These springs returns 554, 556 and their positioning provide increased strength and effectiveness over currently available spring systems. The spring returns 554, 556 of the present invention assist in centering the mechanism and heating element assemblies 50, 52 and 54, 56, and provide an equal load distribution to the top 538 and bottom 540 of the heating element assemblies. Moreover, in one embodiment, the spring returns 554, 556 are custom torsion springs providing significantly increased strength and action over common tension springs. As a result, contrary to current spring systems, or simple coil springs, which are typically quite weak and require either multiple springs or multiple arms for engaging the necessary components, it is sufficient to provide the spring returns 554, 556 in connection with the linkage leaders on one side of the heating chamber 40, and preferably adjacent the front wall 408 alone. However, as can be seen in FIGS. 15C-D, 16C-D, 17C-D, and 18C-D, an alternative embodiment may comprise one or more spring returns attached adjacent the rear wall 410 of the heating chamber 40.

Preferably, at least one spring return 554 and/or 556 of the present invention comprises a dual torsion spring return. Due to the interaction between the linkage leaders 516, 518, and/or 520, 522, linkage trailers 542, 544 and/or 546, 548, and heating element assemblies 50, 52 and/or 54, 56, the use of the spring returns 554, 556 adjacent the front wall 408 to force the movement of the linkage leaders 516, 518 will cause action in the linkage leaders 520, 522 located adjacent the back wall of the heating chamber 40, similar to the use of a torsion bar. Accordingly, as mentioned above, only a single set of spring returns 554, 556, in the preferred embodiment totaling four (4) spring returns (two for each pair of linkage leaders 516, 518 adjacent the front wall 408 of the heating chamber 40) is necessary for efficient functioning of the present invention, reducing part counts, costs, and time for assembly.

In combination, each pair of linkage leaders 516, 518 includes a pair of spring returns 554, 556 that bias the linkage leaders 516, 518 toward one another. The spring returns 554, 556 are preferably biased inward. Generally, the spring returns 554, 556 are expanded against their biasing force when the carriage 60 and bread platforms 414 are in the loading/unloading position. The spring returns 554, 556 return to a resting state when the carriage 60 is lowered and/or in its lowest position. Therefore, in the raised position of the bread platforms 414 and carriage assembly 60, and in the open position of each pair of heating element assemblies 50, 52 and 54, 56 (as shown in FIGS. 17A-17D), the spring returns 554, 556 are mechanically forced apart and retained against the natural bias to retain the heating element assembly pairs 50, 52 and 54, 56 in their open position. When the retaining force is removed by movement of the carriage assembly 60 downward, the spring returns 554, 556 naturally press or draw linkage leaders 516, 518 together. As a result, the connected linkage trailers 542, 544 and/or 546, 548 also draw linkage leaders 520, 522 together, resulting in the movement of heating element assemblies 50, 52 and/or 54, 56 inward and toward the bread product to grab and center same within the heating chamber or bread product receiving section (see FIGS. 18A-18D).

To accomplish the above mechanism, the spring returns 554, 556 of the preferred embodiment are fastened, or secured to or near the linkage leaders 516, 518 in a manner directing the bias of each spring return inward, and thus toward the center of the bread product receiving section 420, 422. The spring returns 554, 556 are further positioned so that the base of the spring force is located substantially between the pair of linkage leaders 516, 518. The spring returns 554,556 are also positioned near the top 524 and bottom 526 of the linkage leaders 516, 518. Each spring return 554, 556 has an intermediate portion 558 positioned between first 560 and second 562 attachment ends. As a result, each spring return 554, 556 and particularly the intermediate portion 558, is positioned between a pair of linkage leaders 516, 518 surrounding a bread product receiving section 420 and/or 422. Preferably, the intermediate portion 558 is positioned centrally between the two linkage leaders 516, 518. More preferably, each attachment end 560, 562 contains a wound wire connection to either a cage or grill finger 512, 514, or to a lip, groove, or other receptor on the linkage leader bar 516, 518. In particular, for each individual bread product receiving section 420, 422, a first attachment end 560 is connected to or near a first linkage leader 516 and a second attachment end 562 is connected to or near a second linkage leader 518. Preferably, the spring returns 554, 556 are operatively connected solely to the cage fingers 512, 514 and/or linkage leaders 516, 518. Therefore, the intermediate portion 558 "floats" between the first and second linkage leaders 516, 518. The use of spring returns 554, 556 at or near the top and bottom of each linkage leader pair results in an even distribution of the force of the spring returns 554, 556 across the linkage leaders 516, 518 and heating element assemblies.

Figure 17A:
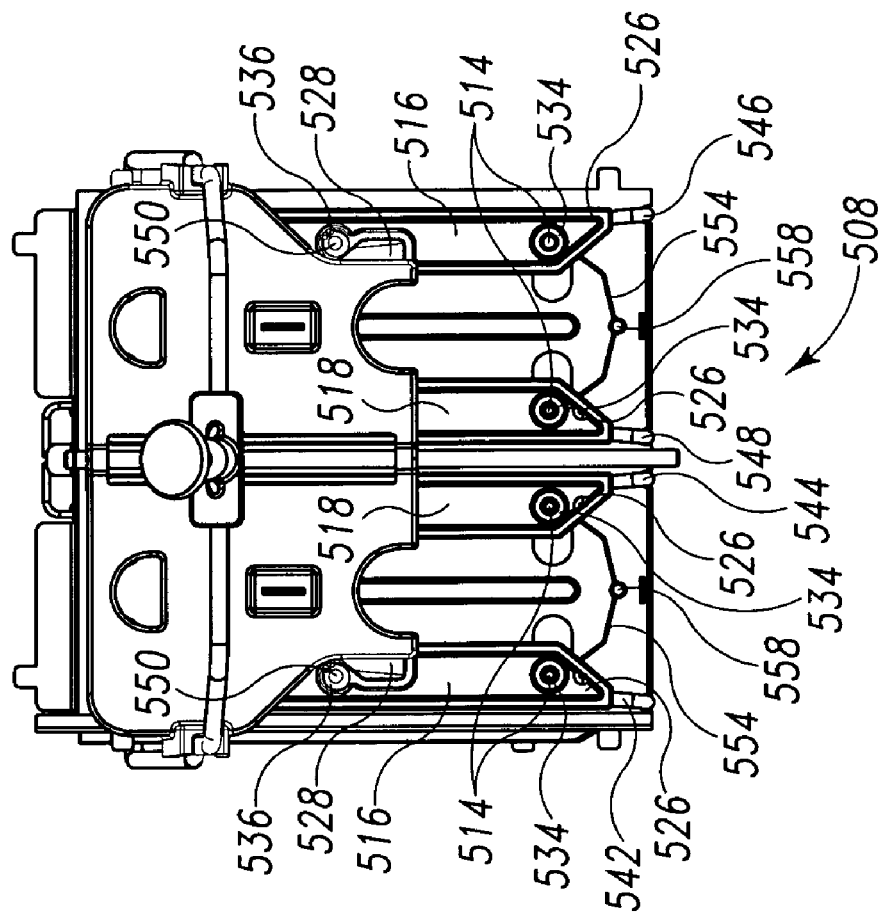
FIG. 17A is a front elevational view of an embodiment of the heating chamber and associated assemblies of the present invention having the carriage assembly in a raised position and referencing the heating element assemblies of the present invention.
Figure 17B:
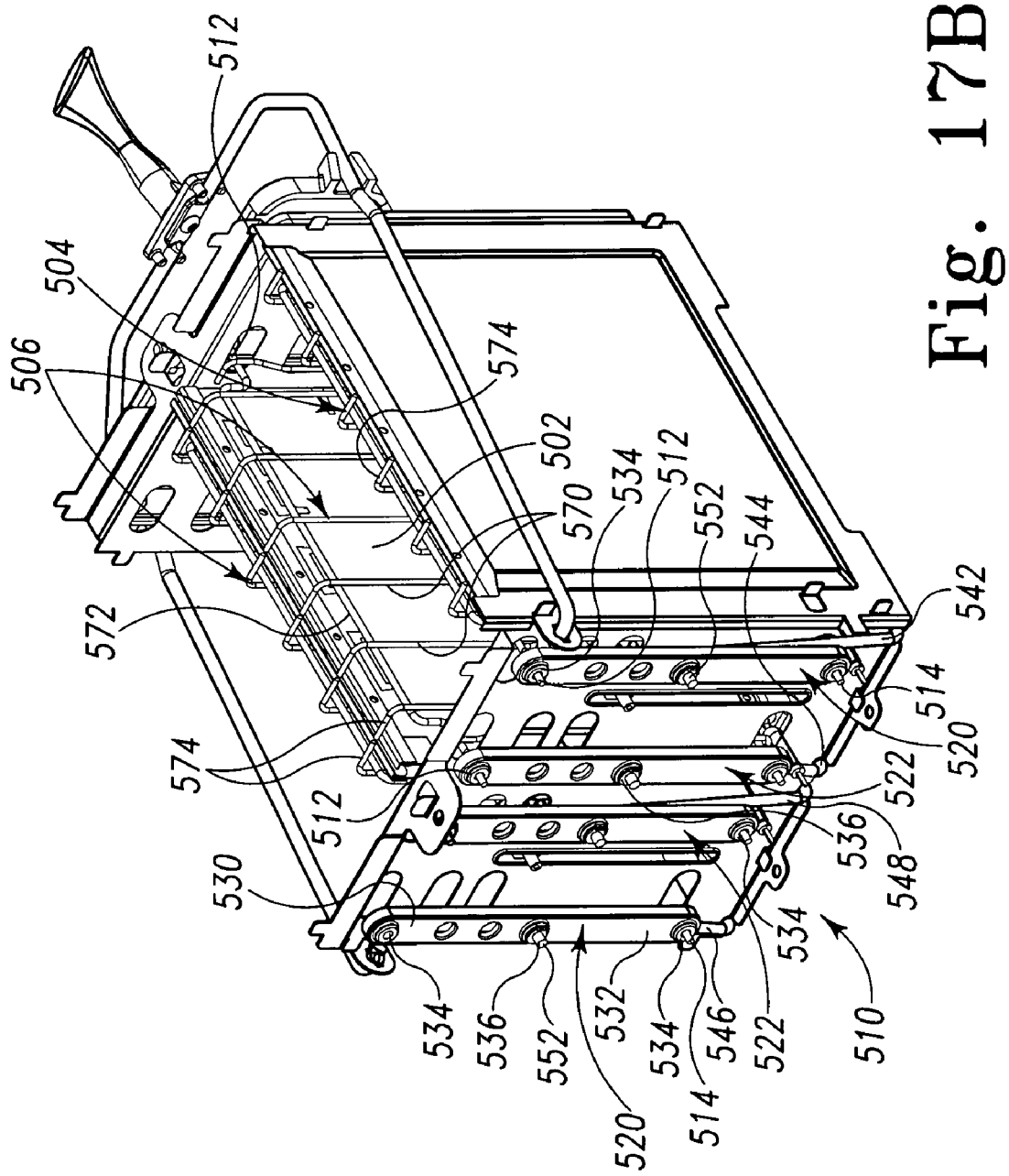
FIG. 17B is cut-away rear perspective view of the embodiment shown in FIG. 17A.
Figure 17C:
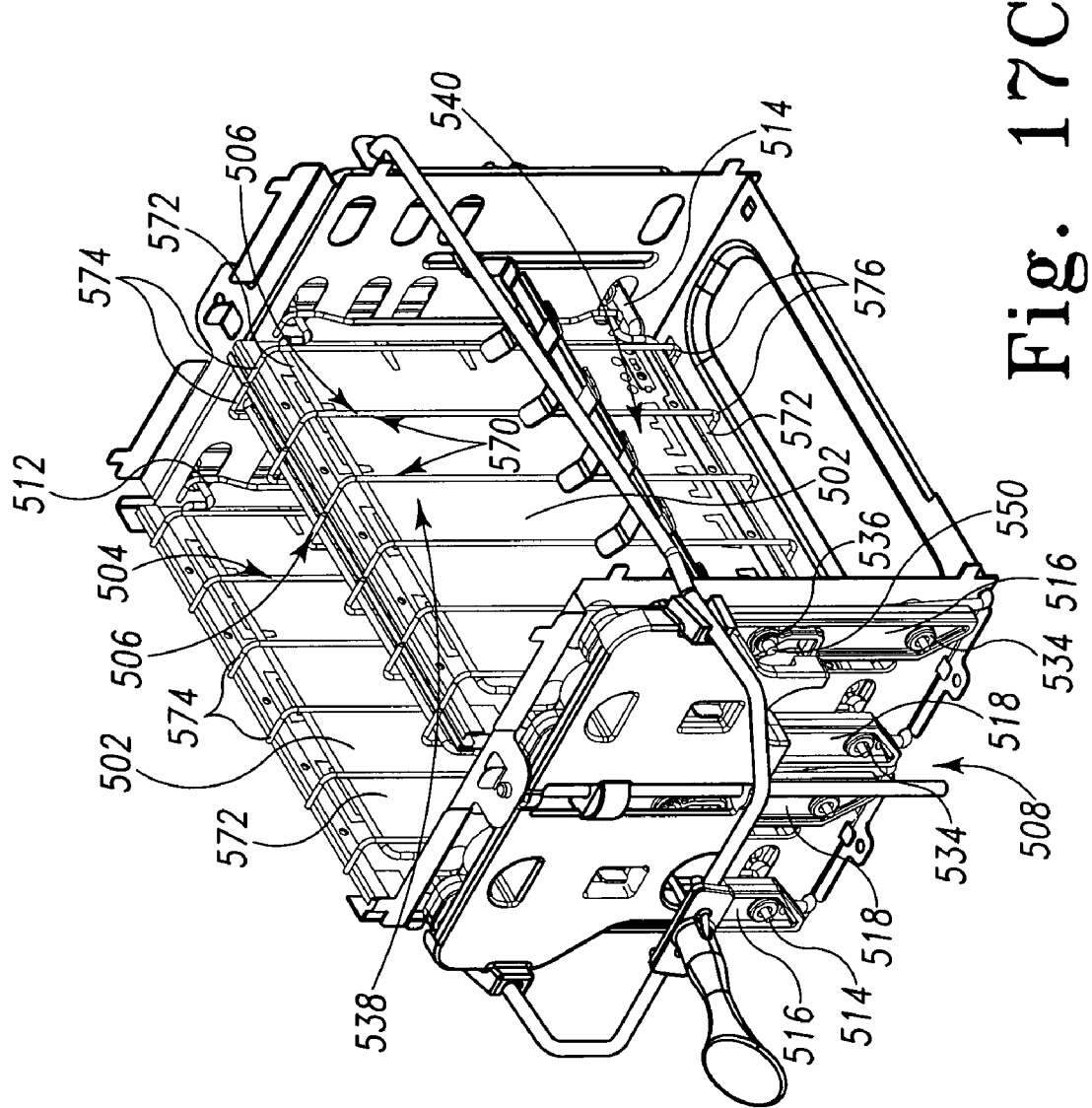
FIG. 17C is cut-away front perspective view of an alternative embodiment of the heating chamber and associated assemblies of the present invention having the carriage assembly in a raised position and referencing the heating element assemblies of the present invention.
Figure 17D:
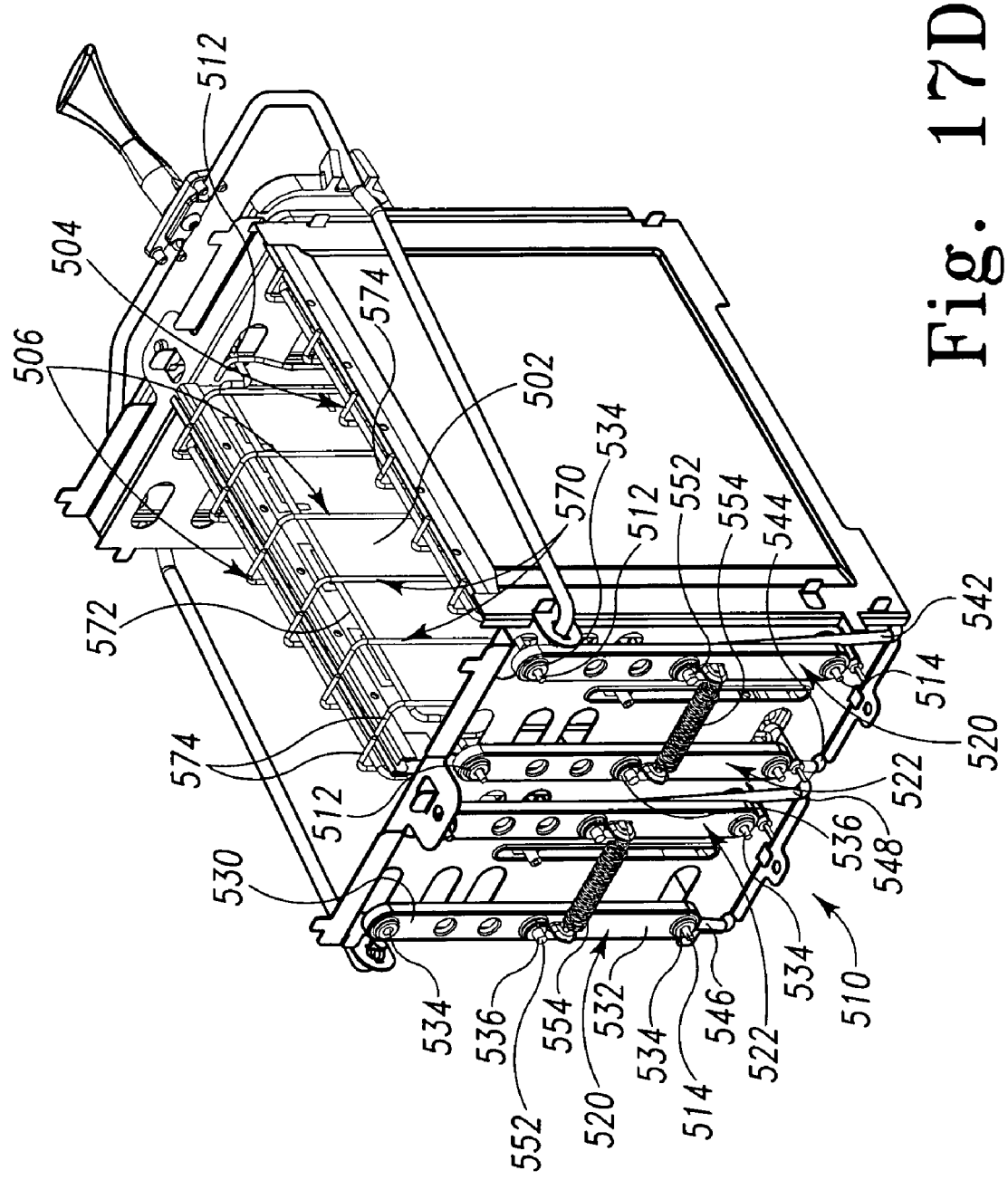
FIG. 17D is cut-away rear perspective view of the embodiment shown in FIG. 17C.
Figure 18A:
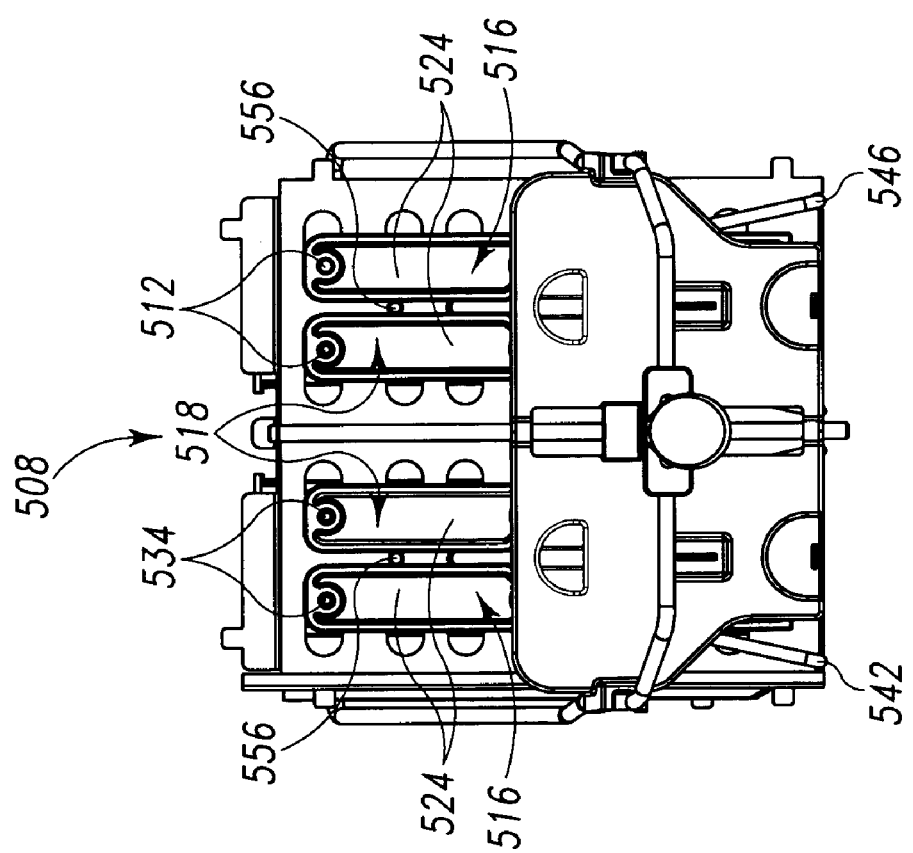
FIG. 18A is a front elevational view of an embodiment of the heating chamber and associated assemblies of the present invention having the carriage assembly in a lowered position and referencing the heating element assemblies of the present invention.
Figure 18B:
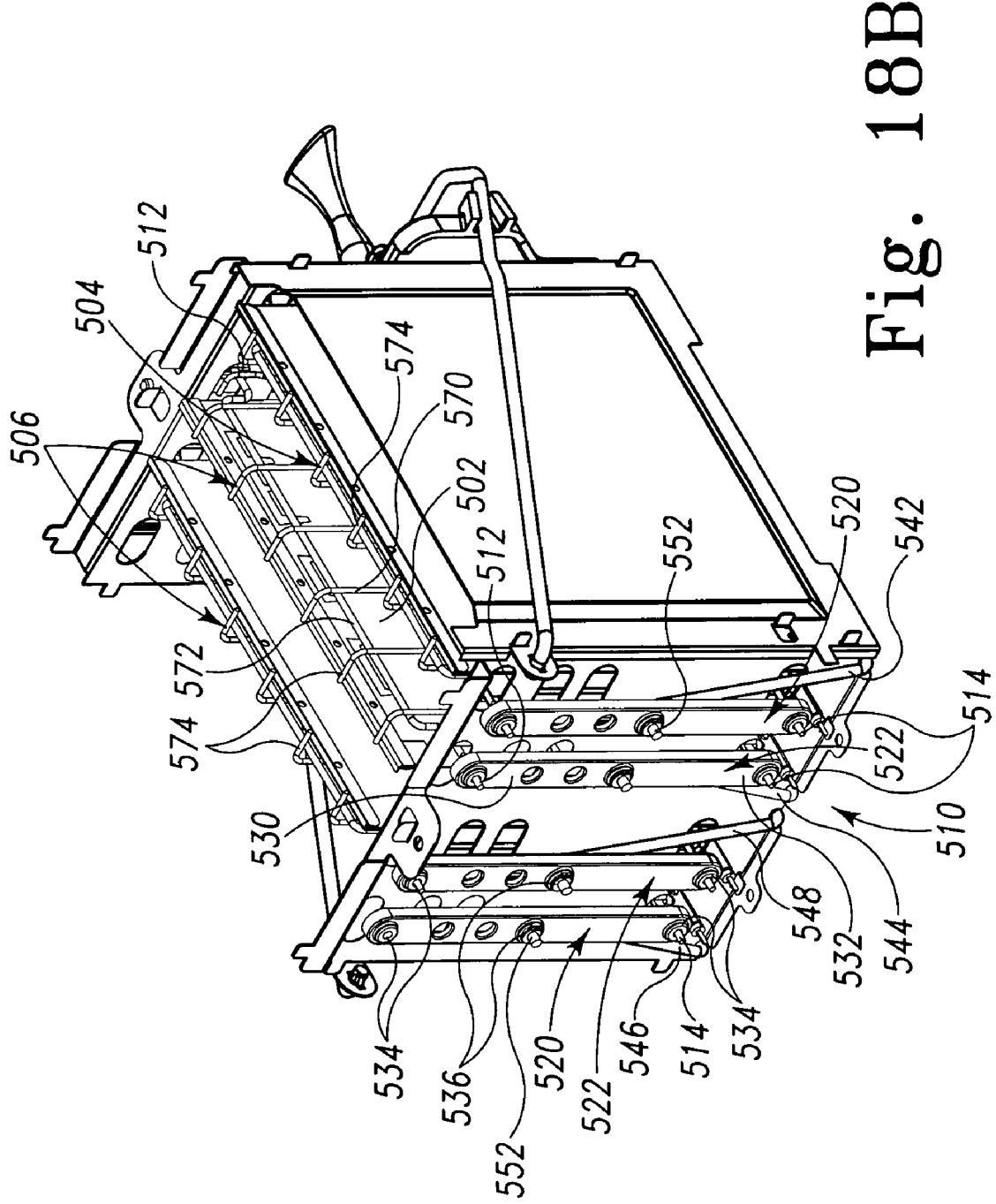
FIG. 18B is cut-away rear perspective view of the embodiment shown in FIG. 18A.
Figure 18C:
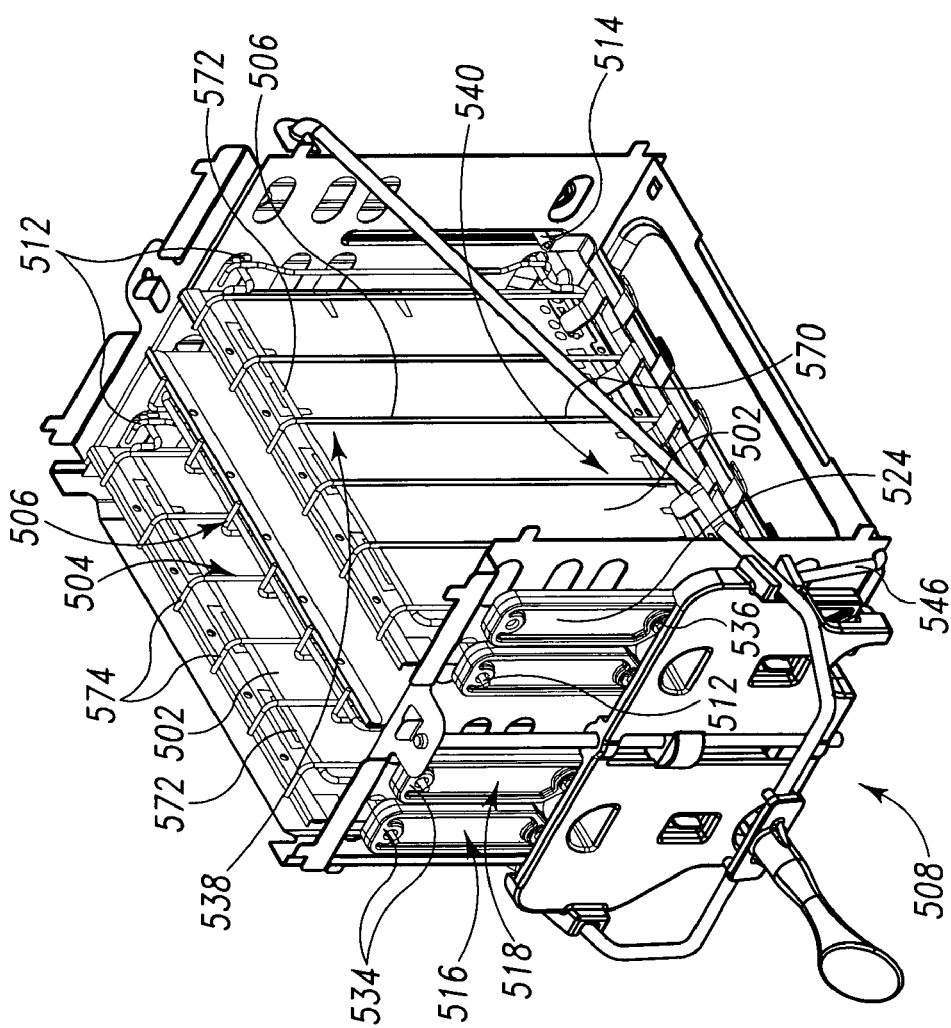
FIG. 18C is cut-away front perspective view of an alternative embodiment of the heating chamber and associated assemblies of the present invention having the carriage assembly in a lowered position and referencing the heating element assemblies of the present invention.
Figure 18D:
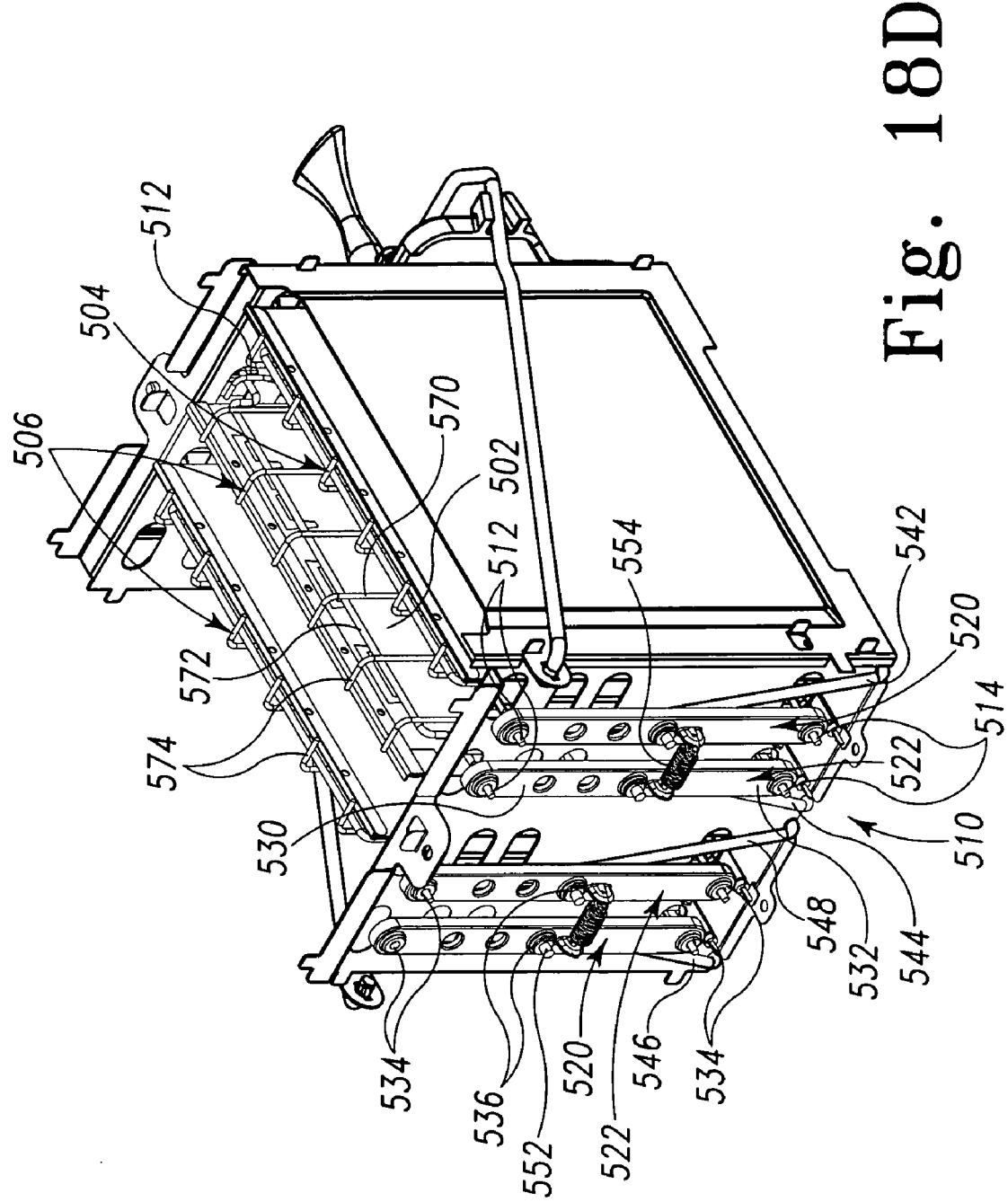
FIG. 18D is cut-away rear perspective view of the embodiment shown in FIG. 18C.
Figure 19:
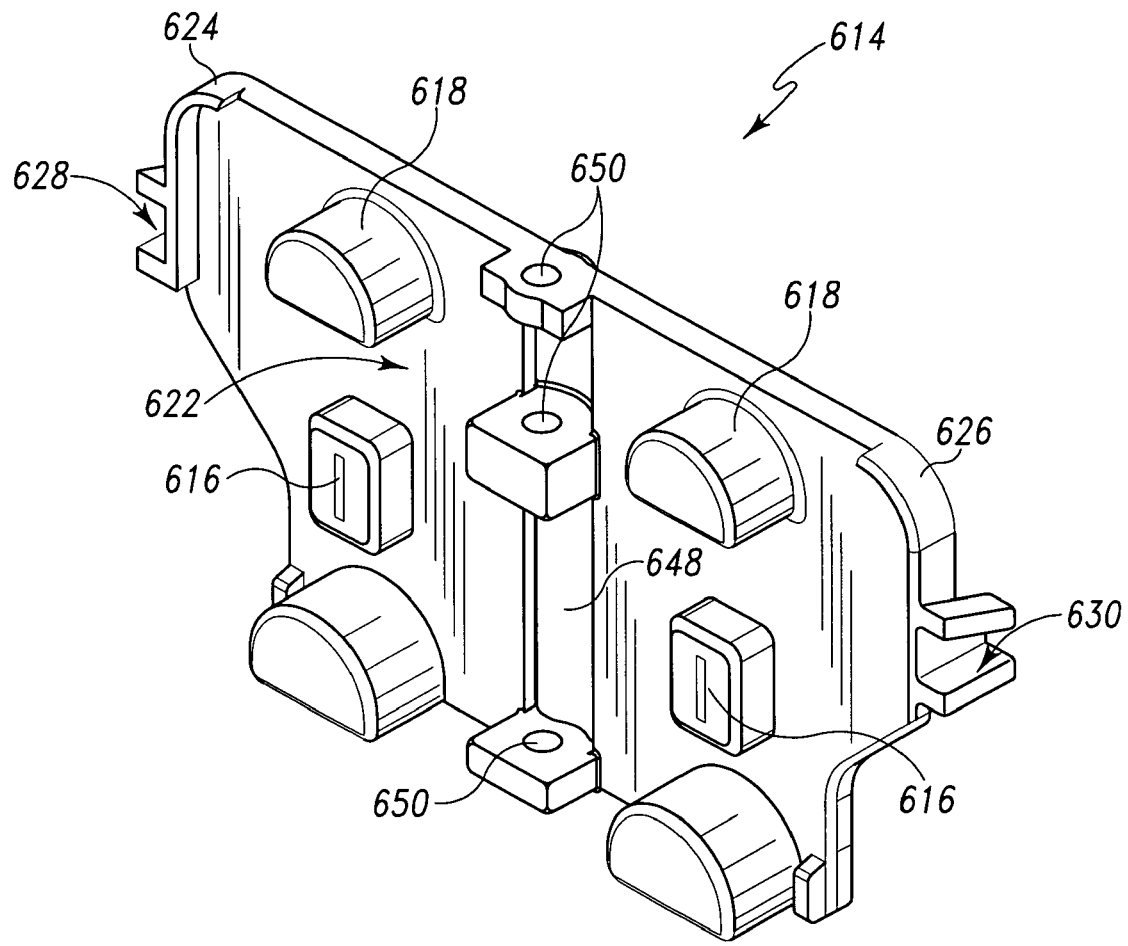
FIG. 19 is a perspective view of an embodiment of the carriage plate for use with the carriage assembly of the toaster of the present invention.
Figure 20A:
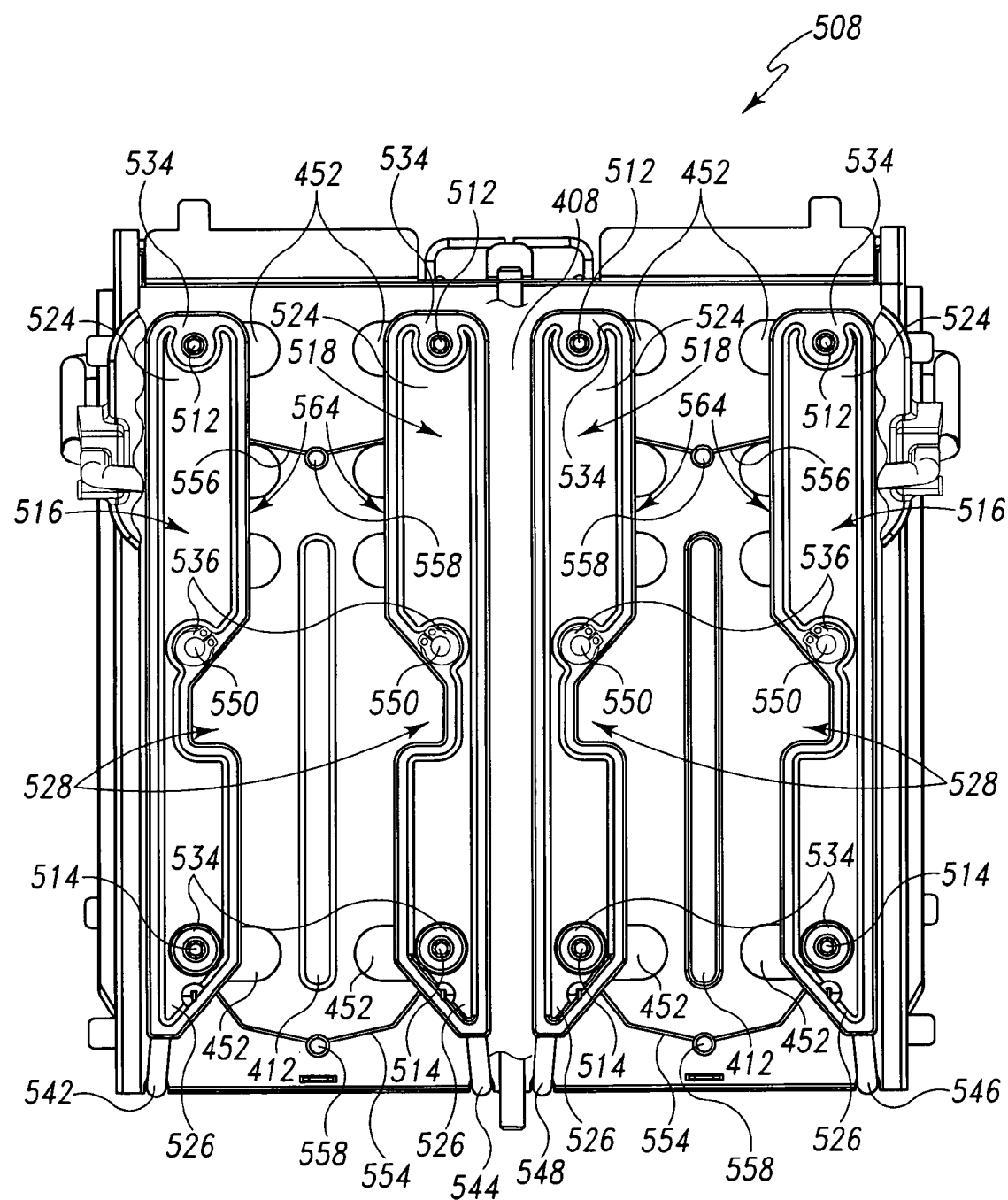
FIG. 20A is a front elevational view of an embodiment of the heating chamber and assemblies of the present invention absent a carriage assembly, and having the heating element assemblies in an open or expanded position.
Figure 20B:
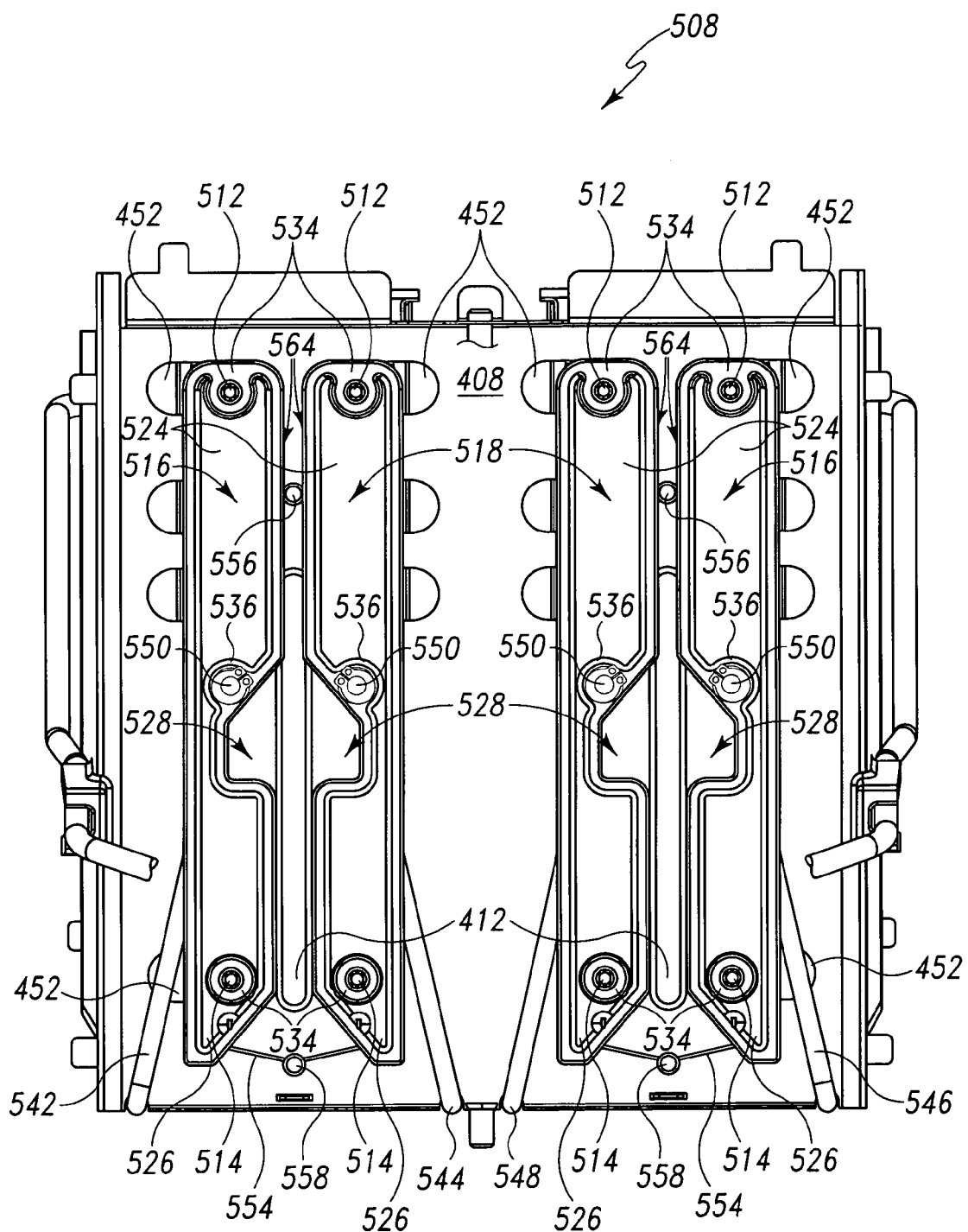
FIG. 20B is a front elevational view of an embodiment of the heating chamber and assemblies of the present invention absent a carriage assembly, and having the heating element assemblies in an inward position.
Figure 21:
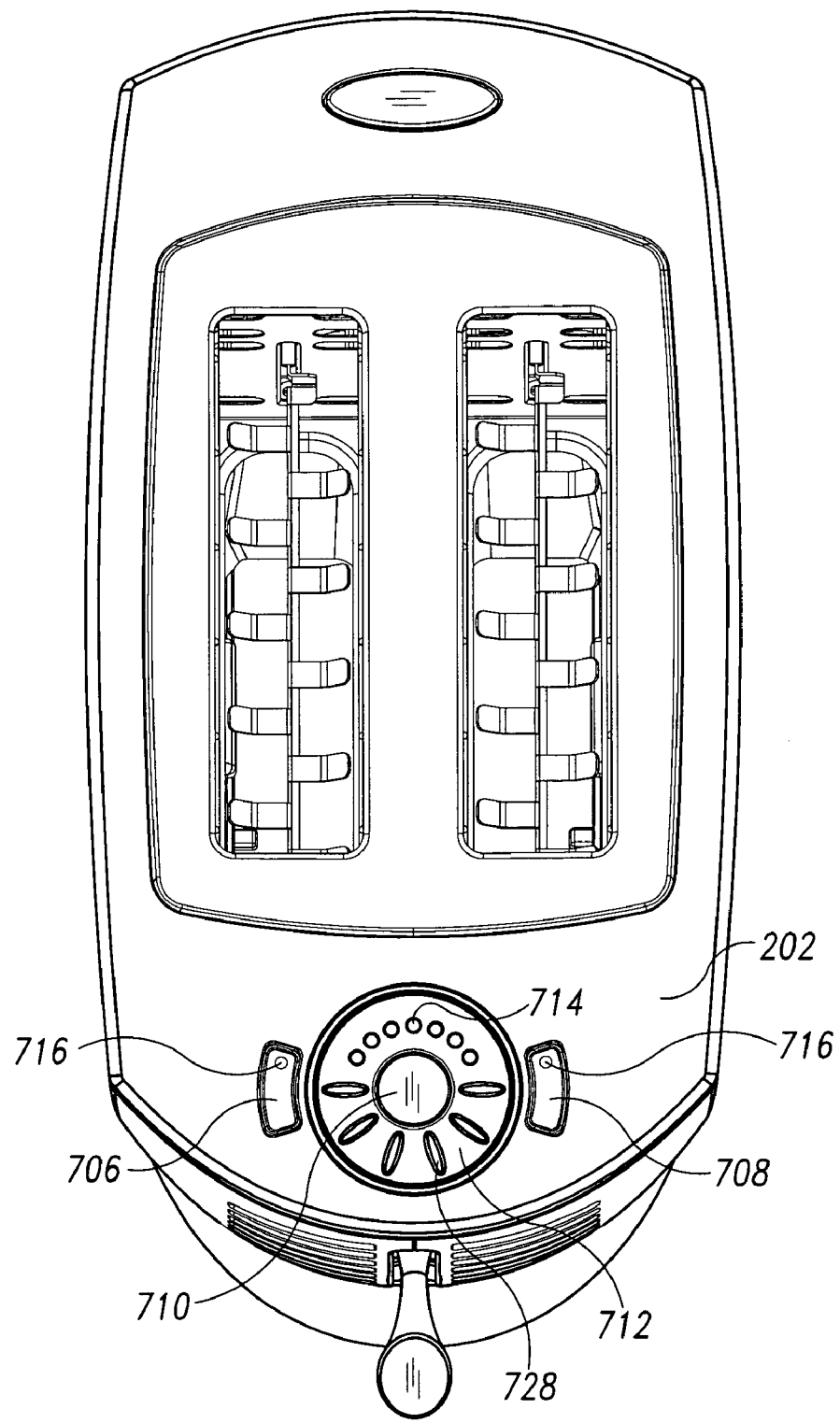
FIG. 21 is a top view of the toaster of the present invention showing an embodiment of a control interface system thereon.
Figure 22:
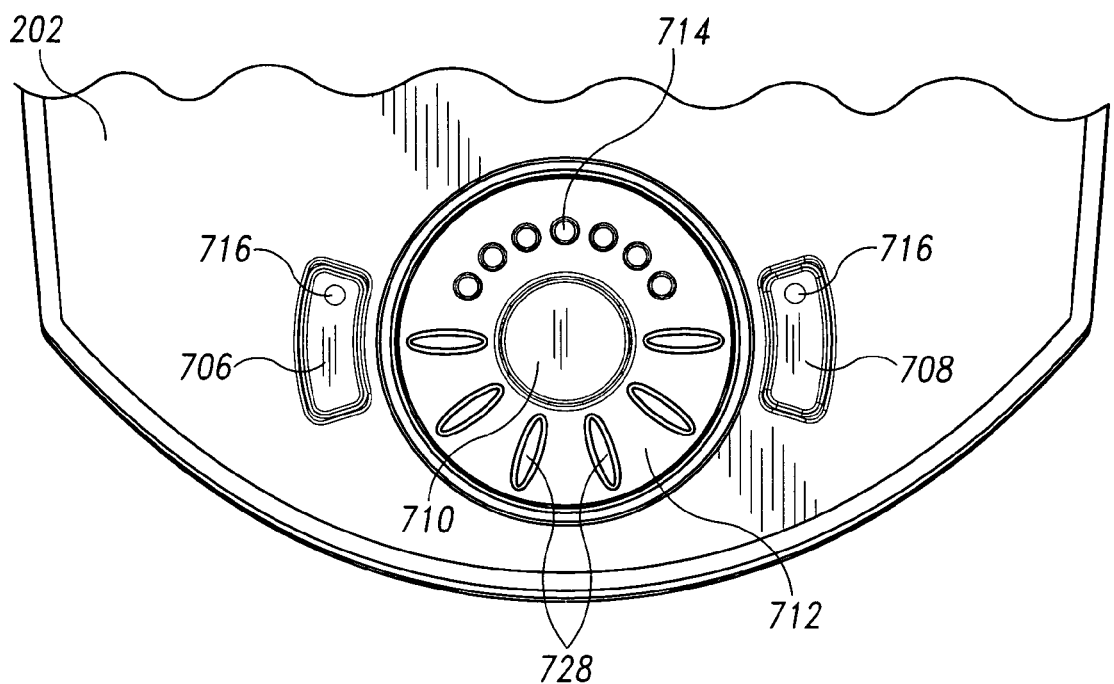
FIG. 22 is a cut away view of an embodiment of a control interface system for use with the toaster of the present invention.
Figure 23:
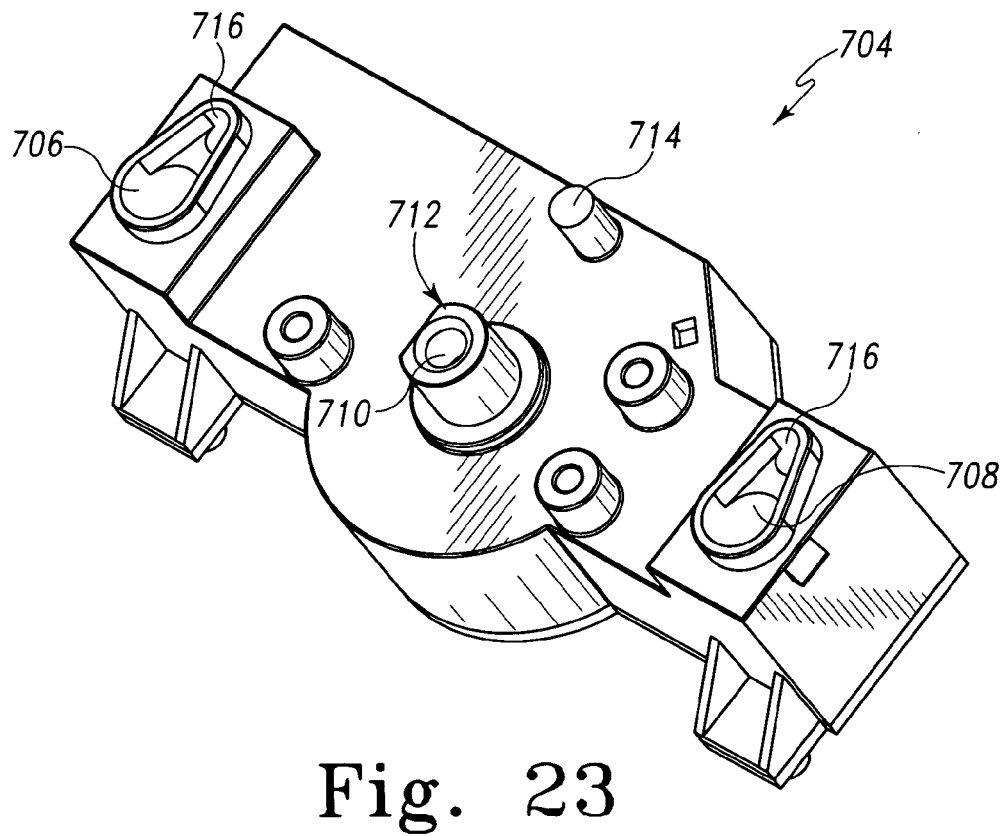
FIG. 23 is a perspective view of a main control board of an embodiment of the present invention which is positioned below the control interface.
Figure 24:
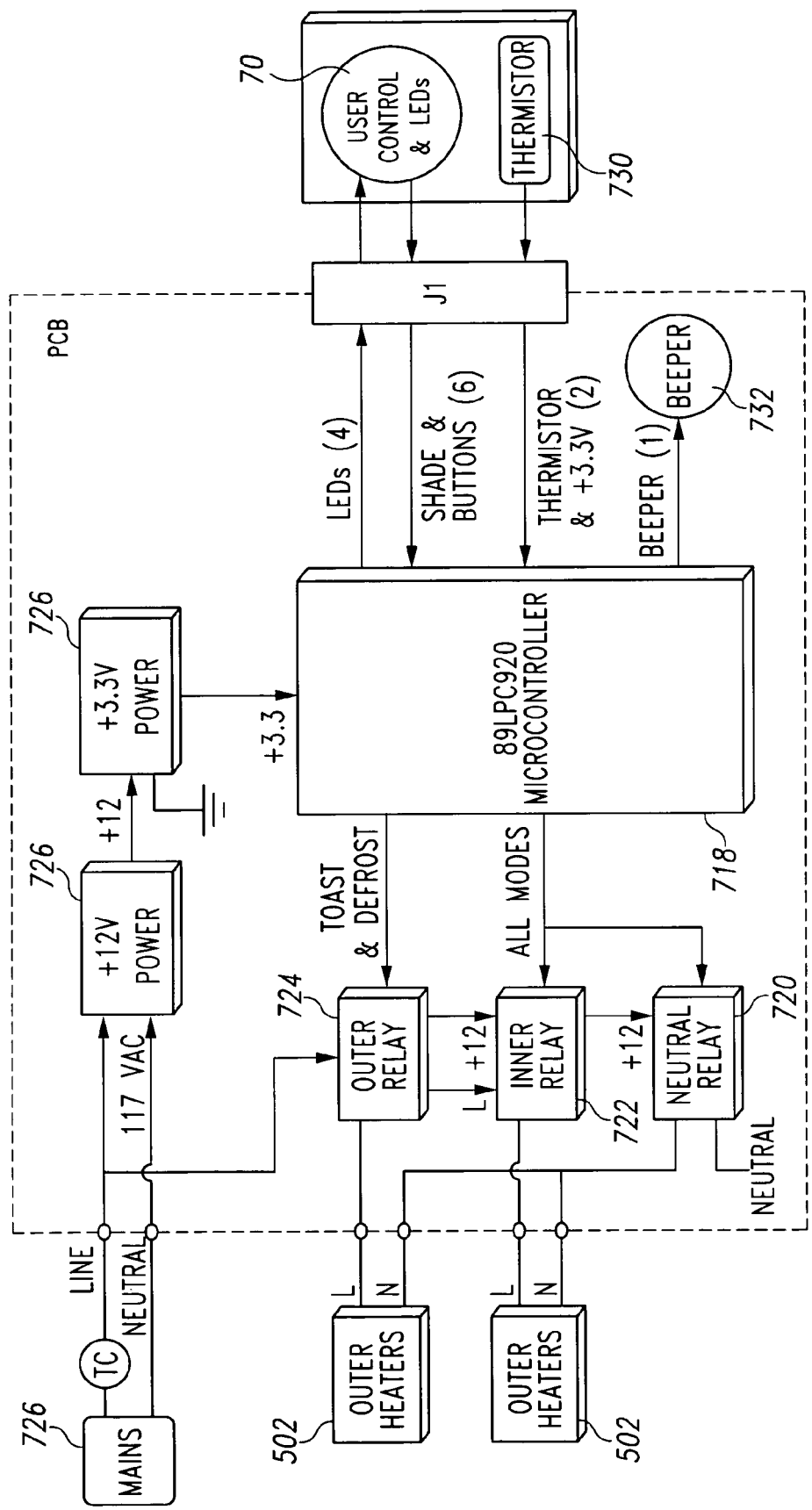
FIG. 24 is a block diagram of a main control board of a preferred embodiment of the present invention.

As indicated, the spring returns 554, 556 are preferably positioned and operably attached to the cage fingers 512, 514 adjacent the front wall 408 of the heating chamber 40. Each spring return attachment end 560, 562 may contain a wound wire connection to the cage fingers 512, 514. However, spring returns 554, 556 may be positioned at the front and/or the back of the heating chamber and/or may be attached to one or more of the linkage leaders 516, 518, 520, 522 in any manner suitable for purposes of the present invention. Furthermore, as shown in FIGS. 17D and 18D which represent an alterative embodiment of the present invention, a single spring return 554 for each pair of linkage leaders may be provided. However, more than one spring return 554, 556 may be used.

In one embodiment, as shown in FIGS. 17C-D and 18C-D, the spring return 554 is a coil spring attached immediately below the extension or outturned end of the linkage trailer 552 operably connected to the linkage leaders 520, 522. In this embodiment, the spring may be attached by circular wound or other common attachment means near the outturned end 552, which as will be seen, also comprises a central pivot point on the linkage leader bars 520, 522.

In the preferred embodiment, each pair of linkage leaders 516, 518, in combination, includes two spring returns 554, 556 adjacent thereto that bias the linkage leaders 516, 518 and therefore heating element assemblies 50, 52 or 54, 56 toward one another. Likewise, for the embodiment having a single spring return 554 described above, the single spring return 554 is provided in a central location, and in the embodiment shown, on the rear wall linkage leaders 520, 522.

Thus, the spring returns 554, 556 of the preferred embodiment are fastened, or secured in a manner directing the bias of the spring return inward, and toward the center of the bread product receiving section 420, 422. The spring returns 554, 556 are further positioned so that the base of the spring force is located substantially between the pair of linkage leaders 516, 518 or 520, 522. Further, when two spring returns 554, 556 are used on a single pair of linkage leaders, the use of spring returns 554, 556 adjacent the top and bottom of each linkage leader pair by attachment to the top 512 and bottom 514 cage or grill fingers (or alternatively, in a central location attached at or near an outturned end 550 of a linkage trailer 542, 544, 546, or 548) results in an even distribution of the force of the spring returns 554, 556 across the linkage leaders.

In operation, (referring to a single bread receiving section 420 within the heating chamber 40), as the carriage assembly 60 is moved to the lower/heating position, the resistance or more specifically, the protrusion 618 on the carriage plate 618 that holds the linkage leaders 516, 518 open and causes the expansion of the spring returns 554, 556, is moved, allowing the spring returns 554, 556 to force the front wall linkage leaders 516, 518 toward one another. As discussed above, each linkage trailer 542, 544 connects a rear wall linkage leader 520, 522 with a corresponding front wall linkage leader 516, 518, providing for the combined movement of same as the carriage 60 is moved downward and the spring returns 554, 556 move linkage leaders 516, 518 inward. The inverse is also true for an assembly having one or more spring returns 554 attached to the rear linkage leaders 520, 522. Moreover, the linkage leaders 516, 518, and 520, 522 are operably connected to the heating element assemblies 50, 52 or 54, 56. Thus, as the front 516, 518 and rear 520, 522 linkage leaders 516, 518 travel toward one another by the force of the spring returns 554, 556, and removal of the resistance caused by the carriage plate 618, the heating element assemblies travel toward one another in a uniform manner.

As can be seen from the description and Figures, in the embodiments described, the heating element assemblies 50, 52, 54, 56, and more specifically, the attached cages or grills 504, 506, are moved inward to "grab" the bread product within the heating chamber 40 and center same between the heating elements 502 as the carriage 60 is pressed down. Moreover, as a result of the central pivot point for each embodiment caused by the centralized connection and support by the linkage trailers 542, 544, 546, 548, the top 524, 530 and bottom 526, 532 of the linkage leaders 516, 518, 520, 522, and therefore the upper and lower portions 538, 540 of assemblies including the heating elements 502 and cages or grills 504, 506, may be horizontally positioned in a different location, resulting in different angles that accommodate variations or inconsistencies in the width of the bread product.

Referring again, generally to FIGS. 13-20B, and as discussed above, the toaster 10 of the present invention comprises heating element assemblies 50, 52, 54, 56 that move in connection with the movement of the carriage 60 and associated linkages. Likewise, as has been discussed, the heating chamber 40 includes a plurality of heating element assemblies 50, 52, 54, 56. Preferably, the heating chamber 40 contains four (4) heating element assemblies for a two (2) slot toaster. Therefore, in a toaster 10 having two bread platforms 414, each bread product receiving section 420, 422 contains a pair of opposed heating element assemblies 50, 52 or 54, 56 on opposite sides of the bread platform 414. Each heating element assembly in the heating chamber 40 further comprises a cage or grill 504, 506, and a resistance wire 566 or means of generating heat attached to a heating element card 568. One or more reflectors or reflective devices may also be used to transmit or reflect heat toward the bread product received within the heating chamber 40.

In a preferred embodiment, the cage or grill 504, 506 comprises a wire frame having a series of spaced apart vertical or substantially vertical bars 570, and one or more substantially horizontal bars 572 affixed thereto. Furthermore, the cage or grill 504, 506 of the device extends across a significant portion of the length and height of the bread product receiving section 420, 422 within the heating chamber 40, as is common in the art, so as to provide sufficient support for a variety of sizes and shapes of bread product received within the heating chamber 40. The cage or grill 504, 506 is the innermost component of each assembly 50, 52, 54, 56 in relation to the bread platform 414. Therefore, when in use, the cage or grill 504, 506 is provided in contact with or in close proximity to the bread product that is supported on the bread platform 414.

Attached to the cage or grill 504, 506 is a heating element card 568. The heating element card 568 is a sheet, commonly a mica sheet, having heat reflective or radiation properties to transfer heat to the bread product surface generated by the current passed through a heating element resistance wire 566, which is attached to, wrapped around, or embedded in the surface of the heating element card 568 (See also FIGS. 26A and B). The grills 504, 506, or a portion thereof, may be attached to the heating element cards 568 by rivets or other fastening devices, including, but not limited to, clamps, snap fit, grooves, and/or threaded connectors and the like. Channels may also or alternatively be provided on the top and/or bottom of the heating element card 568, into which the cage or grill 504, 506 or frame slides, so as to retain same together with the heating element card. However, any attachment and/or material useful for the purposes of, respectively, retaining the heating element card 568 together with the grill 504, 506, and for directing heat toward the bread product, would be acceptable for purposes of the present invention.

Preferably, each heating element card 568 is linked or connected to the cage or grill 504, 506 a predetermined distance behind the cage or grill 504, 506, so as to be spaced apart a specified distance from the bread product when in use. In a preferred embodiment, this predetermined distance is the optimum spacing for efficient, effective heating of bread product, providing uniformity, consistency, and speed in the toasting process without undercooking, burning or over-drying the bread product. Preferably, this distance is 0.43 inches (11 mm). However, it is contemplated that other distances may be used to accommodate specific toaster dimensions, toasting assemblies, and manufacturing preferences. The cage or grill 504, 506 of the preferred embodiment is spaced from the heating element 502 a predetermined distance by the substantially horizontally or perpendicularly turned ends 574, 576 of the cage or grill 504, 506 at the top and bottom thereof. Namely, the cage 504, 506 includes substantially horizontal top 574 and bottom 576 sections that extend to and connect with the heating element card 568, thereby providing a space between the bread product contact surface of the cage or grill 504, 506 and the heating element card 568 and wire 566. However, any means of maintaining a space between the cage or grill 504, 506 and the heating element card 568 would be acceptable for purposes of the present invention.

In addition to the substantially horizontally turned ends 574, 576, the horizontal cross bars 572 of the cage or grill 504, 506, which run the length of the bread product receiving sections 420, 422, are positioned near the upper 538 and lower 540 portion of the cage or grill 504, 506 (and therefore heating element assemblies) and have ends which extend beyond the front and back terminal ends of the cage or grill 504, 506 through the horizontal openings 452 in the front 408 and back 106 walls of the heating chamber 40 to create the heating element cage fingers 512, 514 described hereinabove.

The heating element resistance wire 566 of the preferred embodiment is a NiChrome wire. However, resistance wires of other compositions are contemplated by the present invention. The heating element resistance wire 566 may be attached to the card 568, wound around the card, or embedded in the card by any means common in the art for fastening same. Applying a current to the heating element resistance wire 566 causes the wire to heat, and transfers or distributes the heat along the card 568. As a result, the heating element resistance wire 566 and card 568 radiate heat out toward the bread product when in use. The wire pattern is such that it distributes heat evenly on the card 568 and to the surfaces of the bread product. It is contemplated that any heating element resistance wire 566 pattern providing efficient or effective heating of the bread product would be acceptable for purposes of the present invention. For example, the heating chamber 40 of a preferred embodiment comprises an angled orientation. Therefore, the heating element may be provided in a fan shape or angled pattern to effectively distribute heat across the heating element card 568. In a preferred embodiment, as shown in FIGS. 26A and B, the resistance wire 566 is distributed across the heating element card 568 in a fan shaped pattern. However, other resistance wire patterns are also contemplated by the present invention. Additionally, while a heating element card and resistance wire are specifically described, other heaters and heating systems may be used in place of or in connection with same without departing from the overall scope of the present invention.

In addition to the attachment to the heating element card 568, to allow movement of the heating element assemblies 50, 52, 54, 56 while retaining the electrical connection, the heating element resistance wire 566 is attached to a terminal that is surrounded with a ceramic sleeve and positioned as the interface between the heating panel and the outside of the heating chamber 40. A wire 702 supplying the electricity to the heating elements 502 is then attached to the terminal and routed to the main control board 704 which controls the power supplied to the heating elements 502.

Accordingly, the cage or grill 504, 506, the heating element card 568, and heating element wire 566 are combined into a single assembly which is further linked through the heating element cage fingers 512, 514 to the linkages 516, 518, 520, 522, on or near the heating chamber 40. As a result, the heating elements 502 will move in connection with the cage or grill 504, 506 as the carriage 60 is moved up and down. Furthermore, movement of the heating elements 502 which are attached and retained at a predetermined distance from the cage or grill 504, 506, will allow the heating elements 502 to always remain at the optimum distance from the bread product regardless of the width or inconsistent width of the bread product.

With respect to FIGS. 13-16D and 19-20B, the carriage assembly will now be specifically described. As indicated above, preferably, the carriage 60 controls, in part, the movement of the linkage leaders 516, 518 and attached components. The carriage assembly 60 comprises a carriage plate 614 located on or near the front wall 408 of the heating chamber 40. The carriage plate 614 is further positioned so as to locate the front wall linkage leaders 516, 518 between the front wall 408 of the heating chamber 40 and the carriage plate 614. The carriage plate 614 of the preferred embodiment comprises an outwardly facing surface 620 that faces away from the heating chamber 40, and a guide surface 622 on the opposing side. Namely, the guide surface 622 of the carriage plate 614 faces the heating chamber 40. The outwardly facing surface 620 may comprise holes, slots or notches stamped there through reflecting one or more guides facing the guide surface 622. In particular, associated with each bread receiving section 420, 422, the carriage plate 614 further comprises a slot 616 for receiving an extension 416, 418 of the bread platform 414 to enable the movement of the platforms in connection with the carriage assembly 60. The guide surface 622 of the carriage plate 614 comprises a semicircular guide or protrusion 618 extending from or connected to the carriage plate 614 extending toward the heating chamber 40, and more preferably, toward the front wall 408 of the heating chamber 40. Preferably, in a two (2) slot toaster, the carriage plate 614 comprises at least two (2) slots 616 for receiving two (2) bread platform extensions 416 and two (2) semicircular guides 618.

The semicircular guides 618 correspond to, and are adapted to mate receivingly within indentations 528 or variations in the shape of the front wall linkage leaders 516, 518 as seen in FIGS. 13 and 19-20B. The guide 618 presses against the inner wall 564 of each linkage leader, and by the engagement therewith, as the guide 618 moves in connection with the carriage assembly 60, it assists in directing the movement of the linkage leaders 516, 518 adjacent the front wall 408 of the heating chamber 40. Thus, in operation, when the carriage plate 614 is in its raised loading/unloading position, the semicircular guide 618 serves as a spacer that separates the first 516 and second 518 linkage leaders associated with each bread product receiving section 420, 422, and as a result, retains the heating element assemblies 50, 52, 54, 56 in their open or spaced apart position. However, as the carriage assembly 60 travels downward, by manual operation or movement of the carriage lever 610 and knob 612, the semicircular guide 618 travels downward along the inner wall surfaces 564 of the linkage leaders 516, 518 until it reaches the indentation 528 in the linkage leaders. Preferably, the inner wall 564 comprises at least a partially sloped or curved surface. As a result, a smooth transition is provided for the movement of the semicircular guide along the linkage leader both into and out of the indentation. This innermost point of the indentation 528 corresponds to the lowest position of the carriage plate 614 and associated assembly 60, which also corresponds to the heating position. In the lowest position, the indentation 528 permits the linkage leader pairs 516, 520 and 518, 522 to travel toward one another, thereby allowing the attached heating element assemblies 50, 52 and 54, 56 surrounding each bread product receiving section 420, 422 to travel inward and grab the bread product in the slot or receiving section within the heating chamber. The movement of the heating element assemblies 50, 52, 54, 56 and associated linkage leaders 516, 518, 520, 522 is limited only by the size of the bread product, and the size of the semicircular guide 618. As the carriage 60 is moved upward to return the bread product to its upper receiving/delivery position, the semicircular guide 618 moves upward in connection with the carriage assembly 60 and presses against the sloped surface of the linkage leaders 516, 518 forcing the linkage leaders apart. Preferably, the increase in slope and/or width of the linkage leaders causes the linkage leaders 516, 518, 520, 522, and therefore the attached heating element assemblies 50, 52 and 54, 56, to separate until the outermost edge of the inner wall 564 of the linkage leaders 516, 518 is reached. Again, the smooth slope provides for a smooth increase in the width or spacing between the heating element assemblies 50, 52 and 54, 56 as the carriage 60 and bread platforms 414 are manually raised. As a result, bread product can be easily raised and removed. At the same time, the carriage enables the toaster to receive variations in the width and shape of bread product.

In addition to the above, the carriage plate 614 further comprises perpendicular surfaces 624, 626 at the sides thereof. Surfaces 624 and 626 are substantially perpendicular to the outwardly facing surface 620 of the carriage plate and are preferably provided along a top curve or a corner of the carriage plate 614. These surfaces 624, 626 may also comprise a slot or groove 628, 630 along a portion thereof for receiving a portion of a U-shaped carriage lever rod 602.

The carriage assembly 60 of the preferred embodiment, in addition to the above, the carriage plate comprises at least one, but preferably a plurality of bread platforms 414 attached to the carriage plate in the manner described herein above. Additionally, the carriage assembly 60 comprises a U-shaped carriage lever arm or rod 602 attached to the carriage plate 614, and including a carriage lever 610 and knob 612 attached thereon for user operation of the carriage assembly 60, and more specifically, to permit user control of the lifting and lowering of the bread product. The U-shaped carriage lever arm 602 has two parallel rods or extensions 632, 634 connected at one end by a substantially perpendicular connecting rod 636. The two parallel rods 632, 634 are secured at the rear of the toaster's heating chamber 40 by tabs 638. Namely, tabs 638 extend away from the heating chamber 40 at the rear thereof, and have a hole or slot therein for receiving the ends of the parallel rods 632, 634 of the U-shaped carriage lever arm 602, which in a preferred embodiment are a substantially cylindrical rods having bent ends. The parallel rods 632, 634 extend from the tabs 638 at the rear of the heating chamber 40 forward along the sidewalls 404, 406 of the heating chamber 40, and are spaced a distance therefrom. At the forward end of the heating chamber 40, the parallel rods 632, 634 are interconnected by connecting rod 636, and are connected to the carriage plate 614 at the slots or grooves 628, 630 on the sides thereof. Preferably, the end of the slots or grooves 628, 630 near the sides of the carriage plate 614 closest to the heating chamber (such as, on the side corresponding to the guide surface 622) are wider than near the side of the slot or groove 628, 630 furthest from the heating chamber (such as, on the side corresponding to the outwardly facing surface 620), so that the two parallel extensions 632, 634 are able to pivot or change their angle in relation to the carriage plate 614 as the U-shaped carriage lever arm 602 is pivoted and attached carriage plate 614 is moved downwardly or upwardly. In other words, a small amount of "play" is provided on one side of the carriage plate slot or groove 628, 630 to permit an increase or decrease in the angular relationship between the parallel rods 632, 634 and the carriage plate 614 at the position of the grooves 628, 630 as the carriage assembly 60 travels down, and to permit a decrease or an increase in the angular relationship between the parallel rods 632, 634 and the carriage plate 614 as the carriage assembly 60 travels up. However, the slots or grooves 628, 630 on the sides of the carriage plate 614 may also comprise a snap fit or tighter connection between the groove and the U-shaped lever arm.

Preferably, to accommodate the use of both the U-shaped carriage lever arm 602 and the heat shield 426 described above, the bent ends 640 of the U-shaped carriage lever arm are positioned within holes through the partial side walls 442, 444 of the heat shield 426. Thus, the U-shaped carriage lever arm 602 is positioned on the outside of the heat shield 426, while the remainder of the carriage assembly 60, and the moveable heating element assemblies 50, 52, 54, 56 on which it acts are within the heat shield 426. As a result, the carriage 60 can be operated and used at the front of the toaster, yet a complete heat shield 426 is provided at the front and rear of the heating chamber 40 that does not interfere with the operation of the carriage assembly, or require a space or perforation within same for operation of the carriage which could allow heat to escape out the front of the device, and potentially damage any controls or other components on the front of the device and/or overheat the housing, risking injury to the user.

Positioned on the front crossbar or connecting rod 636, preferably near the center thereof, is a carriage lever attachment plate 642. The carriage lever attachment plate 642 is secured on one side to the connecting rod 636 by any means known in the art, such as, but not limited to, threaded connectors, snap-fit, friction fit, tongue and groove, clamps and the like. The attachment plate 642 is further attached to the carriage lever 610. The lever 610 extends from the attachment plate 642, which is within the toaster housing 20, out of the housing through the vertical or substantially vertical slot 222 in the front wall 210 of the housing 20. The lever 610 and/or attached knob 612 can then be acted upon by the user. As a result of the combination, the U-shaped carriage lever arm 602 moves the carriage plate 614 in response to the user depression or upward movement of the carriage lever 610 and knob 612.

An alternative embodiment of the carriage system 60 comprises a substantially rectangular plate with a pair of upwardly extending linkage trailer guides. Similar to the above, two slots 616 may be provided within the carriage plate 614 for receiving bread platform extensions 416, 418 so as to hold each bread platform 414 in place, and permit the movement of same in connection with the movement of the carriage 60. Likewise, a carriage lever 610 and knob 612 are also provided in operable connection with the carriage plate 614 to permit the user to manually raise and lower the carriage 60 and associated bread platforms 414. Distinguished from the previously described embodiment, the carriage plate 614 and associated linkage trailer guides comprise an outer rim having a thickness sufficient to support at least one pivot pin or outturned end 550, 552 of a linkage trailer 542, 544, 546, 548. Furthermore, in association with each bread platform 414, on the inner guide surface 622 or inner face of the carriage plate 614 the inner rim is continued downward across the face, spaced from and parallel to the outer rim discussed previously. In addition, each linkage trailer guide has a pair of upwardly extending angled surfaces. Preferably, at its widest point, the width or spacing between the inner rim and outer rim corresponds to the width of the bread product receiving section 420, 422 in its most open position.

In this embodiment, the outturned end 550 of each linkage trailer 542, 544, 546, 548 may extend through the central receiving slot 536 in the linkage leaders 516, 518, so that a portion of each outturned end extends away from the linkage leader, forming a pivot pin. Moreover, as a result of the central location of each outturned end 550, 552 in the linkage leader 516, 518 and 520, 522 the outturned end comprises a central pivot point for the linkage leaders. The outturned ends, which form the pivot pin contact the rim surfaces of the linkage trailer guides on the carriage plate, providing a stationary point from which the linkage leader 516, 518, 520, or 522 can pivot. Similar to the previously discussed embodiment, this results in the movement of the heating element cage or grill fingers 512, 514 within the horizontal openings or slots 452 at the top and bottom of the front 408 and back 410 walls of the heating chamber 40.

Accordingly, in the operation of the alternative embodiment, when the carriage 60 is in its uppermost position, the outturned ends 550, 552 or pivot pins are in contact with the inner and outer rims of the carriage plate 614, thereby forcing linkage leaders 516, 518 and therefore, 520, 522 apart. However, as the carriage 60 is moved downward, the pivot pins travel along the rim of the carriage plate 614, and toward one another as the pivot pins travel across the upwardly extending angled surfaces. At the same time, the linkage leaders 516, 518 are biased or forced inward by the spring returns 554, 556 as the carriage 60 approaches its lowermost position.

The carriage plate 614 is slidably fastened to or at least partially surrounds a guide rod 644, allowing a substantially upward and downward movement of the carriage 60 without lateral movement within the toaster 10. In a preferred embodiment, a carriage damper 646 is also provided to reduce the noise or "screeching" and vibration generally associated with common carriage systems. To engage the guide rod 644 with the carriage plate 614 and/or the carriage damper 646, a central receiving slot 648 is provided in the carriage plate 614 and has, at least on the top and bottom thereof, partially rounded or semicircular receiving sites 650 for slidably receiving the guide rod 644. A circular or semicircular rubber or plastic damper 646 may be provided and held within or near the central slot 648, at least partially surrounding the guide rod 644 to reduce the noise and vibration associated with the movement of the carriage plate 614 on the guide rod 644. The carriage damper 646 of an alternative embodiment is a rubber or plastic, substantially U-shaped member that likewise, at least partially surrounds the guide rod 644 and reduces the noise and vibration associated with the interaction of the carriage 60 with the rod 644 during movement. A substantially U-shaped damper 646 may be clipped or pressed into position on the guide rod 644.

Preferably, the carriage damper 646 is attached in moveable contact with the guide rod 644 in a position connected to, within, or immediately above or below the carriage 60, and preferably the carriage plate 614, so that as the carriage 60 is moved along the guide rod 644 the carriage damper 646 moves along with it and absorbs the vibration and noise commonly associated with two hard, often metal, surfaces sliding against one another. It is noted that the carriage 60, guide rod 644, and damper 646 may be constructed of any material or shape common in the art suitable for purposes of the present invention, including but not limited to, plastic, metal, rubber materials, the like, and shaped in circular, cylindrical, rectangular forms, or other geometric shape or the like.

While specific carriage assemblies are disclosed, various carriage systems are known in the art and would be acceptable for use in association with the various elements and sub-assemblies of the present invention. Likewise, alternative systems and/or sub-assemblies may also be used in connection with the present invention. As a non-limiting example, an alternative embodiment may comprises a carriage provided in sliding contact with a pair of spaced apart parallel guide rods for the generally vertical movement of the carriage. Likewise, the carriage plate may be provided with one or more triangular wedge shaped protrusions having a narrowed end of the wedge positioned toward the top of the carriage plate and further comprising corresponding linkage leaders having sloped surfaces for interaction with the wedge shaped protrusions. Therefore, as the carriage travels downward, the outer rim surfaces of the wedge shaped protrusions slide along the sloped surfaces of the linkage leaders, moving the linkage leaders (and the corresponding heating element assemblies) inward. Further, at the lowest point of the carriage, the sloped surfaces of the opposing linkage leaders may comprise or form a triangle that matingly receives the wedge shaped protrusion. Similarly, the upward movement of the carriage would thereby force the linkage leaders apart by the pressing the sloped surfaces against the wedge shaped protrusions.

The carriage assembly 60 of the preferred embodiment is designed for use as a manual lift. As a result, the bread product is retained within the heating chamber 40 to remain warm until the user can withdraw the bread product. As a manual lift, at the end of the toasting cycle, the user must manually raise the carriage assembly 60 by raising the carriage lever 610 and knob 612 to withdraw the heated bread product. In other words, the control of the toasting cycle is separate from the lifting or lowering of the carriage assembly 60 and bread product. However, it is contemplated that many of the embodiments, sub-assemblies, and features described herein may be adapted to fit a "pop-up" toaster.

Referring now to FIGS. 21-25, the toaster control interface system 70 will be described in further detail. Considering that a manual lift toaster 10 separates the toasting cycle from the raising and lowering of the carriage 60, contrary to pop-up toaster models, the toaster 10 of the preferred embodiment is not activated by the lowering of the carriage 60 and/or engagement or completion of an electrical connection. Instead, the user must provide further control or communication to the toaster 10 to activate same and designate the preferred toasting cycle. To facilitate same, a toaster control interface 70 is provided. The toaster control interface 70 is preferably attached to a main control board 704 for receiving communications from the controls selected by the user, and for directing many of the actions of the toaster 10. In addition, contrary to traditional toaster models, the control interface 70 of the present invention is positioned on the top face 202 or surface of the toaster 10, allowing the user an easy view of the status of the toasting cycle and the control interface 70 for same simultaneously.

The main control board 704 of the present invention, independently and/or through the selection of various controls or commands on the control interface 70, is used to control the various functions of the toaster 10, including, but not limited to the functions designated by the user for operating the device, as well as the monitoring of the temperature and/or other environmental factors in the heating chamber 40 through receipt of communications from, for example, a sensor and/or a thermistor. The main control board 704 may be a circuit board (represented generally by block diagram at FIG. 24) having interconnected microcontroller 718, neutral relays 720, inner relays 722, and outer relays 724, as well as power supplies 726, and other like components. The main control board 704 may be provided in any location within the toaster housing 20 suitable for same. In the preferred embodiment, the main control board 704 is provided below the toaster control interface 70 toward the front of the toaster 10.

The function buttons 706, 708, the activation control 710 of the toaster, and the shade selection dial 712 may each be operably connected to the main control board 704. Preferably, as discussed previously, a wire 702 extends from the control interface/board 70/704 to the heating elements 502 for communicating with the heating elements in response to signals generated by the controls. Thus, in response to the selection of specific controls by the user, the main control board 704 may communicate with the respective toaster elements and sub-assemblies to provide a response, such as, but not limited to, heating the bread product in the requested manner. Likewise, in a preferred embodiment, the main control board 704 may also communicate with a signal device to activate and/or illuminate signals to the user, such as LED lights 714, 716 and/or signal tones or other means of communication with the user.

The toaster control interface 70 of the present invention comprises a central push button 710 for activation of the toaster 10. Namely, the central push button 710 functions as an ON/OFF button and/or a START/STOP/CANCEL button. The central push button 710 maybe illuminated by direct or indirect lighting to designate the status of the toasting cycle, although illumination is not required. While a single button is disclosed, more than one button could be used separately and/or for operating one or more of the above-listed functions.

Contrary to common toaster systems, which utilize a potentiometer for designating the shade of toasted bread product, surrounding the central push button 710 is a concentric rotary dial 712 for designating the shade of toasted bread product. The rotary control 712 is provided in operable connection with the central push button 710. The rotary control 712 moves rotationally around the central push button 710, limited only by the degree of rotation required to achieve the desired shade. The concentric rotary dial of a preferred embodiment comprises a single LED light 714 on a portion of the circumference of the circular dial 712, along with a plurality of protrusions 728 on the dial 712 for ease of user contact and rotation of the circular dial 712. Preferably, protrusions are provided as contact points for the user's hand or finger. The rotary control 712 may alternatively comprise a single protrusion 728, or a handle or depression on one section of the control. The LED serves as an indicator 714 that corresponds to preset bread product shade settings. The toast shade control rotary dial 712, discussed in further detail below, preferably comprises a seven (7) shade control for bread product browning shade selection.

In addition to a central push button 710 and a concentric rotary dial 712, function buttons or control points 706, 708 may also be used for controlling the toasting cycle and modes in the control interface 70. In a preferred embodiment, the function buttons 706, 708 are located adjacent to the central push button 710 and rotary control 712. One or more function buttons may be provided. The preferred embodiment incorporates at least two (2) function buttons 706, 708. Common function or mode button examples include, but are not limited to, bagel mode, defrost mode, reheat mode, warning mode, as well as other food selections, such as English muffin, bun, waffle, and the like. Each mode typically involves different heating and/or timing requirements.

While specifically referred to herein as "buttons", the functions buttons 706, 708 and central button 710 may be push button switches, keys or buttons; touch sensitive buttons, keys or switches; dials; knobs; and the like. In the preferred embodiment, in addition to the central push button 710 the functions buttons 706, 708 are also push button controls. Thus, selection of a function or mode by depression of a button 706, 708, 710, and/or rotation of the dial 712 alters the timing and heating pattern used by the toaster 10 and control board 704 to prepare the finished product. Similar to the other controls, LED lights 218 may also provided within the function buttons 706, 708, and preferably near the center thereof for indicating the selection or depression of the function key.

As discussed above, visual means of indicating the status of the toasting cycle, as well as the modes or controls selected, may be provided. For example, the ON/OFF button 710 may be illuminated. Likewise, the selection of a toast shade may correspond to the illumination of an LED light 716. The rotary dial shade setting, or increment of lightness/darkness of heated bread product could be indicated by the use of indicators 714 delineating discrete set points. Namely, the indicator 714 may be illuminated when the rotary dial 712 is set to a specific level in the range of shades or increments. The rotary dial 712 is provided with a radial array of holes or reflective covers or devices arranged above a stationary LED light 714. These holes or reflective devices correspond to shades of toasting and/or increments of time. Therefore, as the shade control 712 is rotated, the single stationary LED 714 provided under the dial 712 (see FIGS. 8 and 23) illuminates and/or shines through the hole of the selected shade setting that passes over the LED light. Alternatively, LED lights may be provided above or on the housing or on the rotary dial itself. Likewise, multiple LED's could be used without departing from the scope of the present invention.

As discussed, each function button 706, 708 is preferably provided with an LED light 716, either integrally or in proximity thereto. In the preferred embodiment, LED lights 716 are provided in at least a portion of the function button 706, 708, and are illuminated when the button is pressed to designate the selection of that function. De-selection, by pressing the function button 706, 708 a second time, will shut off the LED light 716.

It is contemplated that other means of indicating status, such as the illumination of the buttons directly or indirectly or an LED above the buttons, the illumination of multiple light sources for each setting, the illumination of the dial, the illumination of multiple LED's individually or simultaneously, the use of a single moving light source, or an audible signal may also be acceptable for purposes of the present invention. Furthermore, while a specific system, number of toast shades, and toasting modes are disclosed, any variety or combination of controls and means of illumination may be acceptable for purposes of the present invention. Likewise, other commonly used control systems and function controls, such as mechanical switches, membranes, touch screen, LCD type systems and the like may also be used without departing from the overall scope of the present invention.

With reference to the specific function options of the toaster 10 of the present invention, bagel and defrost modes will be further discussed herein. However, it is contemplated that other functions and modes would be acceptable for purposes of the present invention. Preferably, in the absence of a selection of a toasting function, the toaster 10 will operate in a "default" setting in which toasting time and operation or control may be provided and based upon the designated toast shade selection, plus or minus the time used to compensate for variations in toaster temperature, such as would be communicated to the main control board 704 by a thermistor 730. However, to toast a bagel and the like, bagel mode is selected by the user from at least one of the function keys 706 or 708. The selection of bagel mode deactivates two of the heating elements 502, and preferably, will deactivate the heating elements facing the bottom half of the bagel so that only the inner surface of the bagel is toasted. Typically, a designation or label will be provided on the toaster housing 20 to indicate to the user which heating element will be deactivated for appropriate orientation of each half of the bagel or other similar bread product.

Defrost mode, as provided in a preferred embodiment of the present invention, provides a means of defrosting freezer products and/or toasting same in the toaster 10 by the selection of at least one defrost mode key 706 or 708. Preferably, the defrost mode will consist of a lengthened toasting or heating cycle. However it is contemplated that other methods, such as pulses of heat or low power heat would also be acceptable for the purposes of the present invention.

In addition to the functions described hereinabove, the present invention incorporates the use of a signal tone and/or a flashing light (such as one of LED lights 714 and 716 on the toaster control interface 70) for signaling the end of the toasting cycle. This is particularly relevant for a manual lift toaster 10, as the toast will not pop-up at the end of the toasting cycle, but will instead be retained within the toaster. Accordingly, at the end of the heating cycle, the bread product is retained in the heating chamber 40, the heating elements 502 are shut off, and a signal and/or audible signal and/or visual indication of status provides an alert to the user that the heating cycle has ended. As a result, the bread remains warm within the warm heating chamber 40 and does not require the user's immediate attention to remove the bread product, yet the user is alerted to the end of the heating cycle.

As stated, in order to signal the end of the toasting cycle, an audible signal-may sound from a signal device or sound transducer 732 to alert the user of the end of the cycle and the necessity to retrieve the bread product. In addition, further, subsequent signals may occur or sound periodically to provide a reminder to the user who has forgotten the bread product in the heating chamber 40. The signal may comprise a piezoelectric pleasant tone, electronic voice coil, a bell tone or buzzer, and the like. Alternatively, a blinking light or color change of a light and the like, may be used to signal the end of the toasting cycle. This light could be combined with one or more of the LED's associated with the controls 706, 708, 710, 712 and/or may be separated therefrom. Likewise, a signal tone may be combined with a flashing light into a single cycle termination status signal communicated to the user.

In a preferred embodiment, control algorithms may be used to change the toaster setting during a toasting cycle by selection of a function 706, 708, 710 or shade 712, as well as other variables, such as toaster temperature. In the preferred embodiment, the toasting cycle is primarily time driven. Thus, based upon the shade selection and the mode, the heating elements 502 will be activated for the corresponding period of time for the selected settings to provide a satisfactory bread product. As stated previously, in the absence of the selection of a mode, a default cycle may occur, dependent upon the shade setting and chamber or toaster temperature. The default setting operates all heating elements 502. In addition, the control assembly 70 of the present invention may be provided with a means to monitor the internal heating chamber temperature by inputs received from a thermistor 730 or similar device. In particular, the main control board 704 through a thermistor 730 monitors the temperature and readjusts the cycle time, typically a shorter time, for successive toasting cycles to accommodate optimum heating conditions and time for a heating chamber 40 that is already warm. While control of the time of a toasting cycle is specifically provided, those of skill in the art would understand that the control could be used for other purposes, including, but not limited to, the monitoring or varying of other factors such as, but not limited to, the temperature of the heating elements 502 to accomplish the same function. Sensors may also be used for monitoring various conditions, features and/or actions of the toaster and can be used for making adjustments to the toasting cycle.

Figure 25:
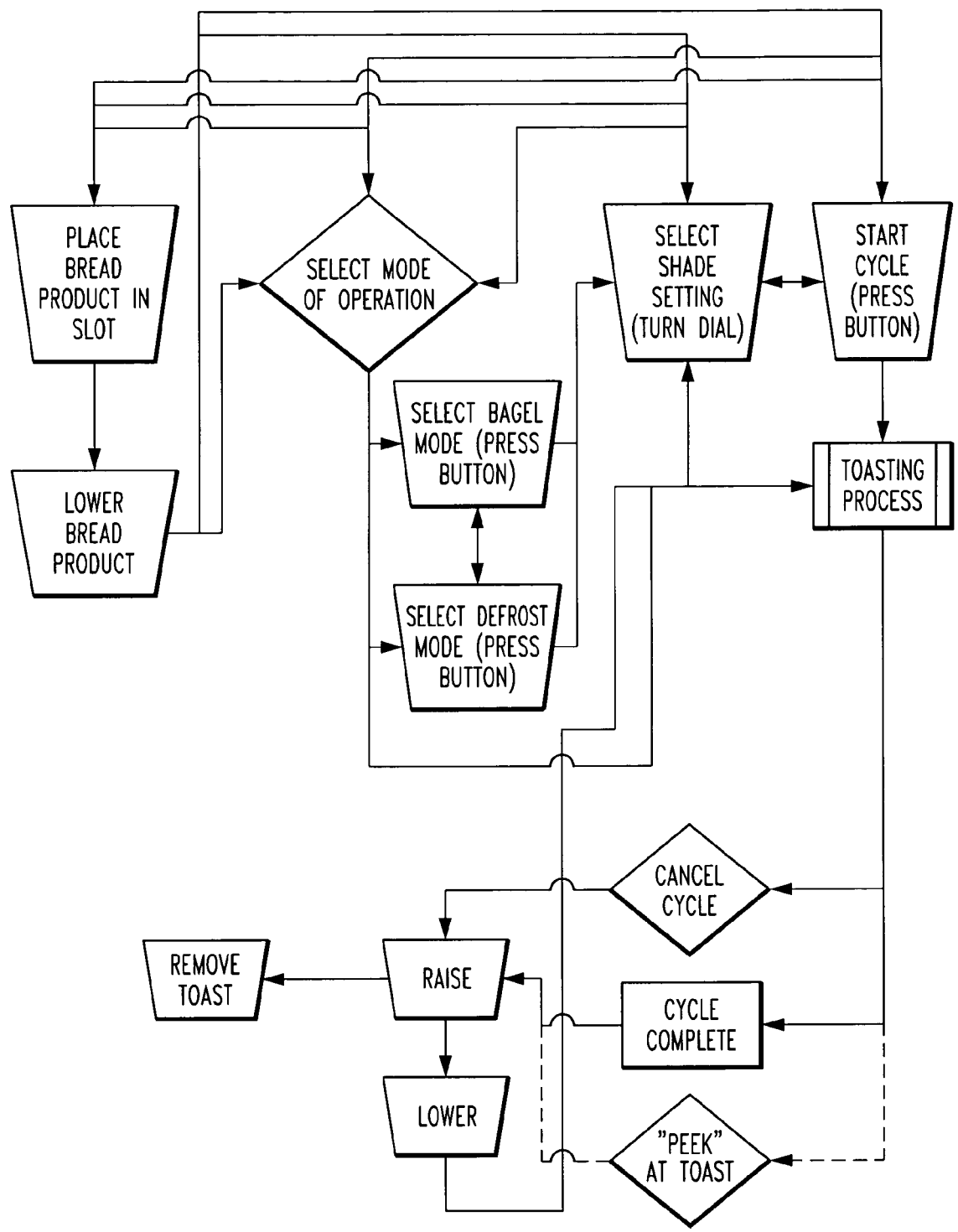
FIG. 25 is a toaster control operational flow chart for an embodiment of the toaster of the present invention.

With reference to FIG. 25, the method of operation or use of the toaster 10 of the present invention will now be discussed in further detail. Specifically, a user desiring to toast a bread product first places the bread product within the bread product receiving sections 420, 422 through the slots 232 provided in the top 202 of the toaster 10. The user then grasps the carriage lever 610 or knob 612 and manually lowers the bread product into the heating chamber 40. As the bread product is moved into the heating chamber 40, the heating element assemblies 50, 52 and 54, 56 move toward the bread product. The cages or grills 504, 506 of the heating element assemblies grasp the bread product, centering same, and space the heating elements 502 a predetermined optimum distance from the surface of the bread product. Once the bread product is lowered into the heating chamber 40, the user may then select the functions and shade of toasted bread product desired by operation of the controls 706, 708, 710, 712 on the control interface 70. It is also contemplated that the user may select the relevant controls prior to lowering the bread product into the heating chamber 40. Once the desired controls are selected and the bread product is lowered into the heating chamber 40, the user presses the ON button 710 to begin the toast cycle. The toast cycle continues for a period of time corresponding to the shade of toast selected with the rotary control 712 and the function 706 and/or 708 selected. The user may cancel this cycle at any time prior to the end of same by selection of the OFF or CANCEL button 710. At the end of the toasting or heating cycle, the heating elements 502 deactivate and a signal tone and/or visual signal notify the user that the toasting cycle has ended. When ready, the user then manually raises the carriage lever 610 to raise the bread product to its original raised insertion/delivery position and withdraws the toasted bread product for consumption.

The various mechanisms for the toasting device disclosed herein may be combined in numerous combinations, and the invention should not be limited to the particular combinations described and illustrated herein.

Presently preferred embodiments of the present invention and many of its improvements have been described with a degree of particularity. The previous description is of preferred examples for implementing the invention, and the scope of the invention should not necessarily be limited by this description.

We claim:

1. A toaster comprising:
   a housing;
   a heating chamber positioned in said housing and having a bread product receiving section;
   a first movable heating element assembly on a first side of said bread product receiving section and a second movable heating element assembly on a second side of said bread product receiving section;
   a carriage assembly in operable connection with said first and second movable heating element assemblies, said carriage being movable between a raised position and a lowered position, the carriage assembly further comprising:
      a lever arm pivotally attached near a rear portion of said heating chamber;
      a carriage plate operably attached to said lever arm adjacent a front wall of said heating chamber; and
      a carriage lever operably attached to said lever arm for said movement of said carriage assembly
   means for moving said first heating element assembly and said second heating element assembly in connection with a movement of said carriage assembly, each said means for moving said heating element assembly comprising a first linkage leader on a first end of said heating element assembly and a second linkage leader on a second end of said heating element assembly, said first and second linkage leaders being supported for combined movement by a linkage trailer, said carriage assembly being in operable engagement with at least one of said linkage leader and said linkage trailer for movement of at least one of said first and second heating element assemblies; and
   a control interface system for controlling a function of said toaster.

2. A toaster comprising:
   a housing;
   a control interface system for controlling a function of the toaster;
   a heating chamber positioned in said housing and having a bread product receiving section;
   a first movable heating element assembly on a first side of said bread product receiving section and a second movable heating element assembly on a second side of said bread product receiving section;
   a carriage assembly in operable connection with said first and second movable heating element assemblies, said carriage being movable between a raised position and a lowered position; and
   means for moving said first heating element assembly and said second heating element assembly in connection with a movement of said carriage assembly, each said means for moving said heating element assembly comprising a first linkage leader on a first end of said heating element assembly and a second linkage leader on a second end of said heating element assembly, said first and second linkage leaders being supported for combined movement by a linkage trailer, said carriage assembly being in operable engagement with at least one of said linkage leader and said linkage trailer for movement of at least one of said first and second heating element assemblies, the means for moving said first heating element assembly and said second heating element assembly comprises:
- a spring return operably attached to said first heating element assembly near a linkage leader and to said second heating element assembly near a linkage leader, said spring return biasing the movement of said heating element assemblies toward each other; and
- wherein said carriage assembly is operably engaged with at least one of said linkage leaders and said linkage trailers for assisting in the movement of said heating element assemblies by said at least one spring return.

3. A toaster comprising:
a housing;
a heating chamber in said housing, said heating chamber having a bread product receiving section;
a first heating element assembly in said heating chamber, said first heating element assembly comprising a first heating element and a first grill;
a second heating element assembly in said heating chamber, said second heating element assembly comprising a second heating element and a second grill;
means for moving said first and second heating element assemblies laterally in said bread product receiving section, each said means for moving said heating element assembly comprising a first linkage leader on a first end of said heating element assembly and a second linkage leader on a second end of said heating element assembly, said first and second linkage leaders being supported for combined movement by a linkage trailer;
at least two spring returns operably attached to said first heating element assembly and said second heat element assembly to bias the movement of said linkage leaders and to bias the movement of the associated heating element assemblies toward a center of said bread product receiving section.

4. A toaster comprising:
a housing;
a heating chamber in said housing, said heating chamber having a bread product receiving section;
a first heating element assembly in said heating chamber, said first heating element assembly comprising a first heating element and a first grill;
a second heating element assembly in said heating chamber, said second heating element assembly comprising a second heating element and a second grill;
means for moving said first and second heating element assemblies laterally in said bread product receiving section, each said means for moving said heating element assembly comprising a first linkage leader on a first end of said heating element assembly and a second linkage leader on a second end of said heating element assembly, said first and second linkage leaders being supported for combined movement by a linkage trailer; and
a carriage assembly movable between a raised position and a lowered position, said carriage in operable engagement with at least one of said means for moving said first and second heating element assemblies, the carriage assembly comprising:
- a lever arm pivotally attached near a rear portion of said heating chamber;
- a carriage plate operably attached to said lever arm adjacent a front wall of said heating chamber; and
- a carriage lever operably attached to said lever arm for said movement of said carriage assembly.

5. The toaster of claim 4, wherein said carriage plate further comprises a guide surface for matingly engaging a surface of said linkage leader, wherein a movement of said guide surface across said linkage leader in connection with said movement of said carriage-assembly causes a movement of said linkage leader.

6. A toaster having a moveable heating element assembly, said movable heating element assembly comprising:
a first heating element assembly having a first linkage leader on a first end of said first heating element assembly, a second linkage leader on a second end of said first heating element assembly, and supported for combined movement by a first linkage trailer;
a second heating element assembly having a first linkage leader on a first end of said second heating element assembly, a second linkage leader on a second end of said second heating element assembly, and supported for combined movement by a second linkage trailer;
a spring return operably attached to said first heating element assembly near a linkage leader and to said second heating element assembly near a linkage leader, said spring return biasing a movement of said heating element assemblies toward each other; and
a carriage assembly moveable between a raised position and a lowered position and operably engaged with at least one of said linkage leaders and said linkage trailers for assisting in the movement of said heating element assemblies by said spring return.

7. A toaster comprising:
a housing having a top face with at least one opening and a glass base, said base being interchangeable with said housing;
at least one heating chamber positioned in said housing at an angle from a horizontal surface, said at least one heating chamber being accessible through said opening and having a bread product receiving section;
a base chamber positioned between said heating chamber and said horizontal surface for supporting said heating chamber at said angle;
a heat shield at least partially covering said heating chamber, said heat shield having a top with integrally connected front and rear walls, said top having at least one opening corresponding to said opening in said housing top;
a first heating element assembly in said heating chamber, said first heating element assembly comprising a heating element and a grill;
a second heating element assembly in said heating chamber, said second heating element assembly comprising a heating element and a grill;
a first pair of linkage leaders attached to said first heating element assembly and supported for combined movement by a first linkage trailer;
a second pair of linkage leaders attached to said second heating element assembly and supported for combined movement by a second linkage trailer;
a spring return operably attached to said first heating element assembly near a linkage leader from said first pair and operably attached to said second heating element assembly near a linkage leader from said second pair, said spring return biasing the movement of said heating element assemblies toward each other;

a carriage assembly movable between a raised position and a lowered position, said carriage assembly comprising a bread rack positioned in said bread product receiving section for holding a food item thereon and comprising a slidable connection with a guide rod and a damper for absorbing at least one of noise and vibration associated with a sliding movement of said carriage along said guide rod, said carriage assembly further comprising an operable engagement with at least one of said linkage leaders and said linkage trailers for assisting in the movement of said heating element assemblies by said spring return; and a toaster control interface on said top face of said housing, said toaster control interface comprising a concentric rotary control for shade selection surrounding a central control means for controlling a supply of power to said heating elements.

* * * * *